United States Patent
Tsuruoka

(10) Patent No.: US 8,223,226 B2
(45) Date of Patent: Jul. 17, 2012

(54) IMAGE PROCESSING APPARATUS AND STORAGE MEDIUM STORING IMAGE PROCESSING PROGRAM

(75) Inventor: Takao Tsuruoka, Machida (JP)

(73) Assignee: Olympus Corporation (JP)

( * ) Notice: Subject to any disclaimer, the term of this patent is extended or adjusted under 35 U.S.C. 154(b) by 218 days.

(21) Appl. No.: 12/690,332

(22) Filed: Jan. 20, 2010

(65) Prior Publication Data
US 2010/0188529 A1    Jul. 29, 2010

Related U.S. Application Data

(63) Continuation of application No. PCT/JP2008/062872, filed on Jul. 10, 2008.

(30) Foreign Application Priority Data

Jul. 23, 2007 (JP) .................................. 2007-190990

(51) Int. Cl.
*H04N 5/27* (2006.01)

(52) U.S. Cl. ...................... 348/241; 348/222.1; 348/234; 348/273

(58) Field of Classification Search .......... 348/234–238, 348/241, 242, 244, 255, 256
See application file for complete search history.

(56) References Cited

U.S. PATENT DOCUMENTS

| | | | |
|---|---|---|---|
| 7,570,287 B2 * | 8/2009 | Tsuruoka ...................... | 348/241 |
| 7,656,442 B2 * | 2/2010 | Tsuruoka ...................... | 348/241 |
| 2001/0016064 A1 * | 8/2001 | Tsuruoka et al. ............. | 382/167 |
| 2005/0157189 A1 | 7/2005 | Sambongi ..................... | 348/241 |
| 2005/0265627 A1 | 12/2005 | Yamauchi ..................... | 382/275 |
| 2006/0227227 A1 * | 10/2006 | Tsuruoka ...................... | 348/241 |
| 2007/0132864 A1 | 6/2007 | Tsuruoka ...................... | 348/241 |
| 2008/0158395 A1 * | 7/2008 | Tsuruoka ...................... | 348/241 |
| 2008/0266432 A1 * | 10/2008 | Tsuruoka ...................... | 348/294 |
| 2009/0086062 A1 * | 4/2009 | Tsuruoka ...................... | 348/241 |

FOREIGN PATENT DOCUMENTS

JP          10-013734          1/1998

(Continued)

OTHER PUBLICATIONS

International Search Report and Written Opinion mailed Aug. 12, 2008 in corresponding PCT International Application No. PCT/JP2008/062872.

*Primary Examiner* — Sinh Tran
*Assistant Examiner* — Selam Gebriel
(74) *Attorney, Agent, or Firm* — Ostrolenk Faber LLP

(57) ABSTRACT

An image processing apparatus that performs noise reduction processing to image signals comprises a separation and extraction unit that separates a present image signal into a luminance signal and a color signal and extracts regions having a predetermined size sequentially, a representative luminance calculation unit that calculates a representative luminance value, a representative hue calculation unit that calculates a representative hue value of the region, a color noise estimation unit that estimates a color noise amount based upon the representative luminance value and the representative hue value, a differential color signal calculation unit that calculates a differential color signal from the color signal of the region and a color signal of a past region after noise reduction processing and a color noise reduction unit that performs color noise reduction processing to the color signal of the region based upon the color noise amount and the differential color signal.

20 Claims, 35 Drawing Sheets

FOREIGN PATENT DOCUMENTS

| | | |
|---|---|---|
| JP | 2000-209507 | 7/2000 |
| JP | 2001-175843 | 6/2001 |
| JP | 2005-130297 | 5/2005 |
| JP | 2005-175718 | 6/2005 |
| JP | 2005-347821 | 12/2005 |
| JP | 2006-023959 | 1/2006 |

* cited by examiner $Y_{00} = (G_{10} + G_{01})/2$
$Cb_{00} = B_{11} - Y_{00}$
$Cr_{00} = R_{00} - Y_{00}$ $Y_{10} = (G_{10} + G_{21})/2$
$Cb_{10} = B_{11} - Y_{10}$
$Cr_{10} = R_{20} - Y_{10}$

REGION $Y_{01} = (G_{01} + G_{12})/2$
$Cb_{01} = B_{11} - Y_{01}$
$Cr_{01} = R_{02} - Y_{01}$ $Y_{11} = (G_{21} + G_{12})/2$
$Cb_{11} = B_{11} - Y_{11}$
$Cr_{11} = R_{22} - Y_{11}$

| 1 | 10 | 1 |
|---|---|---|
| 10 | 84 | 10 |
| 1 | 10 | 1 |

Type 1

| 3 | 14 | 3 |
|---|---|---|
| 14 | 59 | 14 |
| 3 | 14 | 3 |

Type 2

| 5 | 14 | 5 |
|---|---|---|
| 14 | 52 | 14 |
| 5 | 14 | 5 |

Type 3

| 7 | 13 | 7 |
|---|---|---|
| 13 | 48 | 13 |
| 7 | 13 | 7 |

Type 4

$Y_{00} = Mg_{00} + G_{10} + Ye_{01} + Cy_{11}$
$Cb_{00} = Mg_{00} + Cy_{11} - G_{10} - Ye_{01}$
$Cr_{00} = Mg_{00} + Ye_{01} - G_{10} - Cy_{11}$ $Y_{10} = Mg_{20} + G_{10} + Ye_{21} + Cy_{11}$
$Cb_{10} = Mg_{20} + Cy_{11} - G_{10} - Ye_{21}$
$Cr_{10} = Mg_{20} + Ye_{21} - G_{10} - Cy_{11}$ $Y_{01} = Mg_{12} + G_{02} + Ye_{01} + Cy_{11}$
$Cb_{01} = Mg_{12} + Cy_{11} - G_{02} - Ye_{01}$
$Cr_{01} = Mg_{12} + Ye_{01} - G_{02} - Cy_{11}$ $Y_{11} = Mg_{12} + G_{22} + Ye_{21} + Cy_{11}$
$Cb_{11} = Mg_{12} + Cy_{11} - G_{22} - Ye_{21}$
$Cr_{11} = Mg_{12} + Ye_{21} - G_{22} - Cy_{11}$

IMAGE PROCESSING APPARATUS AND STORAGE MEDIUM STORING IMAGE PROCESSING PROGRAM

CROSS REFERENCE TO RELATED APPLICATIONS

This application is a continuation of International Patent Application No. PCT/JP2008/062872, filed on Jul. 10, 2008, which claims the benefit of Japanese Patent Application No. JP 2007-190990, filed on Jul. 23, 2007, which is incorporated by reference as if fully set forth.

FIELD OF THE INVENTION

The present invention relates to an image processing apparatus which performs reduction processing of random noise due to an imaging system, and in particular, to an image processing apparatus which can reduce color noise component with a high degree of accuracy by achieving high-accuracy estimation of a color noise amount relating to color noise reduction processing.

BACKGROUND OF THE INVENTION

Generally, image signals obtained from an imaging system comprising imaging devices and their accompanying analog circuits, A/D converters, etc. contain noise components. The noise components can be categorized roughly into fixed pattern noise and random noise. The fixed pattern noise is noise caused mainly by the imaging devices such as defective pixels. On the other hand, the random noise is generated in the imaging devices and the analog circuits, and has characteristics close to white noise.

Regarding reduction processing of random noise in a still image, for example, as shown in JP2001-175843A, a technique of separating an image signal into a luminance signal and a color difference signal, obtaining edge intensity from the luminance signal and the color difference signal, and performing smoothing processing to the color difference signal in a region other than the edge region is disclosed. Thereby, it becomes possible to perform color noise reduction processing to only the smoothed portion while reserving the edge portion.

Further, as shown in JP2005-175718A, an example of separating an image signal into a luminance signal and a color difference signal, estimating a luminance noise amount and a color noise amount for each predetermined region, and performing noise reduction processing for each region is disclosed. Thereby, it becomes possible to perform optimized noise reduction processing for each region.

On the other hand, as an example of noise reduction processing of random noise in motion pictures, there is recursive type noise reduction processing using correlation characteristics in a direction of time axis. In the recursive type noise reduction processing, based on such a fact that the image signal itself has high correlation with the image signal of the past while the random noise has low correlation with the image signals of the past, only random noise is extracted by performing differential processing between the present and past image signals, and noise reduction processing for the present image signal is performed using the extracted random noise.

As such recursive type noise reduction processing, a method for detecting a motion component from an image signal and controlling a limit value and a feedback coefficient for the signal which has been subjected to differential processing based upon the detected motion component is disclosed in JP10-13734A. Thereby, it becomes possible to perform noise reduction processing where adverse effect such as afterimage due to the motion component has been suppressed. Moreover, JP2000-209507A discloses a method for controlling a feedback coefficient from a signal value which has been subjected to differential processing. Thereby, it becomes possible to perform noise reduction processing where adverse effect has been suppressed with relatively reduced arithmetic amount.

SUMMARY OF THE INVENTION

An image processing apparatus of an aspect of the present invention that performs noise reduction processing to image signals taken in from an imaging system in time sequence comprises a separation and extraction unit that separates a present image signal into a luminance signal and a color signal and extracts regions having a predetermined size sequentially, a representative luminance calculation unit that calculates a representative luminance value of the region based upon the luminance signal of the region extracted by the separation and extraction unit, a representative hue calculation unit that calculates a representative hue value of the region based upon the color signal of the regions, a color noise estimation unit that estimates a color noise amount based upon the representative luminance value calculated by the representative luminance calculation unit and the representative hue value calculated by the representative hue calculation unit, a differential color signal calculation unit that calculates a differential color signal from the color signal of the region and a color signal of a past region which has been subjected to noise reduction processing and corresponds to the region, and a color noise reduction unit that performs color noise reduction processing to the color signal of the region based upon the color noise amount estimated by the color noise estimation unit and the differential color signal calculated by the differential color signal calculation unit.

A storage medium of another aspect of the present invention stores an image processing program for performing noise reduction processing to image signals taken in from an imaging system in time sequence. The image processing program causes a computer to execute a separation and extraction step of separating a present image signal into a luminance signal and a color signal and extracting regions having a predetermined size sequentially, a representative luminance calculation step of calculating a representative luminance value of the region based upon the luminance signal of the region extracted at the separation and extraction step, a representative hue calculation step of calculating a representative hue value of the region based upon the color signal of the regions, a color noise estimation step of estimating a color noise amount based upon the representative luminance value and the representative hue value, a differential color signal calculation step of calculating a differential color signal from the color signal of the region and a color signal of a past region which has been subjected to noise reduction processing and corresponds to the region, and a color noise reduction step of performing color noise reduction processing to the color signal of the region based upon the color noise amount estimated at the color noise estimation step and the differential color signal calculated at the differential color signal calculation step.

DESCRIPTION OF THE PREFERRED EMBODIMENTS

Hereafter, embodiments of the present invention will be described with reference to the attached drawings.

[First Embodiment]

Figure 1:
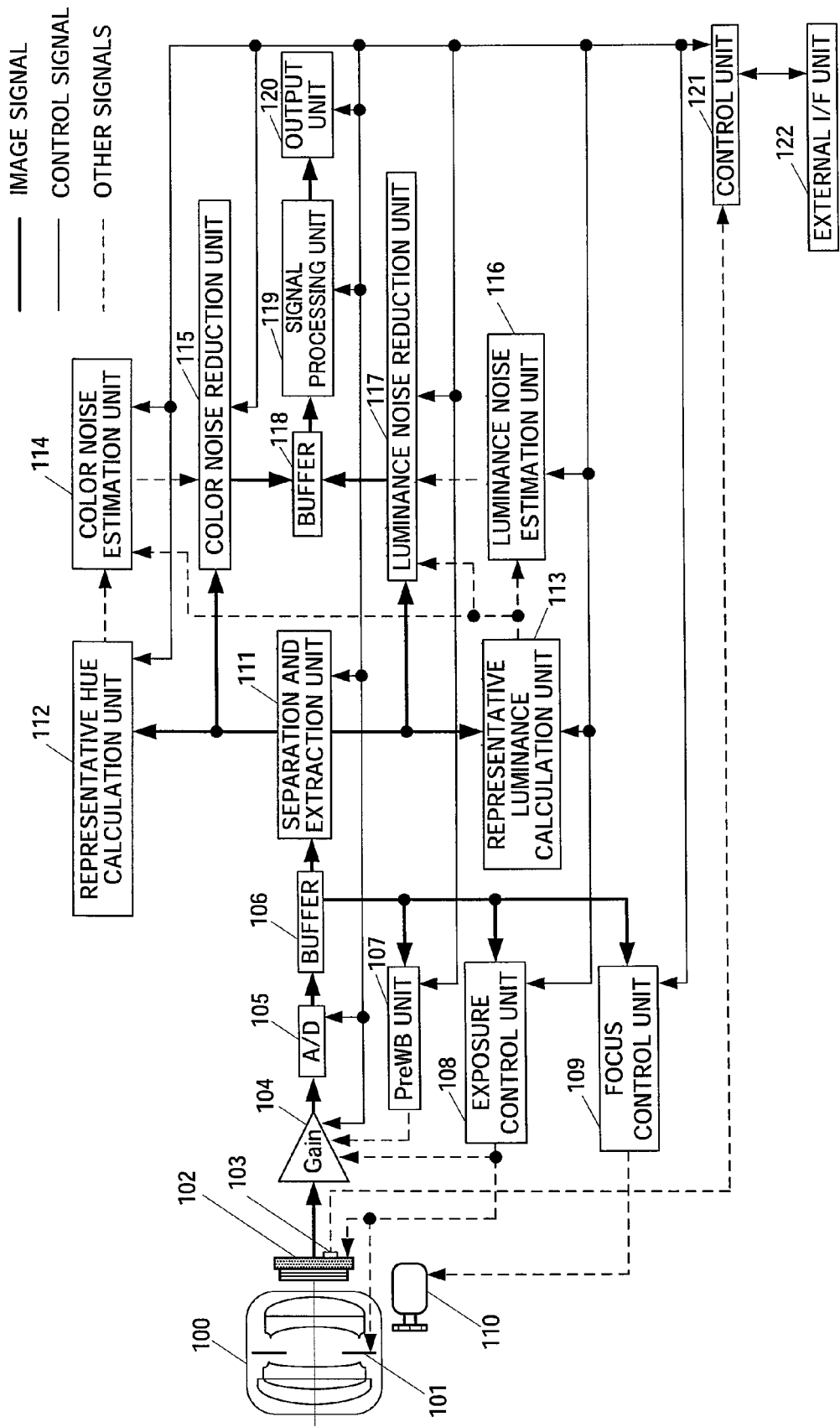
FIG. 1 is a diagram for explaining a configuration of an image processing apparatus according to a first embodiment.

FIG. 1 is a configuration diagram of an image processing apparatus according to a first embodiment of the present invention. An image signal which has been taken in through a lens system 100, an aperture 101, and a CCD 102 is amplified at an amplifier ("GAIN" in FIG. 1) 104, and is converted to a digital signal at an A/D converter ("A/D" in FIG. 1) 105. The image signal from the A/D converter 105 is transferred to a separation and extraction unit 111 via a buffer 106.

The buffer 106 is also connected to a pre-white balance adjustment unit ("PreWB" in FIG. 1) 107, an exposure control unit 108, and a focus control unit 109. The pre-white balance adjustment unit 107 is connected to the amplifier 104, the exposure control unit 108 is connected to the aperture 101, the CCD 102, and the amplifier 104, and the focus control unit 109 is connected to an AF motor 110. The separation and extraction unit 111 is connected to a representative hue calculation unit 112, a representative luminance calculation unit 113, a color noise reduction unit 115, and a luminance noise reduction unit 117.

The representative hue calculation unit 112 is connected to a buffer 118 via a color noise estimation unit 114 and the color noise reduction unit 115. The representative luminance calculation unit 113 is connected to a color noise estimation unit 114, a luminance noise estimation unit 116, and the luminance noise reduction unit 117. The luminance noise estimation unit 116 is connected to the buffer 118 via the luminance noise reduction unit 117. The buffer 118 is connected to a signal processing unit 119. The signal processing unit 119 is connected to an output unit 120 such as a memory card.

A control unit 121 such as a microcomputer is bi-directionally connected to the amplifier 104, the A/D converter 105, the pre-white balance adjustment unit 107, the exposure control unit 108, the focus control unit 109, the separation and extraction unit 111, the representative hue calculation unit 112, the representative luminance calculation unit 113, the color noise estimation unit 114, the color noise reduction unit 115, the luminance noise estimation unit 116, the luminance noise reduction unit 117, the signal processing unit 119, and the output unit 120. Moreover, an external interface (I/F) unit 122 having a power source switch, a shutter release button, and an interface for performing setting between various types of photographic modes is also bi-directionally connected to the control unit 121. Furthermore, a signal from a temperature sensor 103 arranged near the CCD 102 is connected to the control unit 121.

Now, the details of the signal processing will be explained.

A flow of the image signal will be described with reference to FIG. 1. After shooting conditions such as ISO sensitivity is set via the external I/F unit 122, a pre-shooting mode is started when the shutter release button is pressed halfway. An image signal taken in through the lens system 100, the aperture 101, and the CCD 102 is output as an analog signal.

Figures 2A, 2B:
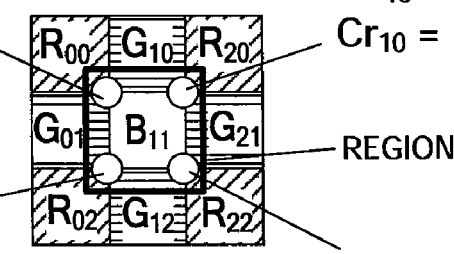
FIG. 2A is a diagram showing a configuration of a Bayer type primary color filter.
FIG. 2B is an explanatory diagram illustrating separation into a luminance signal and a color signal and extraction of a region.

It is noted that in this embodiment, a single CCD having a Bayer type primary color filter arranged in front thereof is assumed as the CCD 102. FIG. 2A shows a configuration of the Bayer type primary color filter. The Bayer type primary color filter has such a configuration that a base unit comprises 2×2 pixels where one pixel is arranged to each of red (R) and blue (B) filters and two pixels are arranged to a green (G) filter.

The above analog signal is amplified at the amplifier 104 by a predetermined amount, is converted to a digital signal at the A/D converter 105, and is transferred to the buffer 106. The image signal in the buffer 106 is transferred to the pre-white balance adjustment unit 107, the exposure control unit 108, and the focus control unit 109 under the control of the control unit 121.

The pre-white balance adjustment unit 107 calculates a simple white balance coefficient by integrating signals with a predetermined level for each color signal corresponding to a color filter. The above coefficient is transferred to the amplifier 104, and white balance is adjusted by multiplying the coefficient by a different gain for each color signal.

The exposure control unit 108 controls the aperture 101, an electronic shutter speed of the CCD 102, an amplification factor of the amplifier 104 and so on so as to obtain a suitable exposure by taking into account the set ISO sensitivity, shutter speed of the limit of image stability, etc. The focus control unit 109 detects the edge intensity in the image signal and obtains a focusing signal by controlling the AF motor 110 such that the edge intensity becomes the maximum.

Subsequently, the shutter release button is fully pressed via the external I/F unit 122 so that a real shooting is performed, and an image signal is transferred to the buffer 106 like the pre-shooting. The real shooting is performed based upon the simple white balance coefficient obtained at the pre-white balance adjustment unit 107, the exposure information obtained at the exposure control unit 108, and the focus information obtained at the focus control unit 109, and these information at a shooting time are transferred to the control unit 121.

The separation and extraction unit 111 separates the image signal into a luminance signal and color signals and sequentially extracts regions to be thereafter subjected to noise reduction processing under the control of the control unit 121.

In this embodiment, a luminance signal Y and color signals Cb and Cr are calculated for each 2×2 pixels to the Bayer type primary color filter. For example, regarding 2×2 pixels of $R_{00}$, $G_{10}$, $G_{01}$, and $B_{11}$, a luminance signal $Y_{00}$ and color signals $Cb_{00}$ and $Cr_{00}$ are calculated as shown in Expressions (1).

$$Y_{00} = (G_{10} + G_{01})/2$$

$$Cb_{00} = B_{11} - Y_{00}$$

$$Cr_{00} = R_{00} - Y_{00} \qquad (1)$$

Further, as regions to be subjected to noise reduction processing, regarding a set of the luminance signal Y and the color signals Cb and Cr, 2×2 pixels are assumed, as shown in FIG. 2B. Hereafter, a luminance signal in the region is indicated with $Y_{ij}$, and color signals therein are indicated with $Cb_{ij}$ and $Cr_{ij}$ (i indicates a value on an X coordinate where i=0 to 1, while j indicates a value on a Y coordinate where j=0 to 1). The luminance signal $Y_{ij}$ in the region is transferred to the representative luminance calculation unit 113 and the luminance noise reduction unit 117, while the color signals $Cb_{ij}$ and $Cr_{ij}$ are transferred to the representative hue calculation unit 112 and the color noise reduction unit 115.

The representative hue calculation unit 112 obtains averages AV_Cb and AV_Cr of the color signals $Cb_{ij}$ and $Cr_{ij}$ under the control of the control unit 121 as shown in the following Expressions (2).

$$AV\_Cb = \frac{\sum_{i=0,1}\sum_{j=0,1} Cb_{i,j}}{4} \qquad (2)$$

$$AV\_Cr = \frac{\sum_{i=0,1}\sum_{j=0,1} Cr_{i,j}}{4}$$

Figure 3:
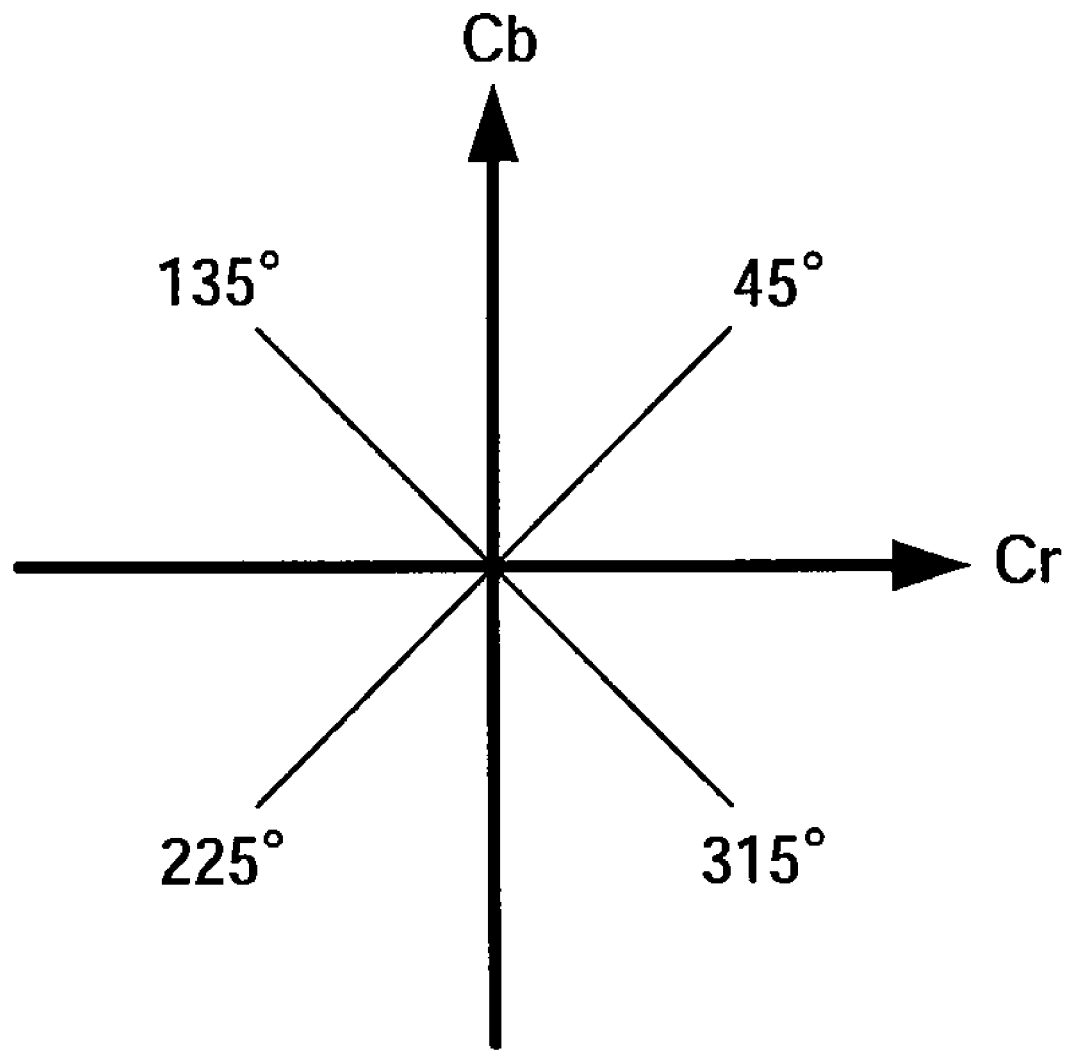
FIG. 3 is a diagram for explaining four hue regions.

The representative hue calculation unit 112 further obtains a representative hue value H of the region from the above-mentioned averages AV_Cb and AV_Cr of the color signals. In this embodiment, either one of four hue regions shown in FIG. 3 is assumed as the representative hue value. FIG. 3 shows four hue regions of a hue region from 0° to less than 90° (hereafter, indicated with "hue region of 45°"), a hue region from 90° to less than 180° (hereafter, indicated with "hue region of 135°"), a hue region from 180° to less than 270° (hereafter, indicated with "hue region of 225°"), and a hue region from 270° to less than 360° (hereafter, indicated with "hue region of 315°") on a Cr-Cb plane whose horizontal axis indicates the color signal Cr and whose vertical axis indicates the color signal Cb. The representative hue calculation unit 112 performs classification to the above four regions based upon positive/negative of the averages AV_Cb and AV_Cr of color signals, as shown in TABLE 1.

TABLE 1

| AV_Cb | AV_Cr | hue region |
| --- | --- | --- |
| positive or zero | positive | 45° hue region |
| positive | negative or zero | 135° hue region |
| negative or zero | negative | 225° hue region |
| negative | positive or zero | 315° hue region |

The classification result to the four hue regions is transferred to the color noise estimation unit 114 as a representative hue value H of the region.

On the other hand, the representative luminance calculation unit 113 obtains average AV_Y of luminance signals under the control of the control unit 121, as shown in Expression (3).

$$AV\_Y = \frac{\sum_{i=0,1}\sum_{j=0,1} Y_{i,j}}{4} \quad (3)$$

The abovementioned average value AV_Y of luminance signals is transferred to the color noise estimation unit 114, the luminance noise estimation unit 116, and the luminance noise reduction unit 117 as a representative luminance value L of the region.

The color noise estimation unit 114 estimates a color noise amount $CN_s$ (s=Cb, Cr) based upon the representative hue value H from the representative hue calculation unit 112 and the representative luminance value L from the representative luminance calculation unit 113 to transfer the same to the color noise reduction unit 115 under the control of the control unit 121. An estimation method of the color noise amount $CN_s$ will be described later.

The color noise reduction unit 115 performs color noise reduction processing to the color signals $Cb_{ij}$ and $Cr_{ij}$ in the regions from the separation and extraction unit 111 based upon the color noise amount $CN_s$ from the color noise estimation unit 114 under the control of the control unit 121. A color noise reduction processing method will be described later. Color signals $Cb'_{ij}$ and $Cr'_{ij}$ after the color noise reduction processing are transferred to the buffer 118 and saved therein.

The luminance noise estimation unit 116 estimates a luminance noise amount LN based upon the representative luminance value L from the representative luminance calculation unit 113 to transfer the same to the luminance noise reduction unit 117 under the control of the control unit 121. The luminance noise reduction unit 117 performs luminance noise reduction processing to the luminance signal $Y_{ij}$ of the region from the separation and extraction unit 111 based upon the luminance noise amount LN from the luminance noise estimation unit 116 under the control of the control unit 121. A luminance signal $Y'_{ij}$ after the luminance noise reduction processing is transferred to the buffer 118 and saved therein.

It is noted that the processing in the separation and extraction unit, 111, the processing in the representative hue calculation unit 112, the processing in the representative luminance calculation unit 113, the processing in the color noise estimation unit 114, the processing in the color noise reduction unit 115, the processing in the luminance noise estimation unit 116, and the processing in the luminance noise reduction unit 117 are performed in a synchronizing manner for each region under the control of the control unit 121. At a time when processing to all regions in one image signal have been completed, a luminance signal Y' after the luminance noise reduction processing and color signals Cb' and Cr' after the color noise reduction processing regarding the image signal obtained by the shooting exist in the buffer 118.

The signal processing unit 119 converts the luminance signal Y' after the luminance noise reduction processing and the color signals Cb' and Cr' after the color noise reduction processing to an original signal of the imaging system (R, G, and B signals in this embodiment) under the control of the control unit 121. For example, a luminance signal $Y'_{00}$ after the luminance noise reduction processing regarding the luminance signal $Y_{00}$ shown in the Expressions (1) and color signals $Cb'_{00}$ and $Cr'_{00}$ after the color noise reduction processing regarding the color signals $Cb_{00}$ and $Cr_{00}$ shown in the Expressions (1) are converted to $R'_{00}$, $G'_{00}$, and $B'_{00}$ signals after the noise reduction processing, as shown in Expressions (4).

$$R'_{00}=Cr'_{00}+Y'_{00}$$

$$G'_{00}=Y'_{00}$$

$$B'_{00}=Cb'_{00}+Y'_{00} \quad (4)$$

The signal processing unit 119 performs known emphasis processing, tone processing, compression processing, etc., to the R', G', and B' signals which have been subjected to the abovementioned noise reduction processing to transfer these signals to the output unit 120. The output unit 120 records and stores the image signal in a recording medium such as a magnetic disc or a memory card.

Figure 4:
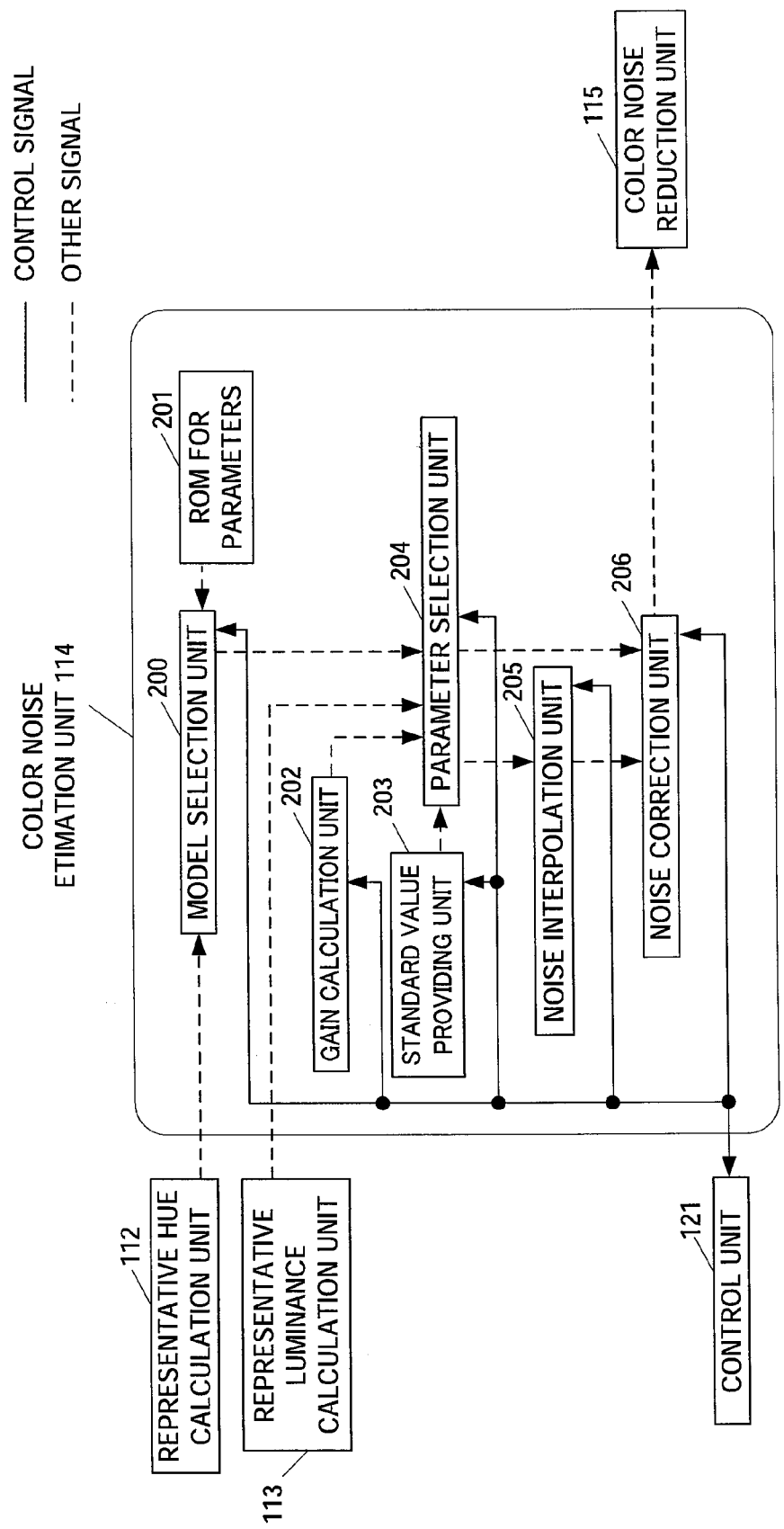
FIG. 4 is a configuration diagram of a color noise estimation unit.

FIG. 4 shows an example of a configuration of the color noise estimation unit 114. The color noise estimation unit 114 comprises a model selection unit 200, a ROM for parameters 201, a gain calculation unit 202, a standard value providing unit 203, a parameter selection unit 204, a noise interpolation unit 205, and a noise correction unit 206.

The representative hue calculation unit 112 and the ROM for parameters 201 are connected to the model selection unit 200. The representative luminance calculation unit 113, the model selection unit 200, the gain calculation unit 202, and the standard value providing unit 203 are connected to the parameter selection unit 204. The parameter selection unit 204 is connected to the noise interpolation unit 205 and the noise correction unit 206. The noise interpolation unit 205 is connected to the noise correction unit 206, and the noise correction unit 206 is connected to the color noise reduction unit 115. The control unit 121 is bi-directionally connected to the model selection unit 200, the gain calculation unit 202, the standard value providing unit 203, the parameter selection unit 204, the noise interpolation unit 205, and the noise correction unit 206.

The model selection unit 200 reads the representative hue value H of the region from the representative hue calculation unit 112 and selects a reference color noise model used for color noise estimation from the ROM for parameters 201 under the control of the control unit 121.

Figure 5A:
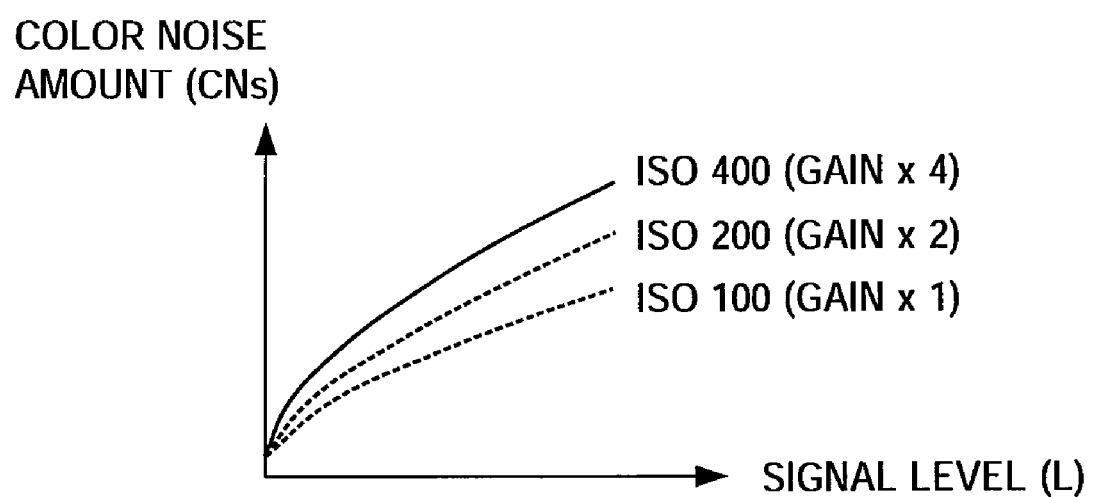
FIG. 5A is a diagram showing a relationship of color noise amounts with signal levels.

FIG. 5A to FIG. 5D are explanatory diagrams illustrating the reference color noise model. FIG. 5A is a graph showing curves obtained by plotting color noise amounts CN to a signal level L. As shown in FIG. 5A, the color noise amount CN increases to the signal level L in a quadric manner. When the curve shown in FIG. 5A is modeled using a quadric function, Expression (5) is obtained. In the Expression (5), $\alpha$, $\beta$, and $\gamma$ are constant terms.

$$CN=\alpha L^2+\beta L+\gamma \quad (5)$$

However, the color noise amount CN varies according to not only the signal level but also a temperature and a gain of an imaging device. In FIG. 5A, color noise amounts are plotted according to three kinds of ISO sensitivities 100, 200, and 400 relating to gains under a certain temperature as one example.

Figure 5B:
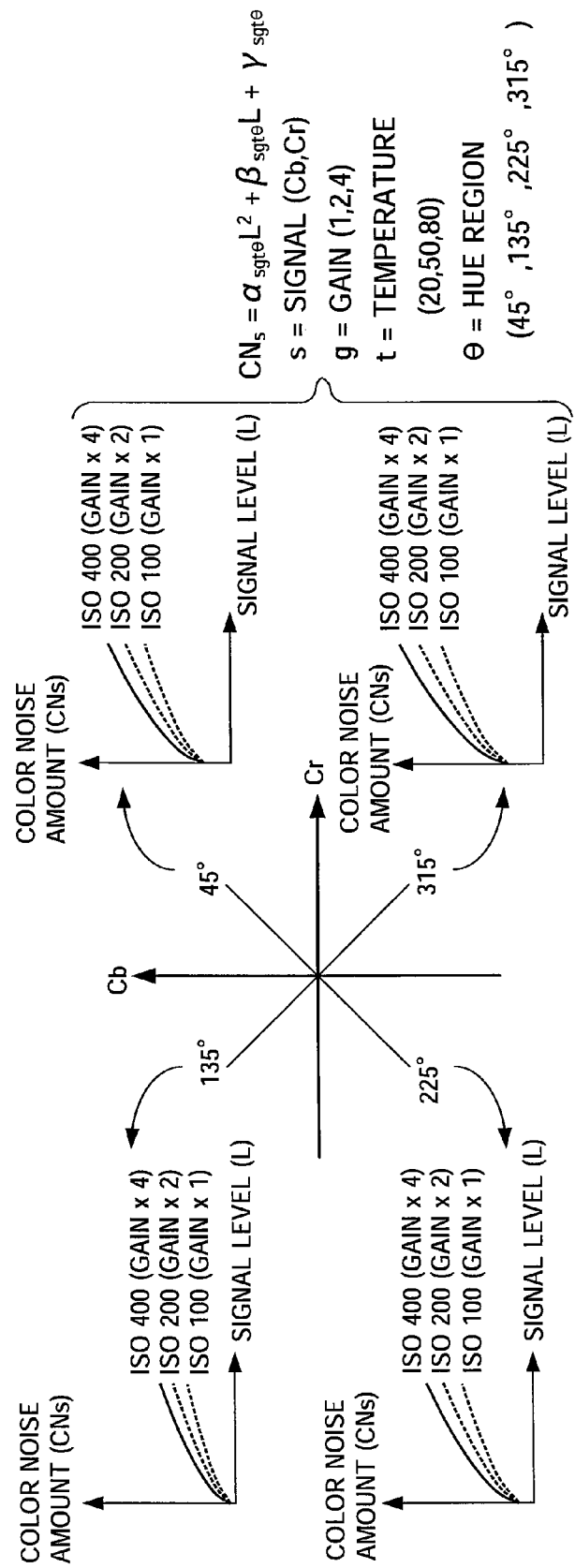
FIG. 5B is a diagram where color noise amounts in four hue regions of angles of 45°, 135°, 225°, and 315° are plotted.

Further, the color noise amount CN also varies according to the hue region. In FIG. 5B, color noise amounts are plotted in four hue regions of 45°, 135°, 225°, and 315°. Individual curves take an aspect shown by Expression (5), but coefficients thereof vary according to the ISO sensitivity relating to the gain, the temperature, and the hue region. When the color noise model is formulized by assuming the gain as g, the temperature as t, and the hue region as θ and considering the above, Expression (6) can be obtained.

$$CN = \alpha_{gt\theta} L^2 + \beta_{gt\theta} L + \gamma_{gt\theta} \quad (6)$$

In Expression (6), $\alpha_{gt\theta}$, $\beta_{gt\theta}$, and $\gamma_{gt\theta}$ are constant terms corresponding to the gain g, the temperature t, and the hue region θ, respectively. Further, as the color noise model shown by the Expression (6), two kinds of models exist regarding to the color signals Cb and Cr. Hereafter, the color noise amount of the color signal Cb is indicated with $CN_{Cb}$, the color noise amount of the color signal Cr is indicated with $CN_{Cr}$, and both of the color noise amounts is indicated with CNs (s=Cb, Cr). Regarding the two kinds of color signals, the Expression (6) is represented in the following manner.

$$CNs = \alpha_{sgt\theta} L^2 + \beta_{sgt\theta} L + \gamma_{sgt\theta} \quad (7)$$

Figure 5C:
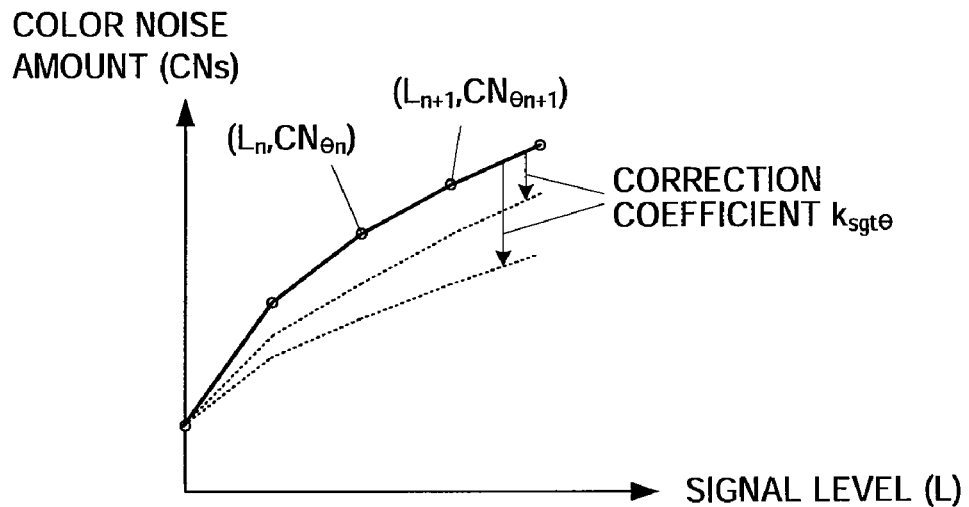
FIG. 5C is a diagram for explaining simplification of a color noise model.

It is noted that recording the function shown by the Expression (7) multiple times and calculating the color noise amount $CN_s$ by computation in each case are complicated regarding processing. Therefore, as shown in FIG. 5C, simplification of the color noise model is performed for each specific hue region. In FIG. 5C, a color noise model giving a maximum color noise amount is selected as the reference color noise model in a hue region θ and is approximated by a polygonal line comprising a predetermined number of straight lines. The inflection points of the polygonal line are represented by coordinate data $(L_n, CN_{\theta n})$ comprising the signal level L and the color noise amount $CN_\theta$. Here, "n" indicates the number of inflection points.

Further, a correction coefficient $k_{sgt\theta}$ for deriving another color noise model from the above reference color noise model is also prepared. The correction coefficient $k_{sgt\theta}$ is calculated by the least-squares method between each color noise model and the reference color noise model. Derivation of another color noise model from the reference color noise model is achieved by multiplying the reference color noise model by the above correction coefficient $k_{sgt\theta}$.

Figure 5D:
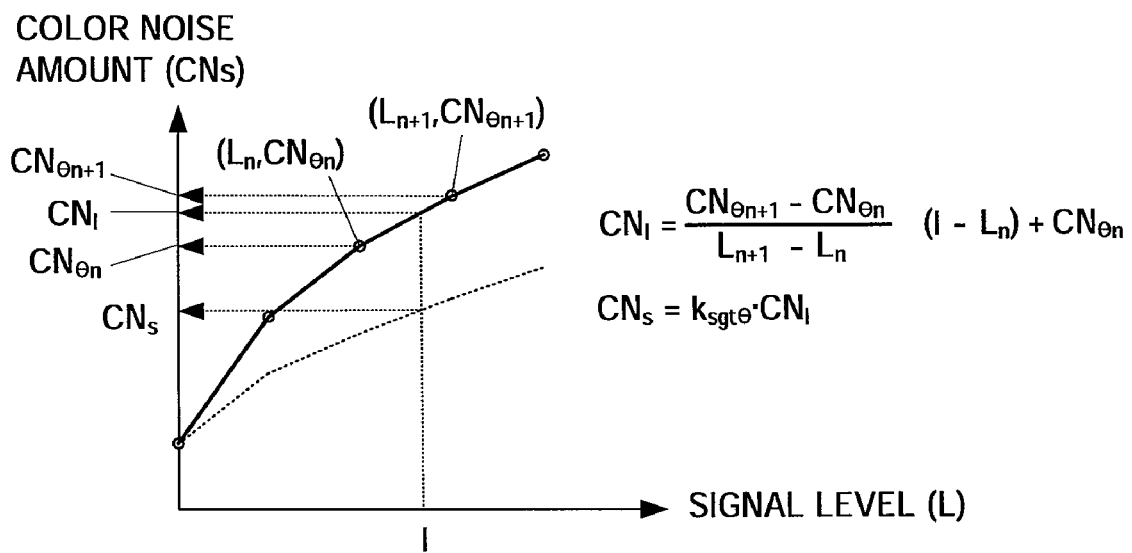
FIG. 5D is a diagram showing a method for calculating a color noise amount $CN_s$ from a simplified color noise model.

FIG. 5D shows a method for calculating a color noise amount $CN_s$ from the simplified color noise model shown in FIG. 5C. For example, it is assumed to obtain a color noise amount $CN_s$ corresponding to a case that given signal level, gain, temperature, and hue region are l, g, t, and θ, respectively. First, a reference color noise model and a correction coefficient $k_{sgt}\theta$ corresponding to the hue region θ are selected.

Next, a segment of the reference color noise model to which the signal level l belongs is searched. Here, it is assumed that the signal level l belongs to a segment of the reference color noise model between $(L_n, CN_{\theta n})$ and $(L_{n+1}, CN_{\theta n+1})$. A reference color noise amount $CN_l$ in the reference color noise model is obtained by the linear interpolation, as shown in Expression (8).

$$CN_l = \frac{CN_{\theta n+1} - CN_{\theta n}}{L_{n+1} - L_n}(l - L_n) + CN_{\theta n} \quad (8)$$

Next, a color noise amount $CN_s$ is obtained by multiplying the obtained noise amount $CN_l$ by the correction coefficient $k_{sgt\theta}$, as shown in Expression (9).

$$CN_s = k_{sgt\theta} \cdot CN_l \quad (9)$$

The ROM for parameters 201 records coordinate data $(L_n, CN_{\theta n})$ and correction coefficients $k_{sgt\theta}$ of reference color noise models corresponding to a plurality of hue regions θ therein. The model selection unit 200 obtains the hue region θ based upon the representative hue value H of the region from the representative hue calculation unit 112 and reads a reference color noise model and a correction coefficient corresponding to the obtained hue region θ from the ROM for parameters 201. The read reference color noise model and correction coefficient are transferred to the parameter selection unit 204.

The gain calculation unit 202 obtains a gain at the amplifier 104 based upon information about the ISO sensitivity and the exposure information transferred from the control unit 121, and transfers the gain to the parameter selection unit 204. Further, the control unit 121 obtains temperature information of the CCD 102 from the temperature sensor 103 to transfer the same to the parameter selection unit 204.

The parameter selection unit 204 sets the signal level l from the representative luminance value L obtained from the representative luminance calculation unit 113, the gain g from gain information obtained from the gain calculation unit 202, and the temperature t from the temperature information obtained from the control unit 121 under the control of the control unit 121. Next, the parameter selection unit 204 searches coordinate data $(L_n, CN_{\theta n})$ and $(L_{n+1}, CN_{\theta n+1})$ of a segment to which the signal level l belongs to transfer the searched data to the noise interpolation unit 205. Further, the parameter selection unit 204 searches the correction coefficient $k_{sgt\theta}$ to transfer the same to the noise correction unit 206.

The noise interpolation unit 205 calculates a reference color noise amount $CN_l$ in the reference color noise model based upon Expression (8) using the signal level l and the coordinate data $(L_n, CN_{\theta n})$ and $(L_{n+1}, CN_{\theta n+1})$ of the segment obtained from the parameter selection unit 204, and transfers the reference color noise amount $CN_l$ to the noise correction unit 206 under the control of the control unit 121.

The noise correction unit 206 calculates a color noise amount $CN_s$ based upon the Expression (9) using the correction coefficient $k_{sgt\theta}$ obtained from the parameter selection unit 204 and the reference color noise amount $CN_l$ obtained from the noise interpolation unit 205 under the control of the control unit 121. The calculated color noise amount $CN_s$ is transferred to the color noise reduction unit 115.

It is noted that, in the process of the above-described calculation of the color noise amount, it is unnecessary to obtain information such as the temperature t or the gain g for each shooting. A configuration where arbitrary information (predetermined standard values) in the standard value providing unit 203 in advance is recorded and the process for calculating information such as the temperature t or the gain g is skipped can be adopted. With such a configuration, high-speed processing, power saving, etc., can be realized.

Furthermore, in the abovementioned configuration, the color noise amount is calculated based upon the reference color noise model utilizing interpolation operation, but the present invention is not necessarily limited to such a configuration. For example, a configuration using a look up table can be adopted.

Figure 6:
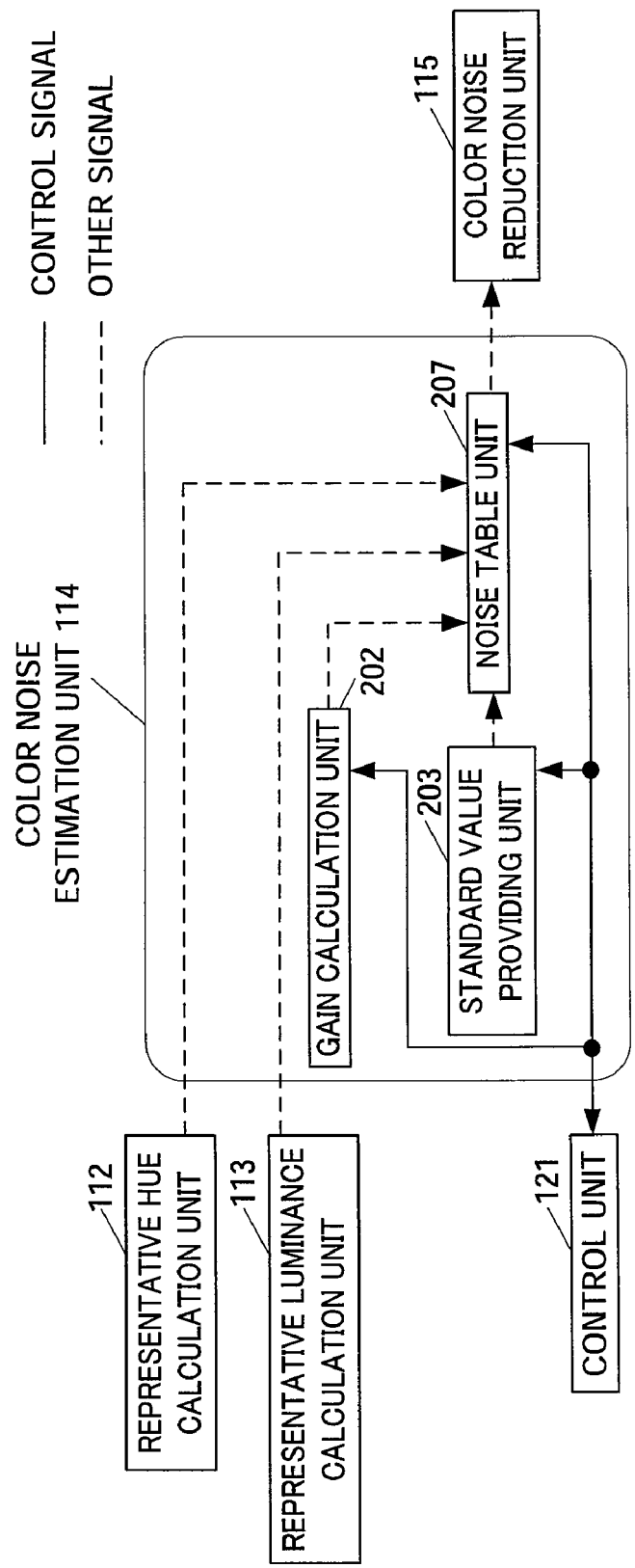
FIG. 6 is another configuration diagram of the color noise estimation unit.

FIG. 6 shows an example of another configuration of the color noise estimation unit 114, which adopts a configuration where the model selection unit 200, the ROM for parameters 201, the parameter selection unit 204, the noise interpolation unit 205, and the noise correction unit 206 in the color noise estimation unit 114 shown in FIG. 4 are omitted and a noise table unit 207 is added. Since the basic configuration of the color noise estimation unit 114 shown in FIG. 6 is equivalent to that shown in FIG. 4, same configuration is assigned with same name and reference numeral. Hereafter, only different portions or parts will be explained.

The representative hue calculation unit 112, the representative luminance calculation unit 113, the gain calculation unit 202, and the standard value providing unit 203 are connected to the noise table unit 207. The noise table unit 207 is connected to the color noise reduction unit 115. The control unit 121 is bi-directionally connected to the noise table unit 207.

The noise table unit 207 reads the representative hue value H of the region from the representative hue calculation unit 112, the representative luminance value L of the region from the representative luminance calculation unit 113, the gain g from the gain calculation unit 202, and the temperature t from the control unit 121 under the control of the control unit 121. The noise table unit 207 includes a lookup table recording a relationship between the temperature, the signal value level and the gain, and the noise amount thereon. The lookup table is established by a method equivalent to the method where the color noise estimation unit 114 shown in FIG. 4 calculates the color noise amount.

The noise table unit 207 obtains the color noise amount $CN_s$ by looking up the lookup table based upon the abovementioned representative hue value H, representative luminance value L, gain g, and temperature t. The color noise amount $CN_s$ obtained at the lookup table unit 207 is transferred to the color noise reduction unit 115.

It is noted that it is unnecessary to obtain information such as the temperature t or the gain g for each shooting in the process of the above-described noise amount calculation. A configuration where arbitrary information (predetermined standard values) in the standard value providing unit 203 in advance is recorded and the calculation process is skipped can be adopted. With such a configuration, high-speed processing, power saving, etc., can be realized.

Figure 7:
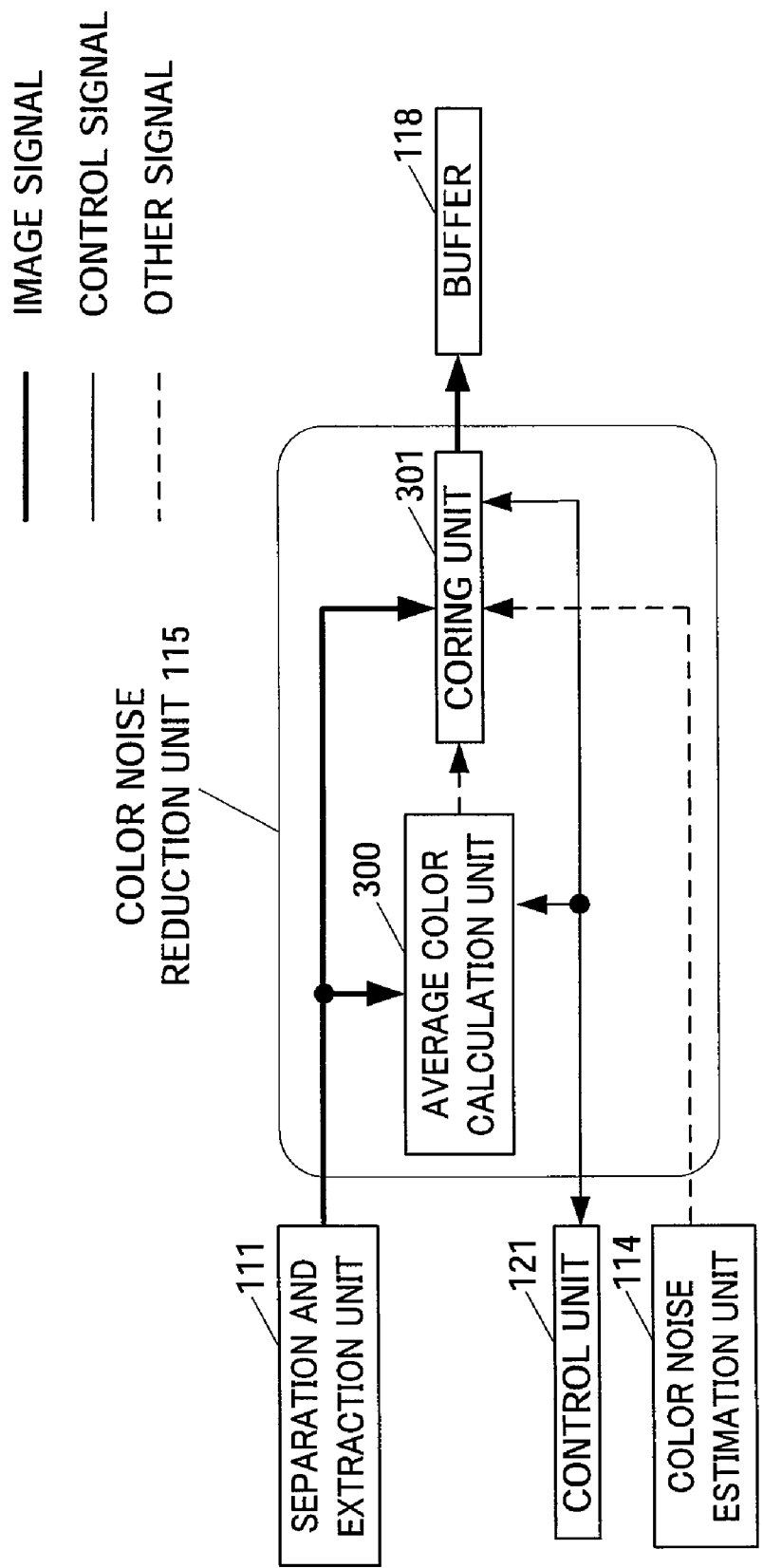
FIG. 7 is a configuration diagram of a color noise reduction unit.

Subsequently, the color noise reduction unit 115 will be explained. FIG. 7 shows an example of a configuration of the color noise reduction unit 115. The color noise reduction unit 115 comprises an average color calculation unit 300 and a coring unit 301.

The separation and extraction unit 111 is connected to the average color calculation unit 300 and the coring unit 301. The color noise estimation unit 114 and the average color calculation unit 300 are connected to the coring unit 301. The coring unit 301 is connected to the buffer 118. The control unit 121 is bi-directionally connected to the average color calculation unit 300 and the coring unit 301.

The average color calculation unit 300 reads the color signals $Cb_{ij}$ and $Cr_{ij}$ from the separation and extraction unit 111 under the control of the control unit 121. Thereafter, the average color calculation unit 300 calculates average values $AV\_Cb$ and $AV\_Cr$ of the color signals shown by the Expressions (4) to transfer them to the coring unit 301.

The coring unit 301 reads the color signals $Cb_{ij}$ and $Cr_{ij}$ from the separation and extraction unit 111, the averages $AV\_Cb$ and $AV\_Cr$ of the color signals from the average color calculation unit 300, and the color noise amount $CN_s$ from the color noise estimation unit 114 under the control of the control unit 121. Thereafter, the coring unit 301 performs coring processing shown by Expressions (10) and Expressions (11) to obtain color signals $Cb'_{ij}$ and $Cr'_{ij}$ which have been subjected to the color noise reduction processing.

$$Cb'_{ij}=Cb_{ij}-CN_{cb}\,(Cb_{ij}\geq AV\_Cb+CN_{cb})$$

$$Cb'_{ij}=AV\_Cb\,(AV\_Cb+CN_{cb}>Cb_{ij}>AV\_Cb-CN_{cb}) \quad (10)$$

$$Cb'_{ij}=Cb_{ij}+CN_{cb}\,(AV\_Cb-CN_{cr}\geq Cb_{ij})$$

$$Cr'_{ij}=Cr_{ij}-CN_{cr}\,(Cr_{ij}\geq AV\_Cr+CN_{cr})$$

$$Cr'_{ij}=AV\_Cr\,(AV\_Cr+CN_{cr}>Cr_{ij}>AV\_Cr-CN_{cr})$$

$$Cr'_{ij}=Cr_{ij}+CN_{cr}\,(AV\_Cr-CN_{cr}\geq Cb_{ij}) \quad (11)$$

The color signals $Cb'_{ij}$ and $Cr'_{ij}$ which have been subjected to the color noise reduction processing are transferred to the buffer 118 to be saved therein.

It is noted that in the abovementioned configuration, reduction of color noise is performed by the coring processing, but the present invention is not necessarily limited to such a configuration. For example, such a configuration that reduction of color noise is performed by performing filtering processing using a low pass filter can be adopted. An example of performing noise reduction by performing the filtering processing using a low-pass filter will be explained with reference to FIG. 8A to FIG. 8C.

Figure 8A:
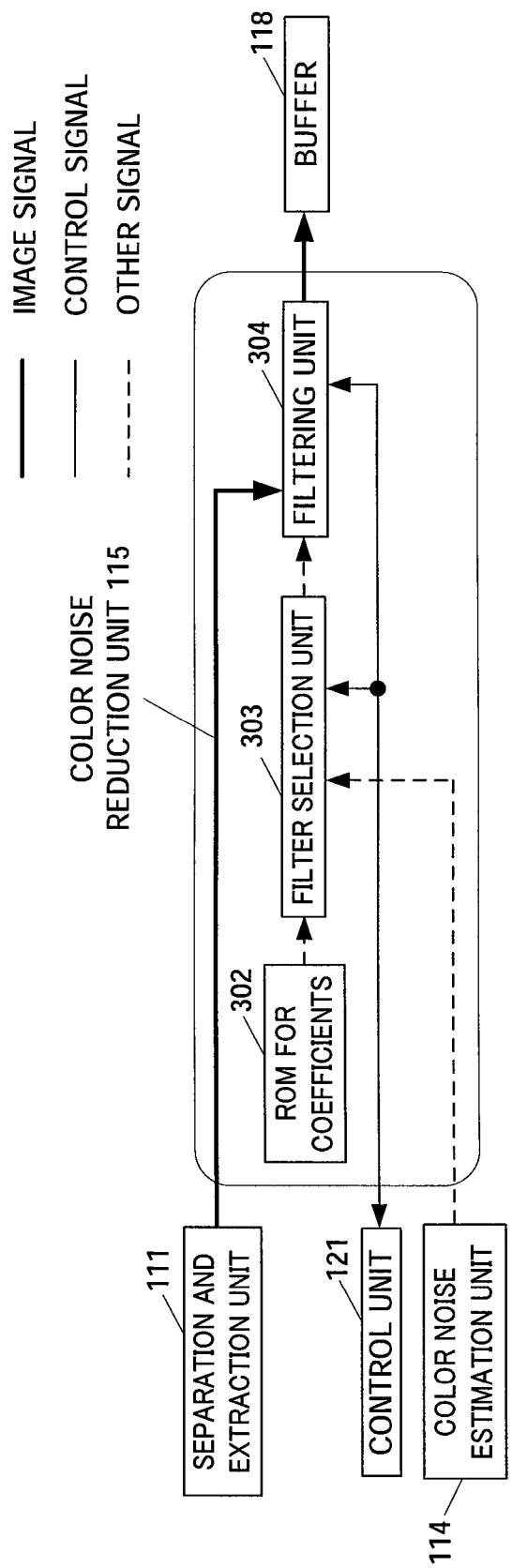
FIG. 8A is a diagram showing an example of another configuration of the color noise reduction unit.

FIG. 8A shows an example of another configuration of the color noise reduction unit 115. It is noted that in the color noise reduction unit 115 shown in FIG. 8A, pixels to be subjected to the color noise reduction processing are 2×2 pixels, as shown in FIG. 2B, but it is assumed that inputting of 4×4 pixels including surrounding pixels is performed for the filtering processing.

The color noise reduction unit 115 comprises a ROM for coefficients 302, a filter selection unit 303, and a filtering unit 304. The color noise estimation unit 114 and the ROM for coefficients 302 are connected to the filter selection unit 303. The separation and extraction unit 111 and the filter selection unit 303 are connected to the filtering unit 304. The filtering unit 304 is connected to the buffer 118. The control unit 121 is bi-directionally connected to the filter selection unit 303 and the filtering unit 304.

The filter selection unit 303 reads the color noise amount $CN_s$ from the color noise estimation unit 114 under the control of the control unit 121. Thereafter, the filter selection unit 303 selects and reads a filter coefficient used for the low pass filtering processing from the ROM for coefficients 302.

Figures 8B, 8C:
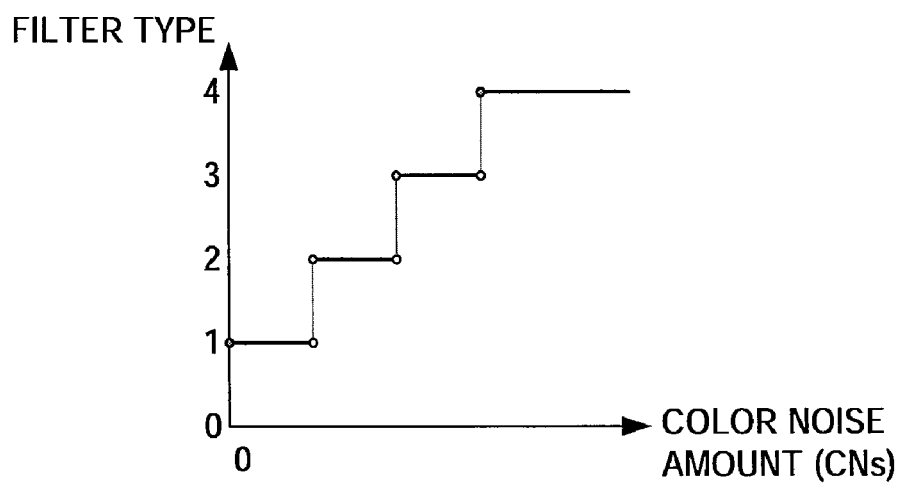
FIG. 8B is a diagram showing an example of filter coefficients recorded in a ROM for coefficients.
FIG. 8C is a diagram showing an example of a relationship between a color noise amount $CN_s$ and types of a filter Type.

FIG. 8B shows an example of filter coefficients recorded in the ROM for coefficients 302, wherein four types of frequency characteristics, Type 1 to Type 4, are recorded, each filter having a size of 3×3 pixels. It is noted that the value of each coefficient in FIG. 8B is multiplied by 128. Type 1 has a frequency characteristic which maintains high frequency components, and the frequency characteristics of Type 1, Type 2, Type 3, and Type 4 are sequentially reduced in high frequency component in this order.

The filter selection unit 303 selects one of the frequency characteristics of Type 1 to Type 4 based upon the color noise amount $CN_s$. For example, the selection is performed based upon a relationship between the color noise amount $CN_s$ and the types of filter (Type) shown in FIG. 8C. The larger the color noise amount $CN_s$ is, the filter characteristic which reduces the high frequency components more is selected. The selected filter coefficient is transferred to the filtering unit 304.

The filtering unit 304 reads the color signals $Cb_{ij}$ and $Cr_{ij}$ and the surrounding pixels from the separation and extraction unit 111 to perform filtering processing using the filter coefficient from the filter selection unit 303 under the control of the control unit 121. The color signals $Cb'_{ij}$ and $Cr'_{ij}$ where the color noise has been reduced by the filtering processing are transferred to the buffer 118 and saved therein.

Figure 9:
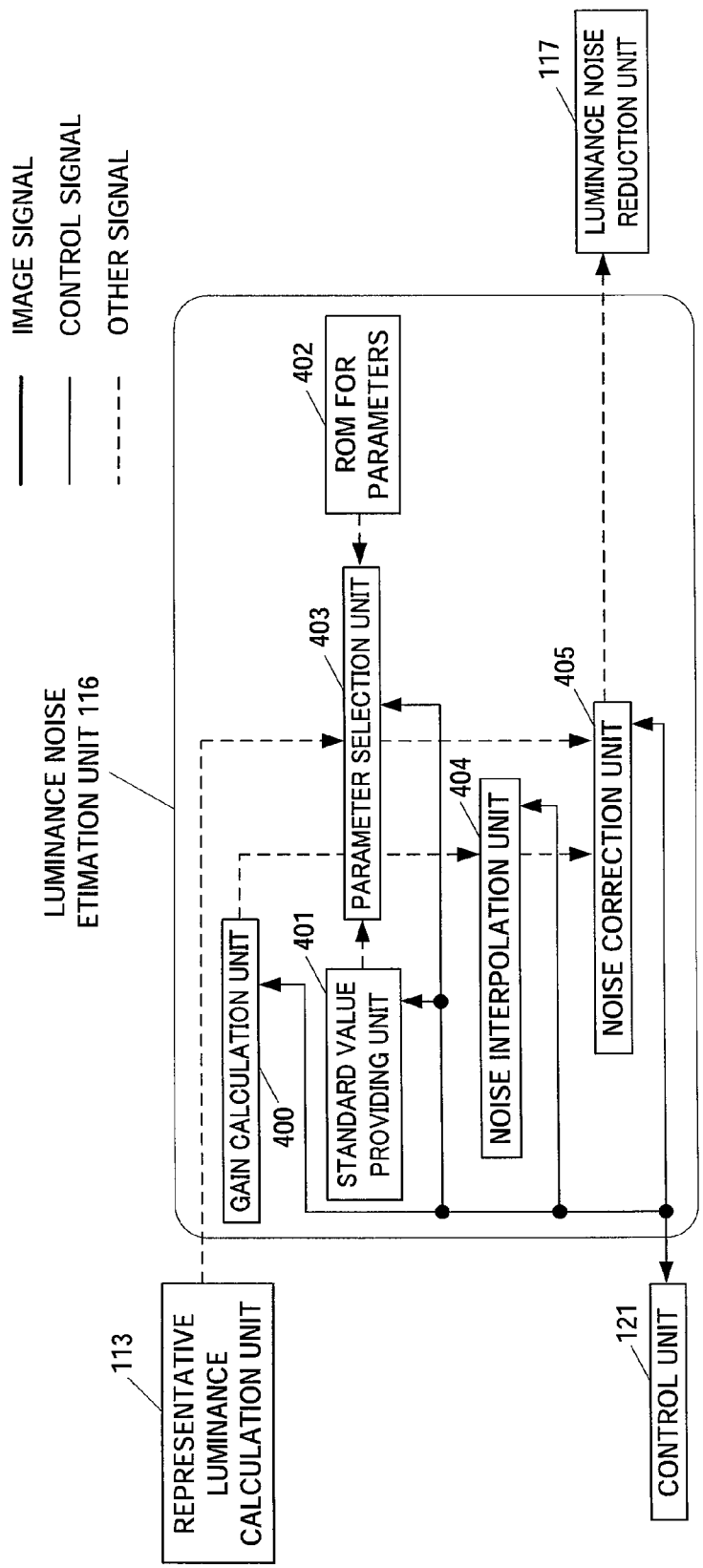
FIG. 9 is a configuration diagram of a luminance noise estimation unit.

FIG. 9 shows an example of a configuration of the luminance noise estimation unit 116. The luminance noise estimation unit 116 comprises a gain calculation unit 400, a standard value providing unit 401, a ROM for parameters 402, a parameter selection unit 403, a noise interpolation unit 404, and a noise correction unit 405.

The representative luminance calculation unit 113, the gain calculation unit 400, the standard value providing unit 401, and the ROM for parameters 402 are connected to the parameter selection unit 403. The parameter selection unit 403 is connected to the noise interpolation unit 404 and the noise correction unit 405. The noise interpolation unit 404 is connected to the noise correction unit 405, and the noise correction unit 405 is connected to the luminance noise reduction unit 117. The control unit 121 is bi-directionally connected to the gain calculation unit 400, the standard value providing unit 401, the parameter selection unit 403, the noise interpolation unit 404, and the noise correction unit 405.

The parameter selection unit 403 reads the representative luminance value L from the representative luminance calculation unit 113 under the control of the control unit 121. The gain calculation unit 400 obtains a gain at the amplifier 104 based upon information regarding the ISO sensitivity and the exposure information transferred from the control unit 121, and transfers the gain to the parameter selection unit 403. Further, the control unit 121 obtains the temperature information of the CCD 102 from the temperature sensor 103 to transfer the same to the parameter selection unit 403.

The parameter selection unit 403 estimates a luminance noise amount LN based upon the representative luminance value L from the representative luminance calculation unit 113, the information of the gain from the gain calculation unit 400, and the temperature information from the control unit 121. An estimation method of the luminance noise amount LN is equivalent to the estimation method of the color noise amount explained with reference to FIG. 5A to FIG. 5D. The luminance noise LN also increases relative to the signal level L in a quadric curve manner like the example of color noise shown in FIG. 5A, and it can be modeled by a quadric function, as shown by Expression (12). In the Expression (12), $\alpha$, $\beta$, and $\gamma$ are constant terms, respectively.

$$LN = \alpha L^2 + \beta L + \gamma \quad (12)$$

However, the luminance noise LN varies according to not only the signal level but also the temperature or the gain of the imaging device. When formulization of a model is performed by assuming the temperature as t and the gain as g, and considering the above, Expression (13) can be obtained.

$$LN = \alpha_{gt} L^2 + \beta_{gt} L + \gamma_{gt} \quad (13)$$

Here, $\alpha_{gt}$, $\beta_{gt}$, and $\gamma_{gt}$ are constant terms corresponding to the gain g and the temperature t, respectively. Recording the function shown by the Expression (13) multiple times and calculating the luminance color noise amount LN by computation in each case are complicated regarding processing as with the color noise. Therefore, simplification of the luminance noise model is performed.

A luminance noise model which provides a maximum luminance noise amount is selected as a reference luminance noise model, and this is approximated by a polygonal line comprising a plurality of straight lines. The inflection points of the polygonal line are represented by coordinate data ($L_n$, $LN_n$) comprising the signal level L and the luminance noise amount LN. Here, "n" indicates the number of inflection points. A correction coefficient $k_{gt}$ for deriving another luminance noise model from the above-described reference luminance noise model is also prepared. The correction coefficient $k_{gt}$ is calculated by the least-squares method between each luminance noise model and the reference luminance noise model. Derivation of another luminance noise model from the reference luminance noise model is achieved by multiplying the reference luminance noise model by the above-described correction coefficient $k_{gt}$.

A method for calculating a luminance noise amount from the simplified luminance noise model is shown below. For example, it is assumed to obtain a luminance noise amount LN corresponding to the given signal level l, gain g, and temperature t. First, a segment of the reference luminance noise model to which the signal level l belongs is searched. Here, it is assumed that the signal level l belongs to the segment between ($L_n$, $LN_n$) and ($L_{n+1}$, $LN_{n+1}$). A reference luminance noise amount $LN_l$ in the reference luminance noise model is obtained by the linear interpolation, as shown by Expression (14).

$$LN_l = \frac{LN_{n+1} - LN_n}{L_{n+1} - L_n}(l - L_n) + LN_n \quad (14)$$

Next, as shown by Expression (15), the luminance noise amount LN is obtained by multiplying the obtained reference luminance noise amount $LN_l$ by the correction coefficient $k_{gt}$.

$$LN = k_{gt} \cdot N_l \quad (15)$$

The ROM for parameters 402 records the coordinate data ($L_n$, $LN_n$) and the correction coefficient $k_{gt}$ of the abovementioned reference luminance noise model therein. The parameter selection unit 403 sets the signal level l from the representative luminance value L obtained from the representative luminance calculation unit 113, the gain g from the gain information obtained from the gain calculation unit 400, and the temperature t from the temperature information obtained from the control unit 121. Next, the parameter selection unit 403 searches the coordinate data ($L_n$, $LN_n$) and ($L_{n+1}$, $LN_{n+1}$) of the segment to which the signal level l belongs from the ROM for parameters 402 to transfer the same to the noise interpolation unit 404. Further, the parameter selection unit 403 searches the correction coefficient $k_{gt}$ from the ROM for parameters 402 to transfer the same to the noise correction unit 405.

The noise interpolation unit 404 calculates a reference luminance noise amount $LN_l$ in the reference luminance noise model based upon the Expression (14) using the signal level l and the coordinate data ($L_n$, $LN_n$) and ($L_{n+1}$, $LN_{n+1}$) of the segment from the parameter selection unit 403 to transfer the same to the noise correction unit 405 under the control of the control unit 121.

The noise correction unit 405 calculates a luminance noise amount LN based upon the Expression (15) using the correction coefficient $k_{gt}$ from the parameter selection unit 403 and the reference luminance noise amount $LN_l$ from the noise interpolation unit 404 under the control of the control unit 121. The above-described luminance noise amount LN is transferred to the luminance noise reduction unit 117.

It is noted that in the process of the luminance noise amount calculation, it is unnecessary to obtain information such as the temperature t or the gain g for each shooting. A configuration where arbitrary information in the standard value providing unit 401 in advance is recorded and the calculating process is skipped can be adopted. With such a configuration, high-speed processing, power saving, etc., can be realized.

It is noted that in the abovementioned configuration, the luminance noise amount is calculated based upon the reference luminance noise model utilizing interpolation operation, but the present invention is not necessarily limited to such a configuration. For example, a configuration using a look up table can be adopted.

Figure 10:
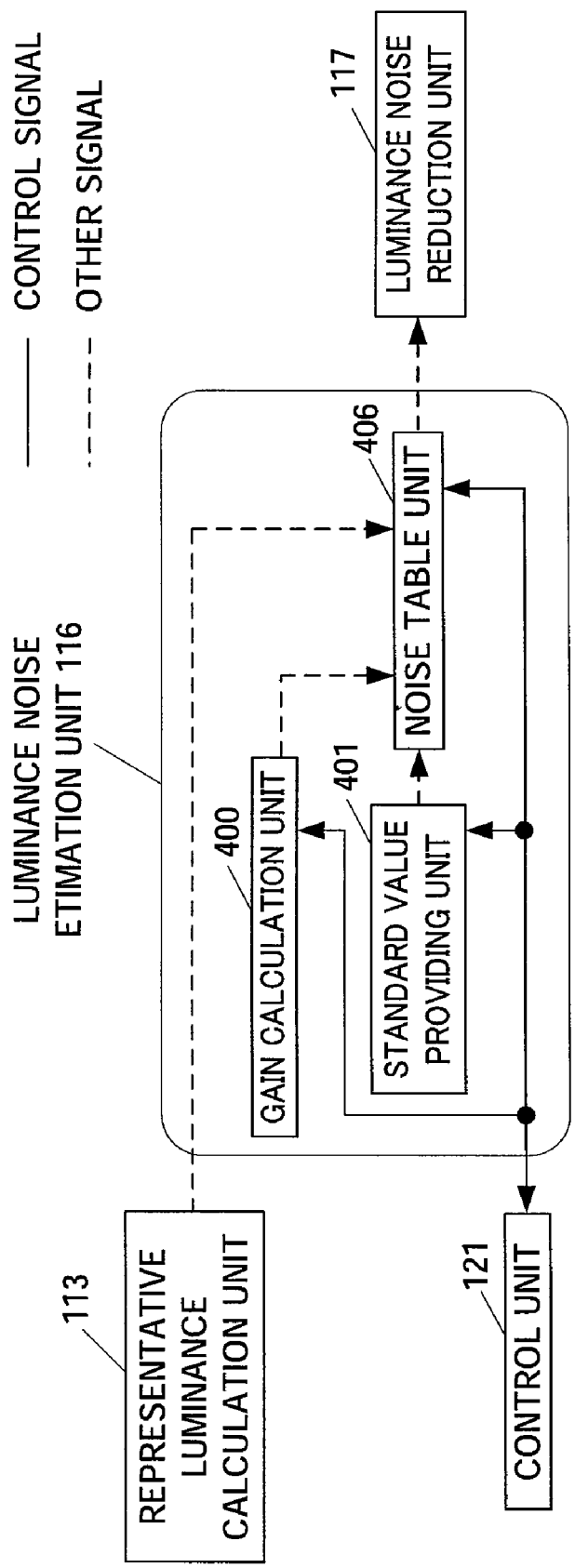
FIG. 10 is another configuration diagram of the luminance noise estimation unit.

FIG. 10 shows an example of another configuration of the luminance noise estimation unit 116, which has a configuration where the ROM for parameters 402, the parameter selection unit 403, the noise interpolation unit 404, and the noise correction unit 405 in the luminance noise estimation unit 116 shown in FIG. 9 are omitted and a noise table unit 406 is added. The basic configuration of the luminance noise estimation unit shown in FIG. 10 is equivalent to that of the luminance noise estimation unit 116 shown in FIG. 9, and same configuration is assigned with same name and reference numeral. Only different portions or configurations will be explained below.

The representative luminance calculation unit 113, the gain calculation unit 400, and the standard value providing unit 401 are connected to the noise table unit 406. The noise table unit 406 is connected to the luminance noise reduction unit 117. The control unit 121 is bi-directionally connected to the noise table unit 406.

The noise table unit 406 reads the representative luminance value L of the region from the representative luminance calculation unit 113, the gain g from the gain calculation unit 400, and the temperature t from the control unit 121 under the control of the control unit 121. The noise table unit 406 includes a look up table recording therein a relationship between the temperature, the signal value level, and the gain, and the noise amount. The look up table is established by a method equivalent to the method where the luminance noise estimation unit 116 shown in FIG. 9 calculates the luminance noise amount LN.

The noise table unit 406 obtains the luminance noise amount LN by looking up the look up table based upon the representative luminance value L, the gain g, and the temperature t. The luminance noise amount LN obtained at the noise table unit 406 is transferred to the luminance noise reduction unit 117.

It is noted that in the process of the luminance noise amount calculation, it is unnecessary to obtain information such as the temperature t or the gain g for each shooting. A configuration where arbitrary information (predetermined standard values) in the standard value providing unit 401 in advance is recorded and the calculating process is skipped can be adopted.

Figure 11:
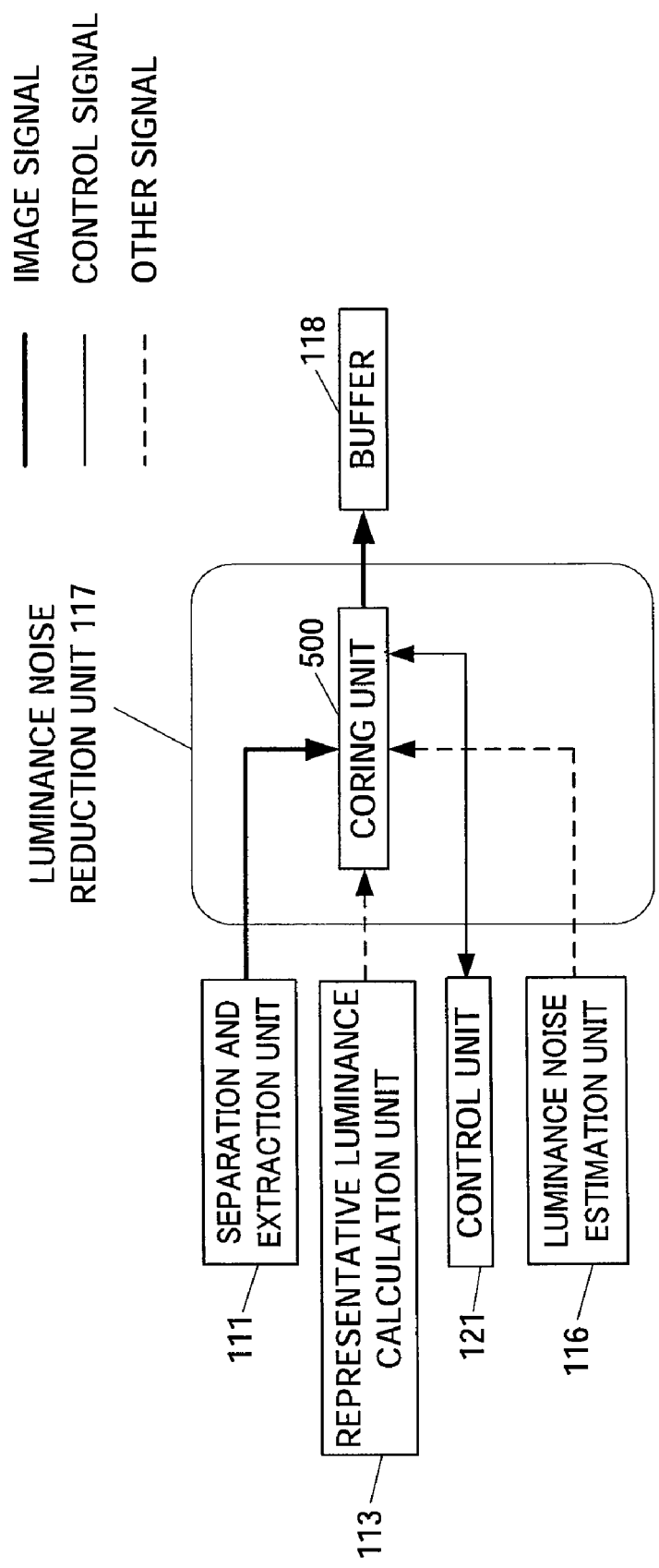
FIG. 11 is a configuration diagram of a luminance noise reduction unit.

Subsequently, the luminance noise reduction unit 117 will be explained. FIG. 11 shows an example of a configuration of the luminance noise reduction unit 117. The luminance noise reduction unit 117 comprises a coring unit 500. The separation and extraction unit 111, the representative luminance calculation unit 113, and the luminance noise estimation unit 116 are connected to the coring unit 500. The coring unit 500 is connected to the buffer 118. The control unit 121 is bi-directionally connected to the coring unit 500.

The coring unit 500 reads the luminance signal $Y_{ij}$ from the separation and extraction unit 111, the representative luminance value L from the representative luminance calculation unit 113, the luminance noise amount LN from the luminance noise estimation unit 116 under the control of the control unit 121. Thereafter, the coring unit 500 performs coring processing shown by Expressions (16) to obtain a luminance signal $Y'_{ij}$ which has been subjected to the luminance noise reduction processing.

$$Y'_{ij}=Y_{ij}-LN(Y_{ij} \geq L+LN)$$

$$Y'_{ij}=L \ (L+LN>Y_{ij}>L-LN)$$

$$Y'_{ij}=Y_{ij}+LN(L-LN \geq Y_{ij}) \tag{16}$$

The luminance signal $Y'_{ij}$ which has been subjected to the luminance noise reduction processing is transferred to the buffer 118 to be saved therein.

It is noted that in the above-described configuration, reduction of luminance noise is performed by the coring processing, but the present invention is not necessarily limited to such a configuration. For example, a configuration performing reduction of luminance noise by performing filtering processing using a low pass filter can be adopted.

Figure 12:
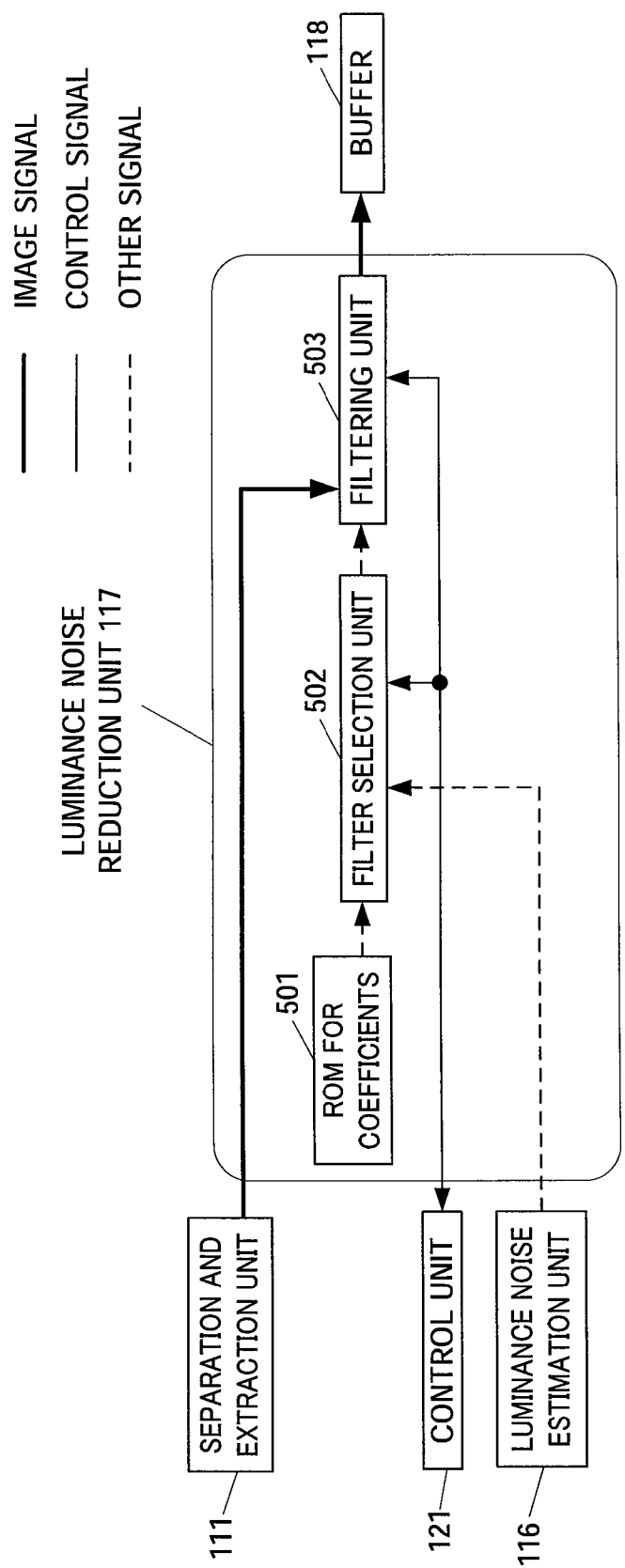
FIG. 12 is another configuration diagram of the luminance noise reduction unit.

FIG. 12 shows an example of another configuration of the luminance noise reduction unit 117. It is noted that in the luminance noise reduction unit 117 shown in FIG. 17, pixels to be subjected to the luminance noise reduction processing are 2×2 pixels, as shown in FIG. 2B, but it is assumed that input of 4×4 pixels including surrounding pixels is performed for the filtering processing.

The luminance noise reduction unit 117 comprises a ROM for coefficients 501, a filter selection unit 502, and a filtering unit 503. The luminance noise estimation unit 116 and the ROM for coefficients 501 are connected to the filter selection unit 502. The separation and extraction unit 111 and the filter selection unit 502 are connected to the filtering unit 503. The filtering unit 503 is connected to the buffer 118. The control unit 121 is bi-directionally connected to the filter selection unit 502 and the filtering unit 503. It is noted that in the configuration of the luminance noise reduction unit 117 shown in FIG. 12, input from the representative luminance calculation unit 113 shown in FIG. 1 is not required, so that the representative luminance calculation unit 113 is omitted.

The filter selection unit 502 reads the luminance noise amount LN from the luminance noise estimation unit 116 under the control of the control unit 121. Thereafter, the filter selection unit 502 selects and reads a filter coefficient used for the low pass filter processing from the ROM for coefficients 501 based upon the above-described luminance noise amount LN. As the filter coefficients, coefficients shown in FIG. 8B and so on are used. The filter selection unit 502 selects the filter coefficient based upon the luminance noise amount LN. The selection is performed in the same manner as the relationship between the color noise amount and the types of filter shown in FIG. 8C. The selected filter coefficient is transferred to the filtering unit 503.

The filtering unit 503 reads the luminance signal $Y_{ij}$ and the surrounding pixels from the separation and extraction unit 111 to perform filtering processing using the filter coefficient from the filter selection unit 502 under the control of the control unit 121. A luminance signal $Y'_{ij}$ which has been reduced in luminance noise by the filtering processing is transferred to the buffer 118 to be saved therein.

According to the configuration of the above-described first embodiment, an image processing apparatus which obtains the representative luminance value and the representative hue value for each predetermined region and obtains a color noise amount adaptively based upon the representative luminance value and the representative hue value can be provided. Thereby, it is made possible to perform high-accuracy color noise reduction processing so that a high quality image signal can be obtained.

Since the above-described estimation processing of the color noise amount dynamically adapts to difference conditions corresponding to respective shooting and uses different reference color noise models corresponding to respective hue regions, it becomes possible to perform high-accuracy and stable estimation of color noise amount. Furthermore, when the interpolation operation is used for calculation of the color noise amount, implementation of the interpolation operation is easy and it becomes possible to achieve cost reduction of an image processing apparatus. On the other hand, when the look up table is used for calculation of the color noise amount, it becomes possible to perform high-speed estimation of color noise amount.

When the coring processing is used for the color noise reduction processing, since only color noise components can be preponderantly reduced and continuity with pixels other than color noise, such as edges can be secured, high-quality image signal can be obtained. On the other hand, when the filtering processing is used for the color noise reduction processing, only the color noise components can be reduced preponderantly and a high-quality image signal can be obtained. Implementation of the low pass filter is relatively easy, so that it is made possible to achieve high speed and cost reduction of the whole image processing apparatus.

Furthermore, it is made possible to perform high-accuracy luminance noise reduction processing by adaptively estimating the luminance noise amount based upon the representative luminance value, so that a high-quality image signal can be obtained. Since the above-described estimation processing of the luminance noise amount dynamically applies to different conditions corresponding to respective shootings and uses the reference luminance noise models, it becomes possible to perform high-accuracy and stable estimation of a luminance noise amount. When the interpolation operation is used for calculation of the luminance noise amount, implementation of the interpolation operation is easy, so that it becomes possible to achieve cost reduction of the image processing apparatus. On the other hand, when the look up table is used for calculation of the luminance noise amount, it becomes possible to perform high-speed estimation of the luminance noise amount.

When the coring processing is used for the luminance noise reduction processing, only the luminance noise components can be reduced preponderantly and continuity with pixels other than the luminance noise, such as edges can be secured, so that a high-quality image signal can be obtained. On the other hand, when the filtering processing is used for the luminance noise reduction processing, only the luminance noise components can be reduced preponderantly and a high-quality image signal can be obtained. Implementation of the low pass filter is relatively easy so that it becomes possible to achieve high speed and cost reduction of the whole image processing apparatus.

Further, since an imaging device having a Bayer type primary color filter arranged on a front face thereof is used, it has high compatibility with the present imaging system, and it becomes possible to obtain a combination with various systems.

It is noted that in the above-described first embodiment, the configuration using the Bayer type primary color filter as the imaging device is adopted, but the present invention is not necessarily limited to such a configuration. For example, it is also possible to use a color difference line sequential complementary color filter shown in FIG. 13A and it is also possible to utilize a two CCD imaging device or a three CCD imaging device.

Figures 13A, 13B:
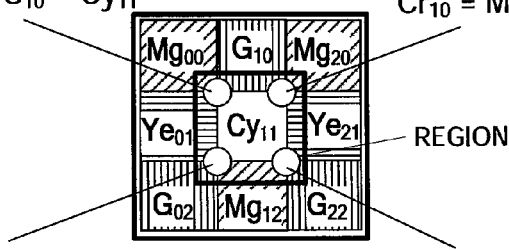
FIG. 13A is a diagram showing a configuration of a color difference line sequential complementary color filter.
FIG. 13B is an explanatory diagram illustrating separation into a luminance signal and a color signal and extraction of a region.

FIG. 13A shows a configuration of the color difference line sequential complementary color filter. A color difference line sequential system includes 2×2 pixels as a base unit, where magenta (Mg), green (G), yellow (Ye), and cyan (Cy) are arranged one pixel by one pixel. However, positions of Mg and G are reversed in every two adjacent lines. In the color difference line sequential complementary color filter, the separation and extraction unit 111 calculates a luminance signal Y and color signals Cb and Cr for each 2×2 pixels. For example, regarding 2×2 pixels of $Mg_{00}$, $G_{10}$, $Ye_{01}$, and $Cy_{11}$, a luminance signal $Y_{00}$ and color signals $Cb_{00}$ and $Cr_{00}$ are calculated as shown by Expressions (17).

$$Y_{00}=Mg_{00}+G_{10}+Ye_{01}+Cy_{11}$$

$$Cb_{00}=Mg_{00}+Cy_{11}-G_{10}-Ye_{01}$$

$$Cr_{00}=Mg_{00}+Ye_{01}-G_{10}-Cy_{11} \qquad (17)$$

Furthermore, as a region to be subjected to noise reduction processing, 2×2 pixels are used regarding a set of the luminance signal Y and the color signals Cb and Cr.

It is noted that in the abovementioned embodiment, the average of color signals shown by the Expressions (2) is used to calculate the representative hue value H at the representative hue calculation unit 112 and the average of luminance signals shown by the Expression (3) is used to calculate the representative luminance value L at the representative luminance calculation unit 113, but the present invention is not necessarily limited to such a configuration. For example, it is also possible to adopt a configuration using low frequency components obtained by low pass filter processing or a configuration using adaptive filter processing such as a Bilateral filter. In this case, calculation accuracy and stability of the representative hue value H and the representative luminance value L are improved so that it becomes possible to achieve high-accuracy estimation of color and luminance noise amounts.

Furthermore, in the above-described embodiment, the processing to one image signal has been explained, but it is made possible to apply the present invention to a moving picture processing by continuously performing the above processing.

Furthermore, in the above-described first embodiment, as the configuration for performing the noise reduction processing, a configuration integrated with the shooting unit comprising the lens system 100, the aperture 101, the CCD 102, the temperature sensor 103, the amplifier 104, the A/D converter 105, the pre-white balance adjustment unit 107, the exposure control unit 108, the focus control unit 109, and the AF motor 110 is adopted, but the present invention is not necessarily limited to such a configuration. For example, as shown in FIG. 14, it is possible to obtain an image signal taken in by a separate imaging unit and recorded in an unprocessed Raw data aspect accompanying information such as information for the color filter of the CCD 102 or exposure information at the shooting time in a header section thereof and perform processing to the image signal.

Figure 14:
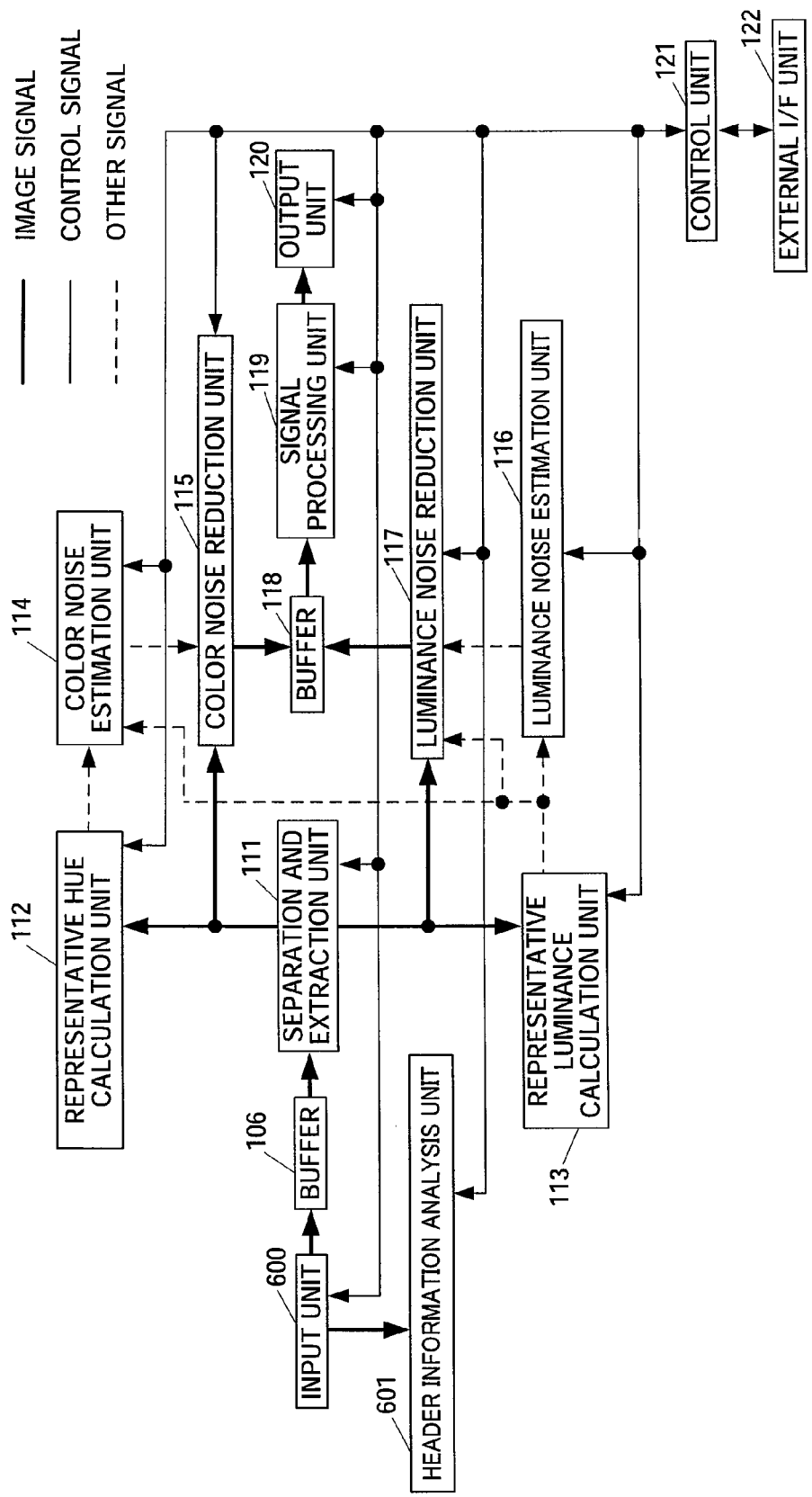
FIG. 14 is another configuration diagram of the image processing apparatus according to the first embodiment.

FIG. 14 shows a configuration where the lens system 100, the aperture 101, the CCD 102, the temperature sensor 103, the amplifier 104, the A/D converter 105, the pre-white balance adjustment unit 107, the exposure control unit 108, the focus control unit 109, and the AF motor 110 are omitted from the configuration shown in FIG. 1 and an input unit 600 and a header information analysis unit 601 are added. The basic configuration shown in FIG. 14 is equivalent to that shown in FIG. 1, and same configuration is assigned with same name and reference numeral. Hereafter, only different parts or configurations will be described.

The input unit 600 is connected to the buffer 106 and the header information analysis unit 601. The control unit 121 is bi-directionally connected to the input unit 600 and the header information analysis unit 601. An image signal and header information saved in the recording medium are read from the input unit 600 by starting playback operation via the external I/F unit 122 such as a mouse or a keyboard.

The image signal from the input unit 600 is transferred to the buffer 106 and the header information is transferred to the header information analysis unit 601. The header information analysis unit 601 extracts information at the shooting time from the header information to transfer the same to the control unit 121. The processing performed thereafter is equivalent to the processing performed in the configuration shown in FIG. 1.

Moreover, though the above-described embodiment is premised on processing performed by the hardware, the present invention is not necessarily limited to such a configuration. For example, a configuration where the image signal from the CCD 102 is output as unprocessed Raw data, accompanying information such as information on the color filter of the CCD 102 or the exposure information at the shooting time is output as the header information from the control unit 121, and the unprocessed Raw data and the header information are processed by software can be adopted.

Figure 15A:
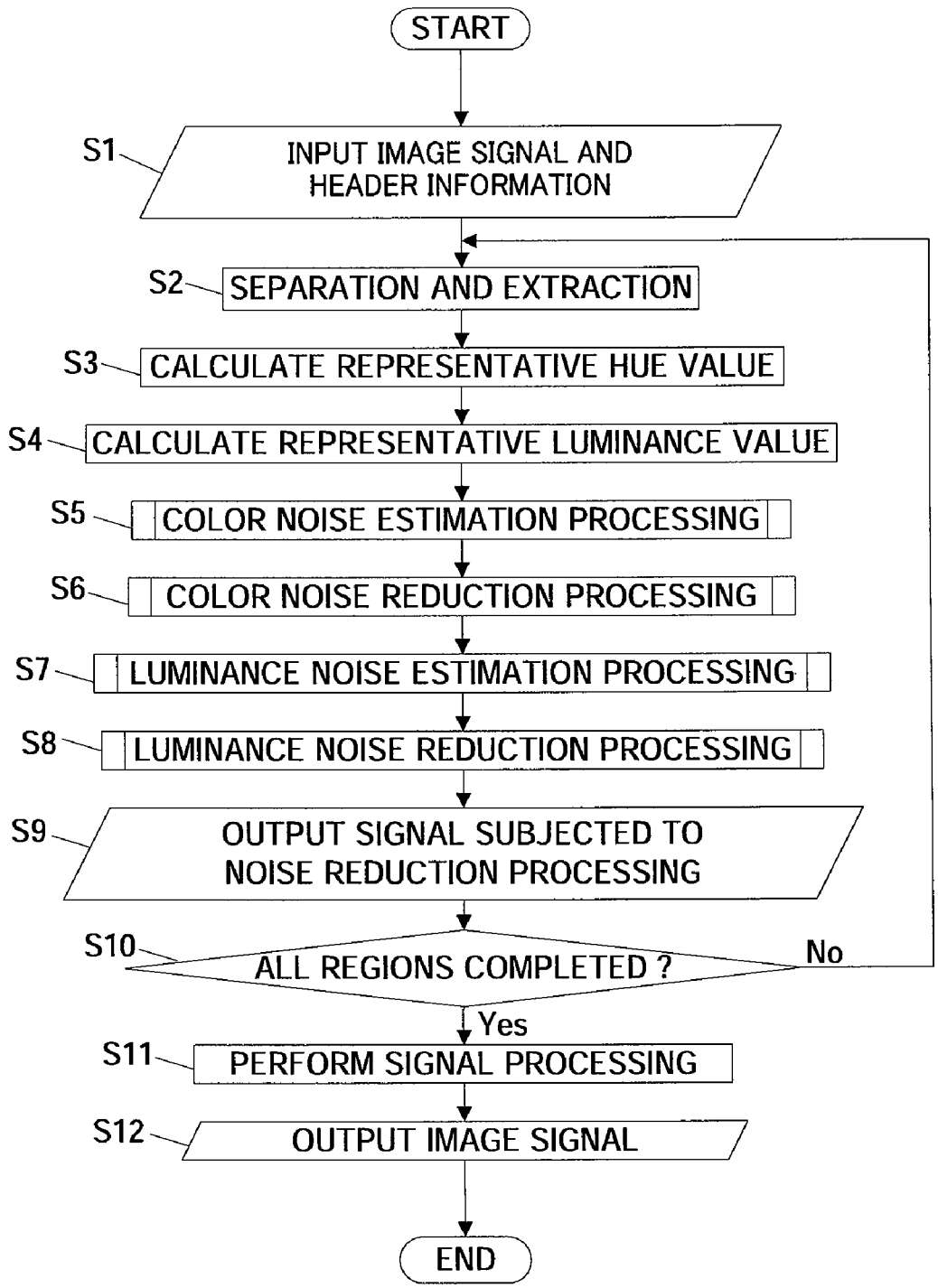
FIG. 15A is a flowchart of the overall processing of flows of signal processing according to the first embodiment.

FIG. 15A shows a flow of software processing in the case of causing a computer to execute the above-described signal processing. Hereafter, the processing in each step will be described.

At step S1, the image signal and the header information such as information on the color filter or exposure information at the shooting time are read and the processing proceeds to step S2. At step S2, the image signal is separated into the luminance signal and the color signals, as shown by the Expressions (1) and respective separated signals are sequentially extracted, for example, for each region of 2×2 pixels, and the processing proceeds to step S3. At step S3, average of color signals shown by the Expressions (2) is obtained and classification to the color regions shown in TABLE 1 is performed, so that the representative hue value is obtained.

At step S4, the representative luminance value is obtained by obtaining average of the luminance signals shown by the Expressions (3), and the processing proceeds to step S5. At step S5, the estimation processing of the color noise amount is performed. This processing is performed according to the flow shown in FIG. 15B described later.

At step S6, the reduction processing of the color noise is performed. This processing is performed according to the flow shown in FIG. 15C described later.

At step S7, the estimation processing of the luminance noise amount is performed. This processing is performed according to the flow shown in FIG. 15D described later.

At step S8, the reduction processing of the luminance noise is performed. This processing is performed according to the flow shown in FIG. 15E described later.

At step S9, the color signals and the luminance signal which have been subjected to the noise reduction processing are output, and the processing proceeds to step S10. At step 10, determination is made about whether processing to all regions on one field signal have been completed, and the processing proceeds to step S2 when the determination is negative, while the processing proceeds to step S11 when the determination is affirmative.

At step S11, conversion to an original image signal of the shooting system is performed, known emphasis processing, tone processing, compression processing, etc., are performed to the original image signal, and the processing proceeds to step S12. At step S12, the image signal whose processing has been completed is output and the processing is terminated.

Figure 15B:
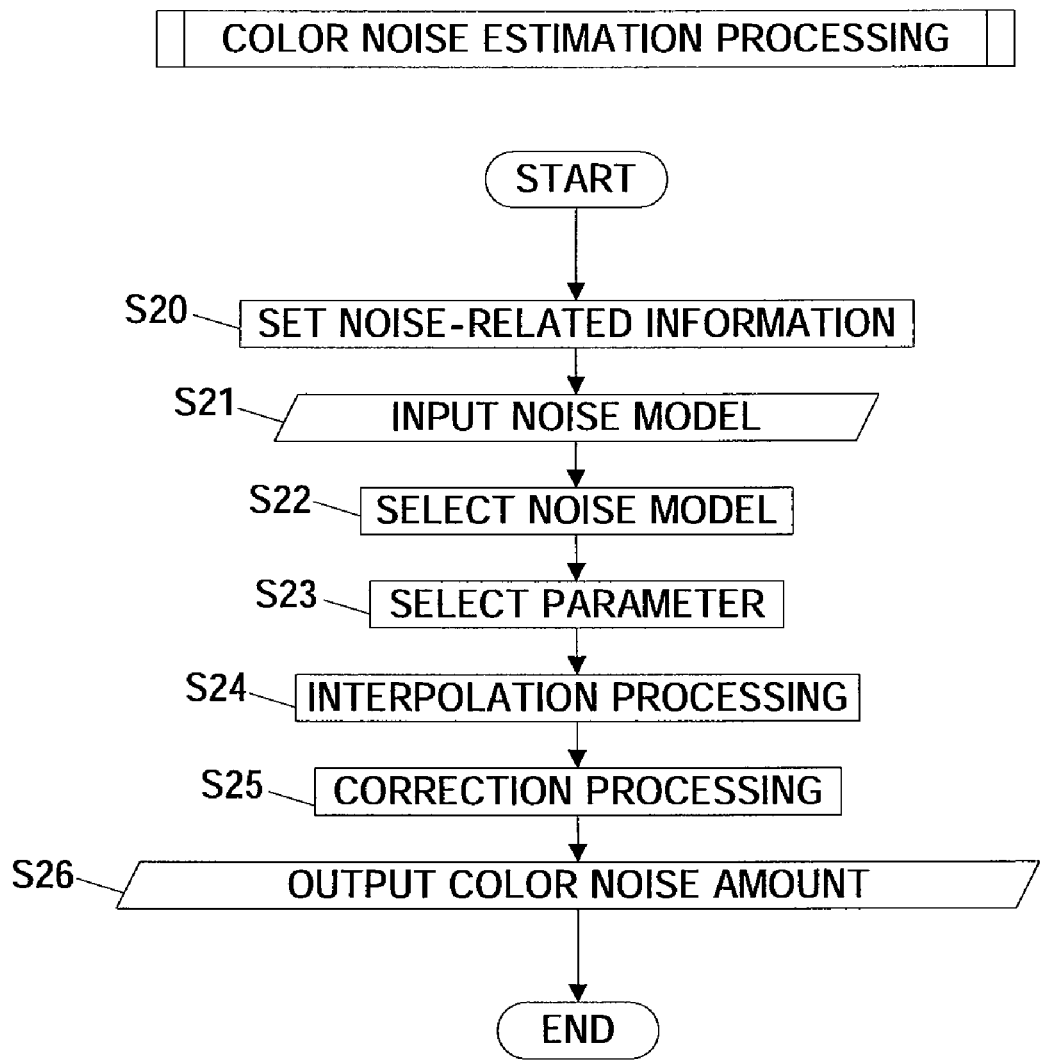
FIG. 15B is a flowchart of color noise estimation processing of the flow of signal processing.

FIG. 15B shows a flow of the color noise estimation processing performed at step S5 shown in FIG. 15A. Hereafter, the processing in each step will be described.

At step S20, information on the temperature or the gain is set from the read header information, and the processing proceeds to step S21. However, when a necessary parameter does not exist in the header information, a predetermined standard value is assigned to the parameter. At step S21, a plurality of reference color noise models and correction coefficients to all the hue regions are input and the processing proceeds to step S22.

At step S22, the reference color noise model and the correction coefficient are selected based upon the representative hue value and the processing proceeds to step S23. At step S23, the coordinate data of the segment of the reference color noise model to which the representative luminance value belongs and the correction coefficient corresponding thereto are selected and the processing proceeds to step S24. At step S24, the reference color noise amount is obtained by the interpolation processing shown by the Expressions (8) and the processing proceeds to step S25.

At step 25, the color noise amount is obtained by the interpolation processing shown by the Expressions (9) and the processing proceeds to step S26. At step S26, the color noise amount is output and the processing is terminated.

Figure 15C:
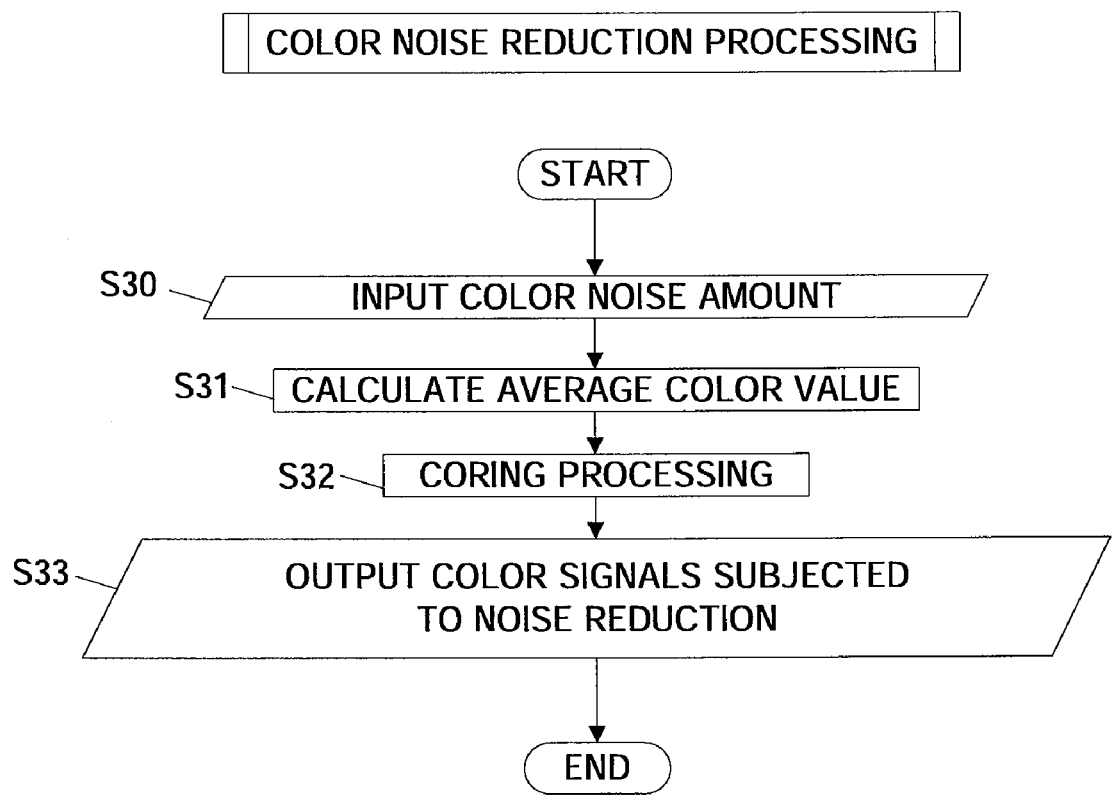
FIG. 15C is a flowchart of color noise reduction processing of the flow of the signal processing.

FIG. 15C shows a flow of the color noise reduction processing performed at step S6 shown in FIG. 15A. Hereafter, the processing in each step will be described.

At step S30, the color noise amount estimated at step S5 shown in FIG. 15A is input and the processing proceeds to step S31. At step S31, average of the color signals shown by the Expressions (2) is calculated and the processing proceeds to step S32. At step S32, the coring processing shown by the Expressions (10) and the Expression (11) is performed and the processing proceeds to step S33. At step S33, the color signals which have been subjected to the color noise reduction processing is output and the processing is terminated.

Figure 15D:
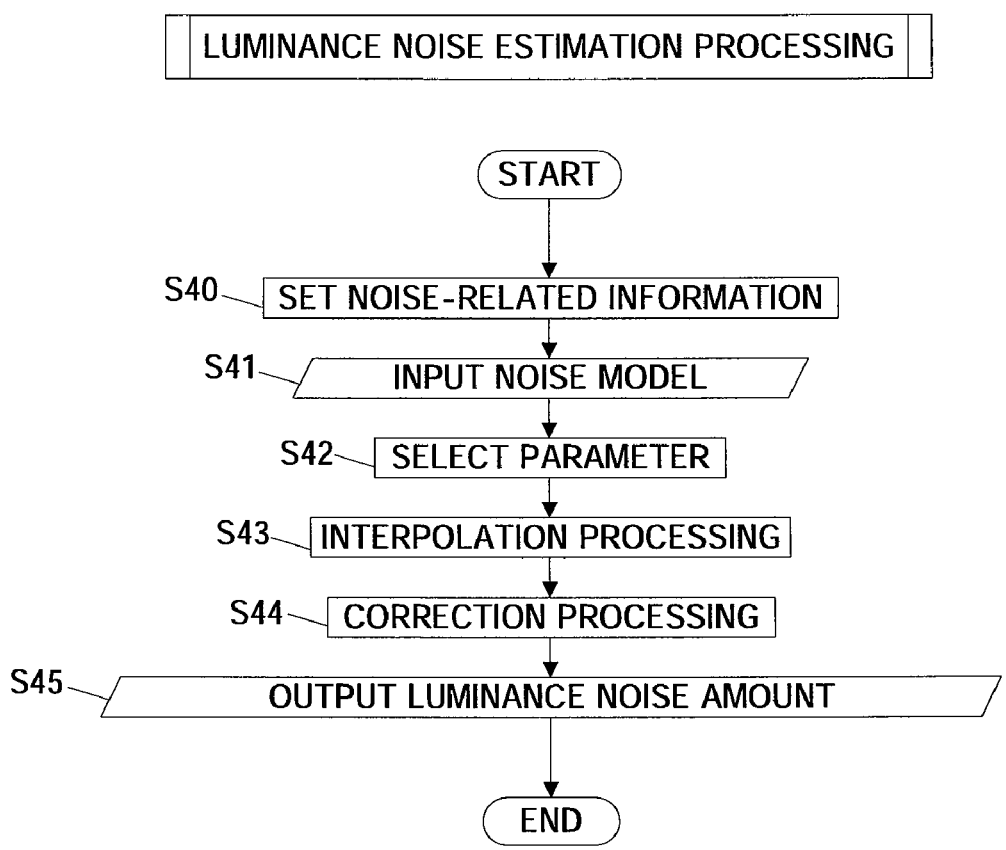
FIG. 15D is a flowchart of luminance noise estimation processing of the flow of the signal processing.

FIG. 15D shows a flow of the luminance noise estimation processing performed at step S7 shown in FIG. 15A. Hereafter, the processing in each step will be described.

At step S40, information such as the temperature or the gain is set from the read header information. However, when a necessary parameter is not included in the header information, a predetermined standard value is assigned. At step S41, the reference luminance noise model and the correction coefficient are input and the processing proceeds to step 42.

At step S42, the coordinate data of the segment of the reference luminance noise model to which the representative luminance value belongs and the correction coefficient corresponding thereto are selected and the processing proceeds to step S43. At step S43, the reference luminance noise amount is obtained by the interpolation processing shown by the Expression (14) and the processing proceeds to step S44. At step S44, the luminance noise amount is obtained by the correction processing shown by the Expression (15) and the processing proceeds to step S45. At step S45, the luminance noise amount is output and the processing is terminated.

Figure 15E:
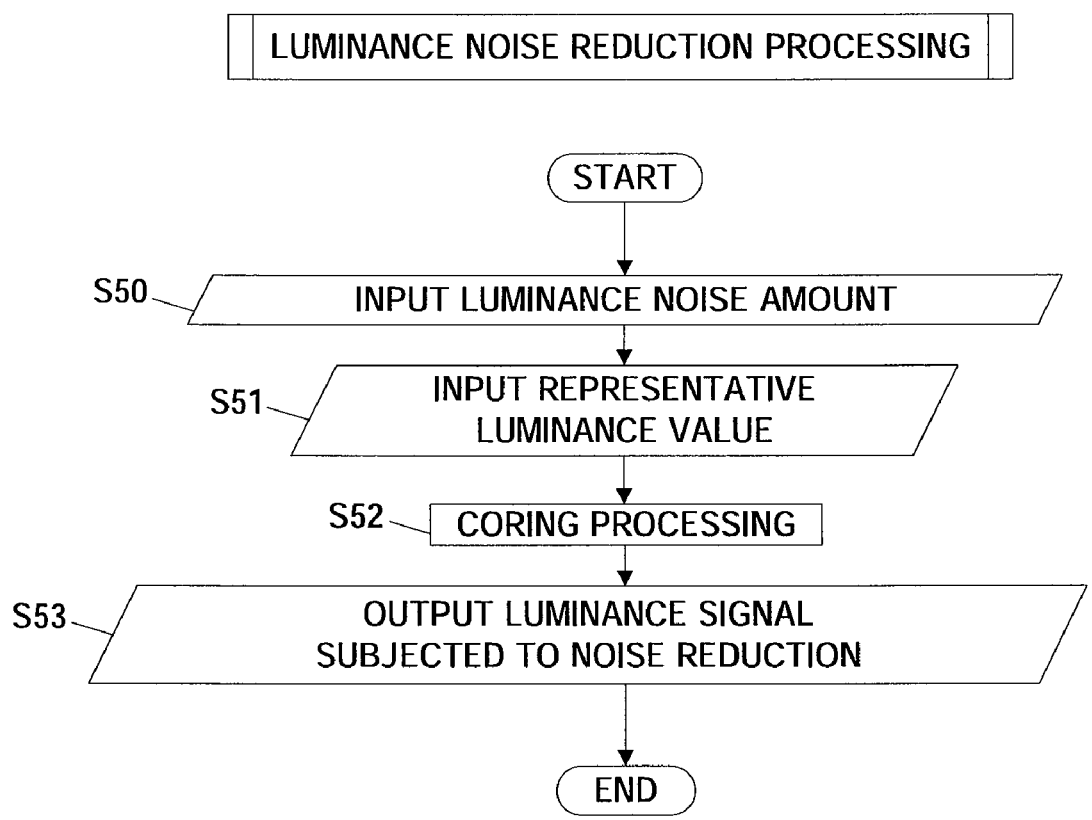
FIG. 15E is a flowchart of luminance noise reduction processing of the flow of the signal processing.

FIG. 15E shows a flow of the luminance noise reduction processing performed at step S8 shown in FIG. 15A. Hereafter, the processing in each step will be described.

At step S50, the luminance noise amount estimated at step S7 shown in FIG. 15A is input and the processing proceeds to step S51. At step S51, the representative luminance value is input and the processing proceeds to step S52. At step S52, the coring processing shown by the Expressions (16) is performed and the processing proceeds to step S53. At step S53, the luminance signal which has been subjected to the luminance noise reduction processing is output and the processing is terminated.

The configuration which performs the signal processing by software in this manner can be adopted, and it is possible to achieve the same function and effect as the case where the processing is performed by hardware.

[Second Embodiment]

Now, a second embodiment of the present invention will be explained.

Figure 16:
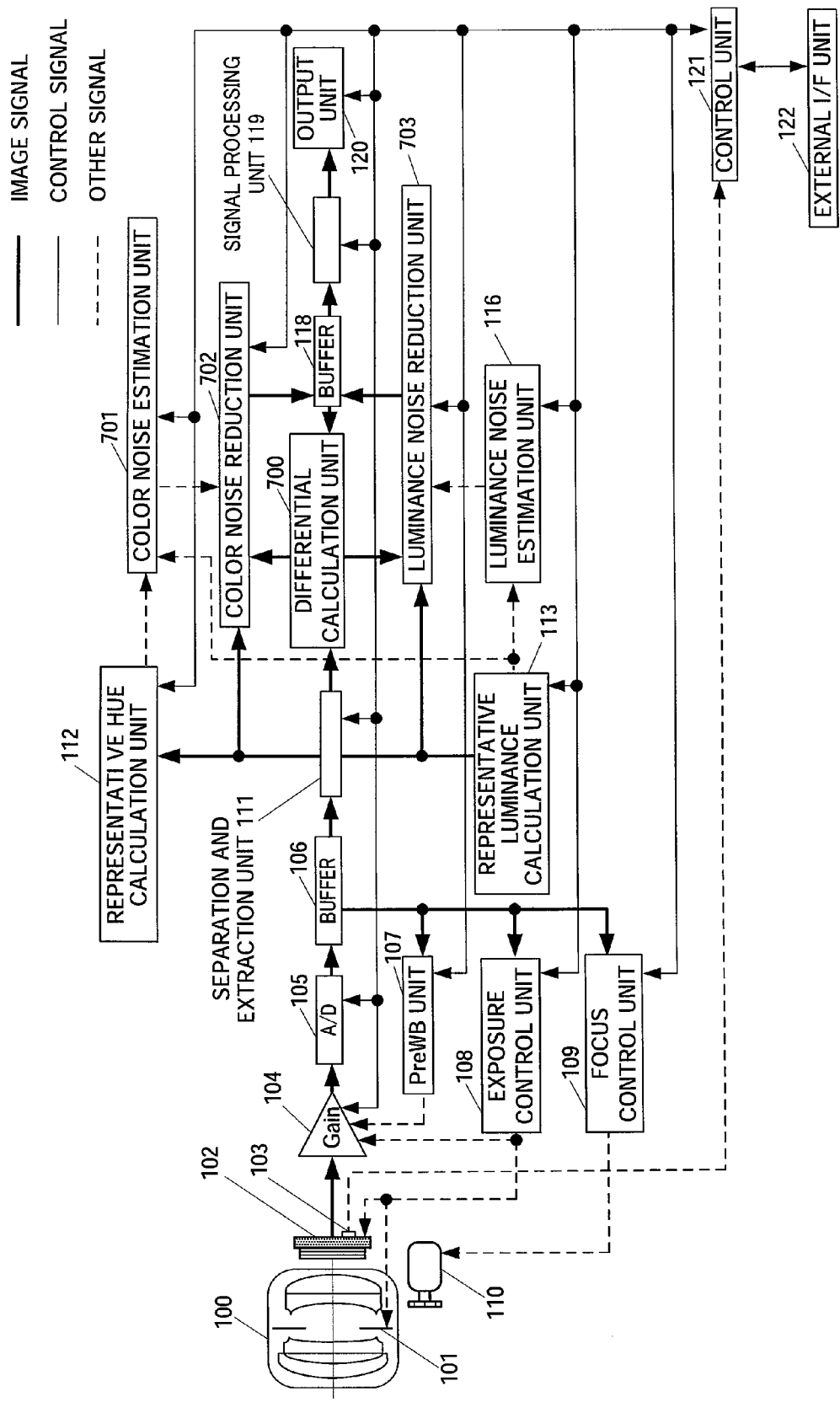
FIG. 16 is a diagram for explaining a configuration of an image processing apparatus according to a second embodiment.

FIG. 16 is a configuration diagram of an image processing apparatus according to the second embodiment. The image processing apparatus according to the second embodiment has a configuration where a differential calculation unit 700 is added and the color noise estimation unit 114, the color noise reduction unit 115, and the luminance noise reduction unit 117 are replaced with a color noise estimation unit 701, a color noise reduction unit 702, and a luminance noise reduction unit 703, respectively, in the configuration of the image processing apparatus according to the first embodiment shown in FIG. 1. The basic configuration of the second embodiment is equivalent to that of the first embodiment, and same configuration is assigned with same name and reference numeral. Hereafter, only different portions will be explained.

The separation and extraction unit 111 is connected to the representative hue calculation unit 112, the representative luminance calculation unit 113, the differential calculation unit 700, the color noise reduction unit 702, and the luminance noise reduction unit 703. The representative hue calculation unit 112 is connected to the buffer 118 via the color noise estimation unit 701 and the color noise reduction unit 702.

The representative luminance calculation unit 113 is connected to the color noise estimation unit 701 and the luminance noise estimation unit 116. The luminance noise estimation unit 116 is connected to the buffer 118 via the luminance noise reduction unit 703. The buffer 118 is connected to the signal processing unit 119 and the differential calculation unit 700. The differential calculation unit 700 is connected to the color noise reduction unit 702 and the luminance noise reduction unit 703. The control unit 121 is bi-directionally connected to the differential calculation unit 700, the color noise estimation unit 701, the color noise reduction unit 702, and the luminance noise reduction unit 703.

Then, the contents of the signal processing will be explained. As the second embodiment is basically equivalent to the first embodiment, only different portions will be explained.

The flow of an image signal will be explained with reference to FIG. 16. A shooting mode is started by pressing a shutter release button via the external I/F unit 122. An image signals taken in through the lens system 100, the aperture 101, and the CCD 102 is continuously output at a predetermined time interval as an analog signal.

Figure 17A:
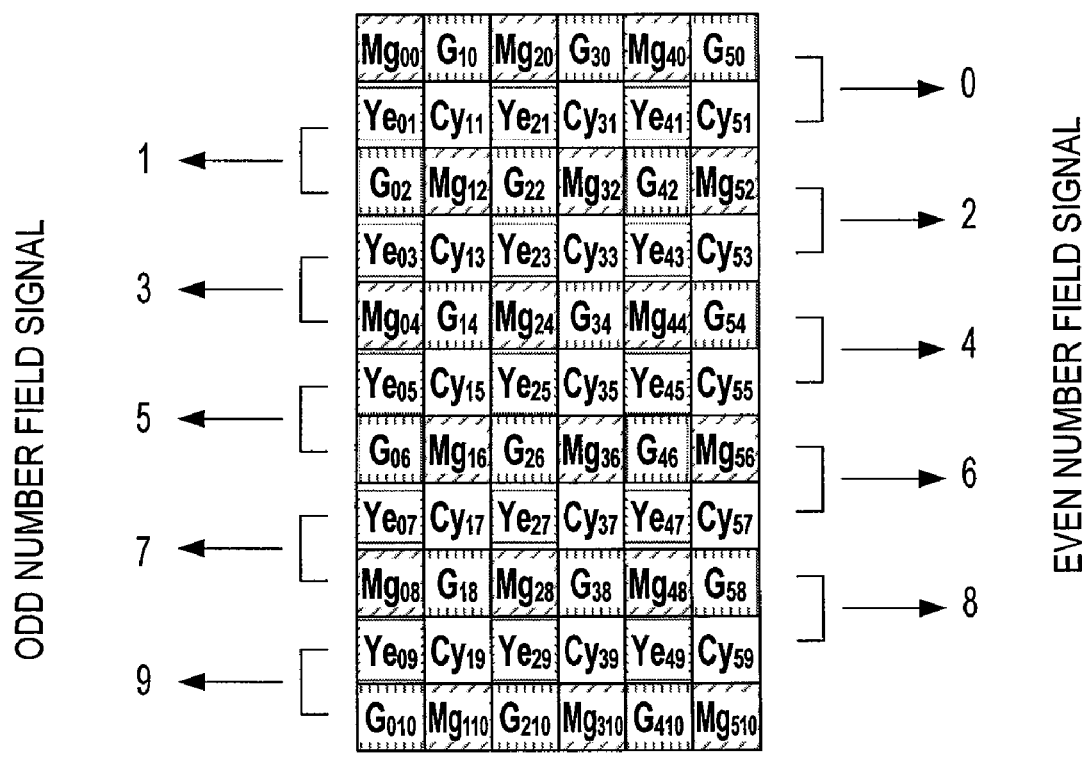
FIG. 17A is a diagram showing a configuration of a color difference line sequential complementary color filter.

It is noted that in this embodiment, a single CCD having a color differential line sequential complementary color filter disposed in front thereof is assumed as the CCD 102. FIG. 17A shows a configuration of the color differential line sequential complementary color filter. A color differential line sequential system includes 2×2 pixels as a base unit, where cyan (Cy), magenta (Mg), yellow (Ye), and green (G), are arranged one pixel by one pixel. However, positions of Mg and G are reversed in every two adjacent lines.

The image signal from the CCD 102 comprises two field signals (even number field signal and odd number field signal) obtained by adding upper lines and lower lines and performing separation into even lines and odd lines, as shown in FIG. 17A. Moreover, 1/60 seconds (henceforth referred to as "1 field time") is assumed as the above-described predetermined time interval, but the predetermined time interval is not limited to 1/60 seconds. One image signal is obtained by combining even and odd field signals, and one image signal is referred to as "frame signal". The frame signal is combined at intervals of 1/30 seconds.

After the analog signal from the CCD 102 is amplified at the amplifier 104 by a predetermined amount, the signal is converted into a digital signal at the A/D converter 105, and is transferred to the buffer 106. The buffer 106 can record two field signals, namely, 1 frame signal, and overwrites signals sequentially according to respective shootings. The frame signals within the buffer 106 are intermittently transferred to the pre-white balance adjustment unit 107, the exposure control unit 108, and the focus control unit 109 at predetermined frame time intervals under the control of the control unit 121.

The separation and extraction unit 111 converts the even number and odd number field signals into the luminance signal Y and the color signals Cb and Cr under the control of the control unit 121, as shown by the Expressions (17). Thereafter, the separation and extraction unit 111 sequentially extracts regions comprising a target pixel to be subjected to the subsequent noise reduction processing and proximate pixels located near the target pixel. In this embodiment, 5×5 pixels are assumed as the region. However, the luminance signal Y exists in all 5×5 pixels, but the color signals Cb and Cr exists in 5×3 pixels or 5×2 pixels.

Figure 17B:
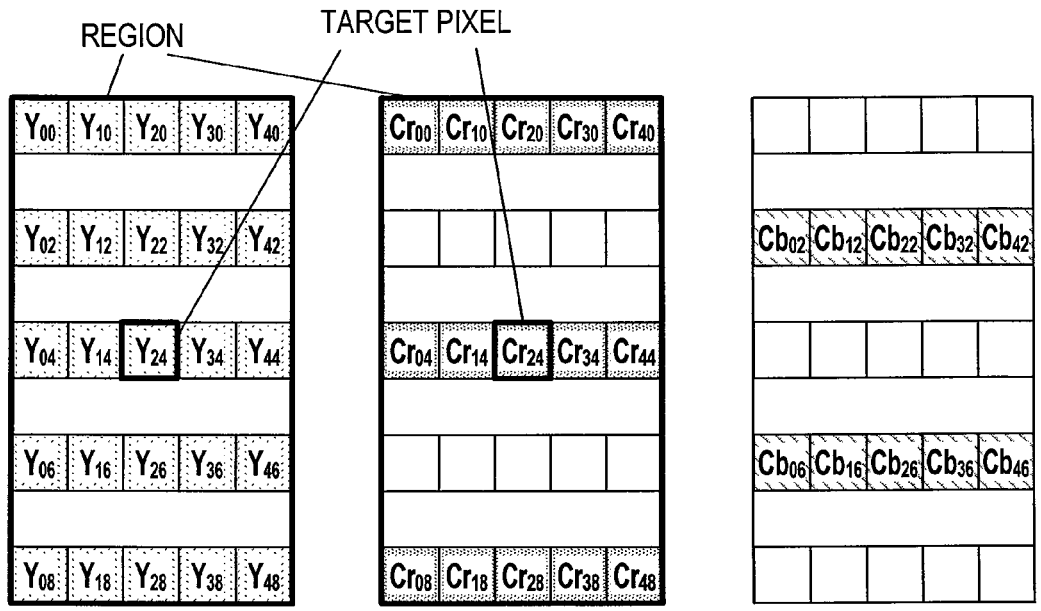
FIG. 17B is a diagram showing an example where a luminance signal Y and color signals Cb and Cr have been extracted from an even field signal.
Figure 17C:
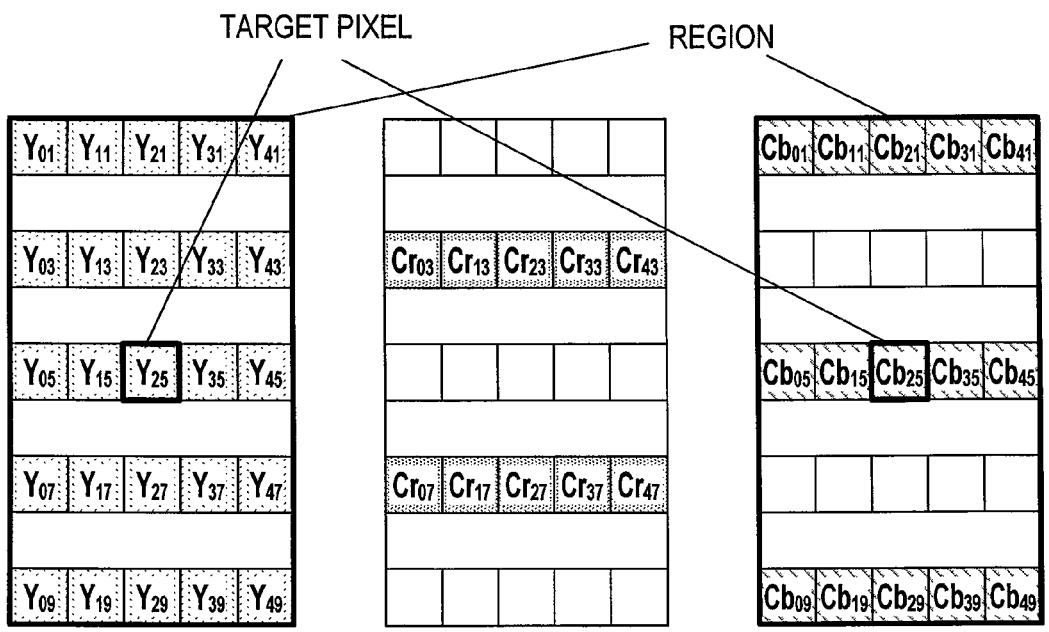
FIG. 17C is a diagram showing an example where a luminance signal Y and color signals Cb and Cr have been extracted from an odd field signal.

FIG. 17B and FIG. 17C show examples of regions extracted from the even number and odd number field signals, respectively. FIG. 17B shows an example where the luminance signal Y and the color signals Cb and Cr have been extracted from the even number field signal. The color signal Cr is 5×3 pixels, while the color signal Cb is 5×2 pixels. In this case, the target pixel to be subjected to the noise reduction processing comprises the luminance signal Y and the color signal Cr and it does not include the color signal Cb. It is noted that, if the position of the target pixel is different, on the contrary, such an example also occurs that the color signal Cb exists while the color signal Cr does not exist.

FIG. 17C shows an example where the luminance signal Y and the color signals Cb and Cr have been extracted from the odd number field signal. The color signal Cb is 5×3 pixels while the color signal Cr is 5×2 pixels. In this case, the target pixel to be subjected to the noise reduction processing comprises the luminance signal Y and the color signal Cb and it does not include the color signal Cr. It is noted that, if the target pixel is different, on the contrary to the above, such an example occurs that the color signal Cr exists while the color signal Cb does not exist.

Henceforth, the luminance signal and the color signals in the region at time T are referred to as $Y^T_{ij}$, and $Cb^T_{ik}$ and $Cr^T_{il}$ (wherein i is a value on an X coordinate, where i=0-4, j is a value on a Y coordinate, where j=0, 2, 4, 6, and 8 in the case of the even number field signal, while j=1, 3, 5, 7, and 9 in the case of the odd number field signal, k is a value on the Y coordinate, where k=0, 4, 8 or k=2, 6 in the case of the even number field signal, while k=3, 7, or k=1, 5, 9 in the case of the odd number field signal, and l is a value on the Y coordinate, where l=2, 6 or l=0, 4, 8 in the case of the even number field signal, while l=1, 5, 9 or l=3, 7 in the case of the odd number field signal).

Regarding the value of the target pixel, the luminance signal becomes $Y^T_{24}$ and the color signal becomes $Cr^T_{24}$ or $Cb^T_{24}$ in the case of the even number field signal, while the luminance signal becomes $Y^T_{25}$ and the color signal becomes $Cr^T_{25}$ or $Cb^T_{25}$ in the case of the odd number field signal. Though explanation made hereafter is made regarding the even number field signal and the case that the target pixel is $Y^T_{24}$ and $Cr^T_{24}$ as shown in FIG. 17B, this explanation can be similarly applied to the case where the even number field signal and the target pixel being $Y^T_{24}$ and $Cb^T_{24}$, and the case of the odd number field signal, with only the configuration of the region being different.

The luminance signal $Y^T_{ij}$ in the region is transferred to the representative luminance calculation unit 113 and the luminance noise reduction unit 703, while the color signals $Cb^T_{ik}$ and $Cr^T_{il}$ are transferred to the representative hue calculation unit 112 and the color noise reduction unit 702. The representative hue calculation unit 112 obtains averages AV_Cb and AV_Cr of the color signals $Cb^T_{ik}$ and $Cr^T_{il}$ under the control of the control unit 121. Further, the hue region θ of the region is obtained from the averages AV_Cb and AV_Cr of the above-described color signals by Expression (18).

$$\theta = \tan^{-1}(AV\_Cb/AV\_Cr) \quad (18)$$

In this embodiment, either one of six hue regions shown in FIG. 19A described later is assumed as the representative hue value and the representative hue value H of the region is obtained by determining one of six regions which the hue region θ obtained by the Expression (18) belongs to. The representative hue value H is transferred to the color noise estimation unit 701.

On the other hand, the representative luminance calculation unit 113 obtains the average AV_Y of the luminance signals $Y^T_{ij}$ to obtain the representative luminance value L like the first embodiment. The representative luminance value L is transferred to the color noise estimation unit 701 and the luminance noise estimation unit 116. The color noise estimation unit 701 estimates the color noise amount $CN_s$ (s=Cb, Cr) based upon the representative hue value H from the representative hue calculation unit 112 and the representative luminance value L from the representative luminance calculation unit 113, and transfers the color noise amount $CN_s$ to the color noise reduction unit 702 under the control of the control unit 121.

It is noted that in the present invention, the case of the even number field signal and the target pixel being $Y^T_{24}$ and $Cr^T_{24}$ as shown in FIG. 17B is assumed, but only the color noise amount $CN_{cr}$ is estimated in this case.

The luminance noise estimation unit 116 estimates the luminance noise amount LN based upon the representative luminance value L from the representative luminance calculation unit 113 to transfer the same to the luminance noise reduction unit 703 under the control of the control unit 121.

The differential calculation unit 700 reads the target pixel in the region from the separation and extraction unit 111 and the target pixel in the region which is positioned before two fields and has been subjected to the noise reduction processing from the buffer 118 to calculate the differential luminance signal ΔY and the differential color signals ΔCb and ΔCr under the control of the control unit 121. Here, since the even number field signal and the target pixel $Y^T_{24}$ and $Cr^T_{24}$ are assumed, the differential calculation unit 700 reads $Y^T_{24}$ and $Cr^T_{24}$ from the separation and extraction unit 111 and the $Y'^{T-2}_{24}$ and $Cr'^{T-2}_{24}$ from the buffer 118. Thereafter, the differential calculation unit 700 calculates the differential luminance signal $\Delta Y_{24}$ and the differential color signal $\Delta Cr_{24}$ by Expressions (19).

$$\Delta Y_{24} = Y^T_{24} - Y'^{T-2}_{24}$$

$$\Delta Cr_{24} = Cr^T_{24} - Cr'^{T-2}_{24} \quad (19)$$

The differential luminance signal ΔY is transferred to the luminance noise reduction unit 703 and the differential color signal ΔCb or ΔCr is transferred to the color noise reduction unit 702.

The color noise reduction unit 702 performs color noise reduction processing to the color signal of the target pixel of the region from the separation and extraction unit 111 based upon the color noise amount from the color noise estimation unit 701 and the differential signal of the color signal from the differential calculation unit 700 under the control of the control unit 121. The color signal after the color noise reduction processing is transferred to the buffer 118 to be saved therein.

The luminance noise reduction unit 703 performs the luminance noise reduction processing to the luminance signal of the target pixel of the region from the separation and extraction unit 111 based upon the luminance noise amount from the luminance noise estimation unit 116 and the differential signal of the luminance signal from the differential calculation unit 700 under the control of the control unit 121. The luminance signal after the luminance noise reduction processing is transferred to the buffer 118 to be saved therein.

It is assumed that the buffer 118 can record two field signals which have been subjected to the noise reduction processing, namely, one frame signal and overwrites the signals according to respective shootings.

It is noted that the processing in the separation and extraction unit 111, the processing in the representative hue calculation unit 112, the processing in the representative luminance calculation unit 113, the processing in the color noise estimation unit 701, the processing in the color noise reduction unit 702, the processing in the luminance noise estimation unit 116, the processing in luminance noise reduction unit 703, and the processing in the differential calculation unit 700 are performed in a synchronizing manner for each region under the control of the control unit 121.

At the time when the processing to all the regions has been completed, the luminance signal Y' after the luminance noise reduction processing and the color signals Cb' and Cr' after the color noise reduction processing regarding the two field signals taken in by shooting exist in the buffer 118. The signal processing unit 119 performs known simultaneous processing, emphasis processing, tone processing, compression processing, etc. to the Y', Cb', and Cr' signals which have been subjected to the noise reduction processing to transfer the signals to the output unit 120 under the control of the control unit 121. The output unit 120 records and stores the image signal in a recording medium such as a magnetic disc or a memory card.

Figure 18:
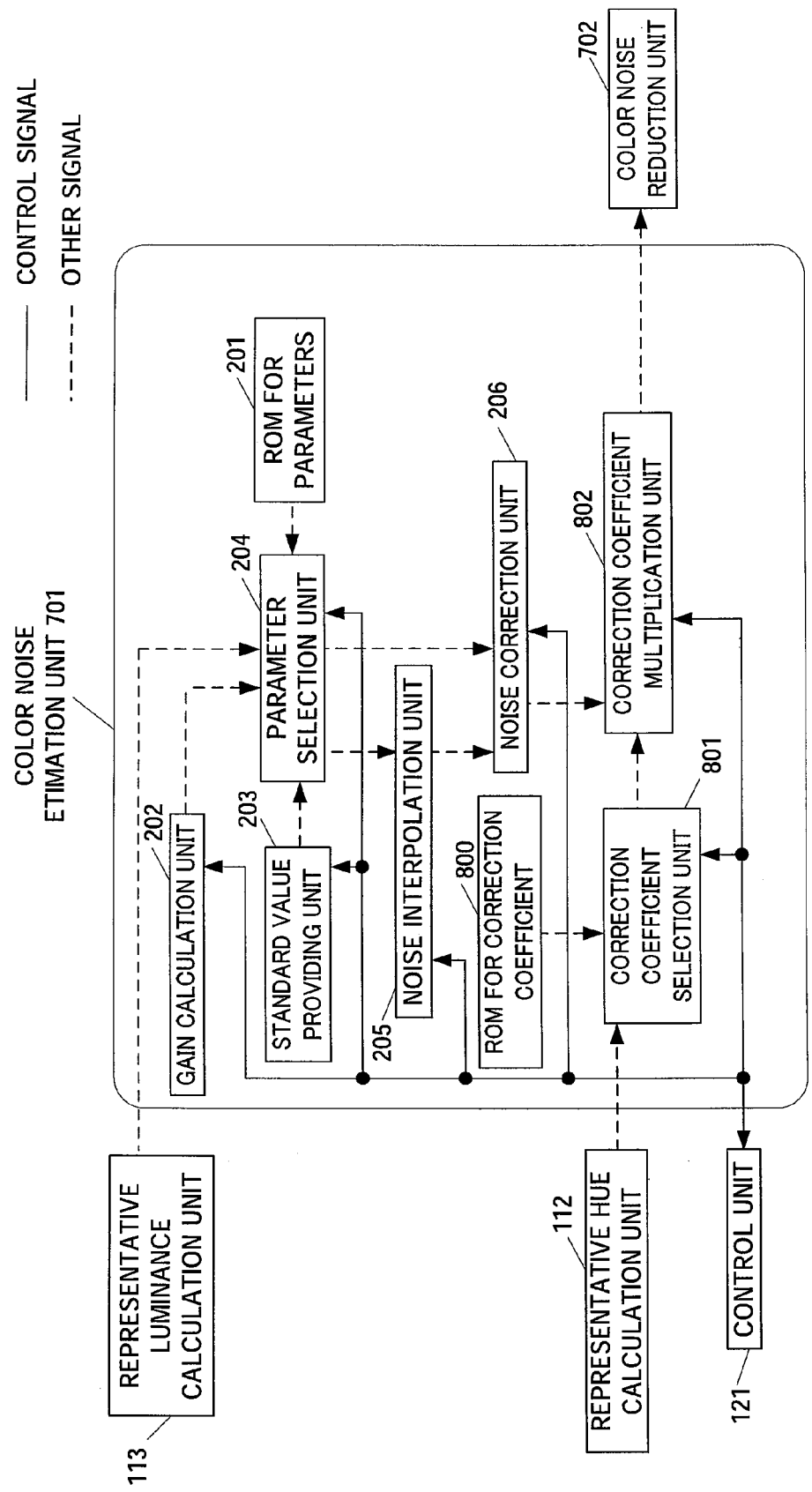
FIG. 18 is a configuration diagram of a color noise estimation unit according to the second embodiment.

FIG. 18 shows an example of a configuration of the color noise estimation unit 701, and has a configuration where the model selection unit 200 is omitted from the configuration of the color noise estimation unit 114 shown in FIG. 4 and a ROM for correction coefficients 800, a correction coefficient selection unit 801, and a correction coefficient multiplication unit 802 is added to the configuration. The basis configuration of the color noise estimation unit 701 is equivalent to that of the color noise estimation unit 114 shown in FIG. 4 and same configuration is assigned with same name and reference numeral. Hereafter, only different portions will be explained.

The representative luminance calculation unit 113, the ROM for parameters 201, the gain calculation unit 202, and the standard value providing unit 203 are connected to the parameter selection unit 204. The representative hue calculation unit 112 and the ROM for correction coefficients 800 are connected to the correction coefficient selection unit 801. The correction coefficient selection unit 801 and the noise correction unit 206 are connected to the correction coefficient multiplication unit 802. The correction coefficient multiplication unit 802 is connected to the color noise reduction unit 702. The control unit 121 is bi-directionally connected to the correction coefficient selection unit 801 and the correction coefficient multiplication unit 802.

The parameter selection unit 204 reads the representative luminance value L from the representative luminance calculation unit 113 under the control of the control unit 121. The gain calculation unit 202 obtains a gain at the amplifier 104 based upon information about the ISO sensitivity and the exposure information transferred from the control unit 121, and transfers the gain to the parameter selection unit 204. The control unit 121 obtains the temperature information of the CCD 102 from the temperature sensor 103 to transfer the same to the parameter selection unit 204.

The parameter selection unit 204 sets the signal level l from the representative luminance value L obtained from the representative luminance calculation unit 113, the gain g from the gain information obtained from the gain calculation unit 202, and the temperature t from the temperature information obtained from the control unit 121. Next, the parameter selection unit 204 reads the reference color noise model and the correction coefficient from the ROM for correction coefficients 201. Since it is assumed that the reference color noise model and the correction coefficient used here take a slightly different aspect from the reference color noise model and the correction coefficient in the first embodiment shown in FIG. 5, the difference will be explained below.

In FIG. 5, such an aspect is adopted that reference color noise models are set to a plurality of hue regions and one of the reference color noise models is selected using the representative hue value H. In the following, an aspect using a single reference color noise model used commonly to all the hue regions is adopted, as shown in FIG. 19A and FIG. 19B.

Figure 19A:
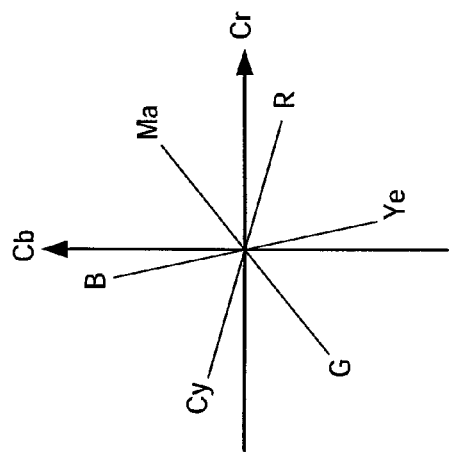
FIG. 19A is a diagram showing respective hue regions of red (R), magenta (M), blue (B), cyan (Cy), green (G), and yellow (Ye) on a Cr-Cb plane where a color signal Cr is defined by a horizontal axis and a color signal Cb is defined by a vertical horizontal axis.
Figure 19B:
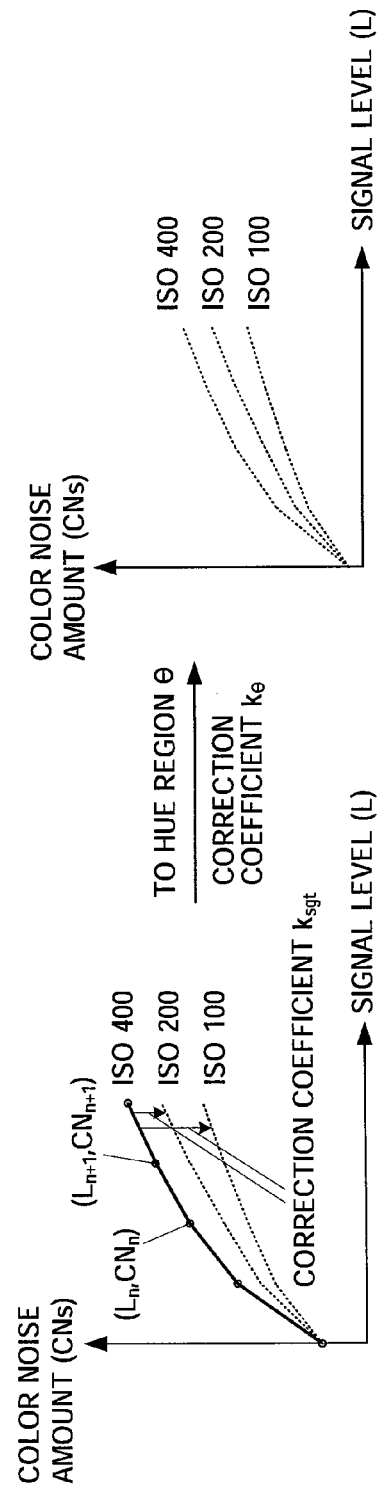
FIG. 19B is a diagram for explaining estimation of a color noise amount.

FIG. 19A shows respective hue regions of red (R), magenta (Ma), blue (B), cyan (Cy), green (G), and yellow (Ye) on a Cr-Cb plane whose horizontal axis represents the color signal Cr and whose vertical axis represents the color signal Cb. In the second embodiment, six hue regions shown in FIG. 19A are assumed as the hue region.

It is noted that the hue region is not necessarily limited to six regions as described above, and it is possible to adopt an arbitrary configuration such as a configuration where three hue regions of red (R), blue (B) and green (G) are used in order to give priority to cost reduction, a configuration where twelve hue regions obtained by adding intermediate hue regions of the above-described six hue regions are used in order to give priority to high precision, or a configuration where hue regions regarding memory colors such as skin color, sky color, or green of plant are used.

Regarding the above-described six hue regions, as shown in FIG. 5B and the Expression (7), individual color noise models exist. A color noise model which provides a maximum color noise amount is selected from all the color noise models as the reference color noise model and it is approximated by a polygonal line comprising a predetermined number of straight lines.

FIG. 19B shows inflection points of the polygonal line of the selected reference color noise model. The inflection points are represented by the coordinate data $(L_n, CN_n)$ comprising the signal level L and the color noise amount CN. Here, "n" indicates the number of inflection points. A correction coefficient $k_{sgt}$ for deriving another color noise model with different color signal s, gain g, and temperature t from the above-described reference color noise model is prepared regarding the hue region to which the reference color noise model belongs. The correction coefficient $k_{sgt}$ is calculated from each color noise model and the reference color noise model by the least-squares method. Deriving another color noise model from the reference color noise model is achieved by multiplying the reference color noise model by the above-described correction coefficient $k_{sgt}$.

Furthermore, as shown in FIG. 19B, a correction coefficient $k_\theta$ for creating a color noise model of another hue region from the hue region to which the reference color noise model belongs is also prepared. The correction coefficient $k_\theta$ is calculated by the least-squares method like the correction coefficient $k_{sgt}$ and conversion thereof is performed by performing multiplication.

The ROM for parameters 201 records the coordinate data $(L_n, CN_n)$ and the correction coefficient $k_{sgt}$ of the above-described reference color noise model. Furthermore, the ROM for correction coefficients 800 records the above-described correction coefficient $k_\theta$.

The parameter selection unit 204 searches a segment of the reference color noise model to which the signal level l belongs to read the coordinate data of the segment from the ROM for parameters 201. Here, it is assumed that the signal level l belongs to the segment between $(L_n, CN_n)$ and $(L_{n+1}, CN_{n+1})$. Furthermore, the parameter selection unit 204 reads corresponding coefficient $k_{sgt}$ from the color signal s, the gain g, and the temperature t. The segment of the reference color noise model is transferred to the noise interpolation unit 205 and the correction coefficient $k_{sgt}$ is transferred to the noise correction unit 206.

The noise interpolation unit 205 calculates the reference color noise amount $CN_l$ in the reference color noise model based upon Expression (20) from the signal level l and the coordinate data $(L_n, CN_n)$ and $(L_{n+1}, CN_{n+1})$ of the segment from the parameter selection unit 204, and transfers the reference color noise amount $CN_l$ to the noise correction unit 206 under the control of the control unit 121.

$$CN_l = \frac{CN_{n+1} - CN_n}{L_{n+1} - L_n}(l - L_n) + CN_n \tag{20}$$

The noise correction unit 206 calculates a color noise amount $SCN_s$ shown by Expression (21) from the correction coefficient $k_{sgt}$ from the parameter selection unit 204 and the reference color noise amount $CN_l$ from the noise interpolation unit 205 under the control of the control unit 121. The color noise amount $SCN_s$ is the color noise amount in the hue region to which the reference color noise model belongs.

$$SCN_s = k_{sgt} \cdot CN_l \tag{21}$$

The correction coefficient selection unit 801 reads the representative hue value H of the region from the representative hue calculation unit 112 and reads the correction coefficient $k_\theta$ corresponding to the representative hue value H from the ROM for correction coefficients 800 under the control of the control unit 121. The correction coefficient $k_\theta$ is transferred to the correction coefficient multiplication unit 802.

The correction coefficient multiplication unit 802 calculates the color noise amount $CN_s$ by multiplying the color noise amount $SCN_s$ from the noise correction unit 206 by the correction coefficient $k_\theta$ from the correction coefficient selection unit 801, as shown by Expression (22), under the control of the control unit 121.

$$CN_s = k_\theta \cdot SCN_s \tag{22}$$

The calculated color noise amount $CN_s$ is transferred to the color noise reduction unit 702.

It is noted that in the process of calculation of the color noise amount, it is unnecessary to obtain information such as the temperature t or the gain g for each shooting. A configuration where arbitrary information (predetermined standard values) in the standard value providing unit 203 in advance is recorded and the process for calculating information such as the temperature t or the gain g is skipped can be adopted.

Further, an aspect where reference color noise models are set corresponding to a plurality of hue regions and selection is made using the representative hue value H can be also used like the color noise estimation unit 114 shown in FIG. 4 in the first embodiment. Furthermore, a configuration using a look up table can be adopted like the color noise estimation unit 114 shown in FIG. 6 in the first embodiment. On the contrary, the color noise estimation unit 701 of the second embodiment can be applied to the first embodiment.

Figure 20:
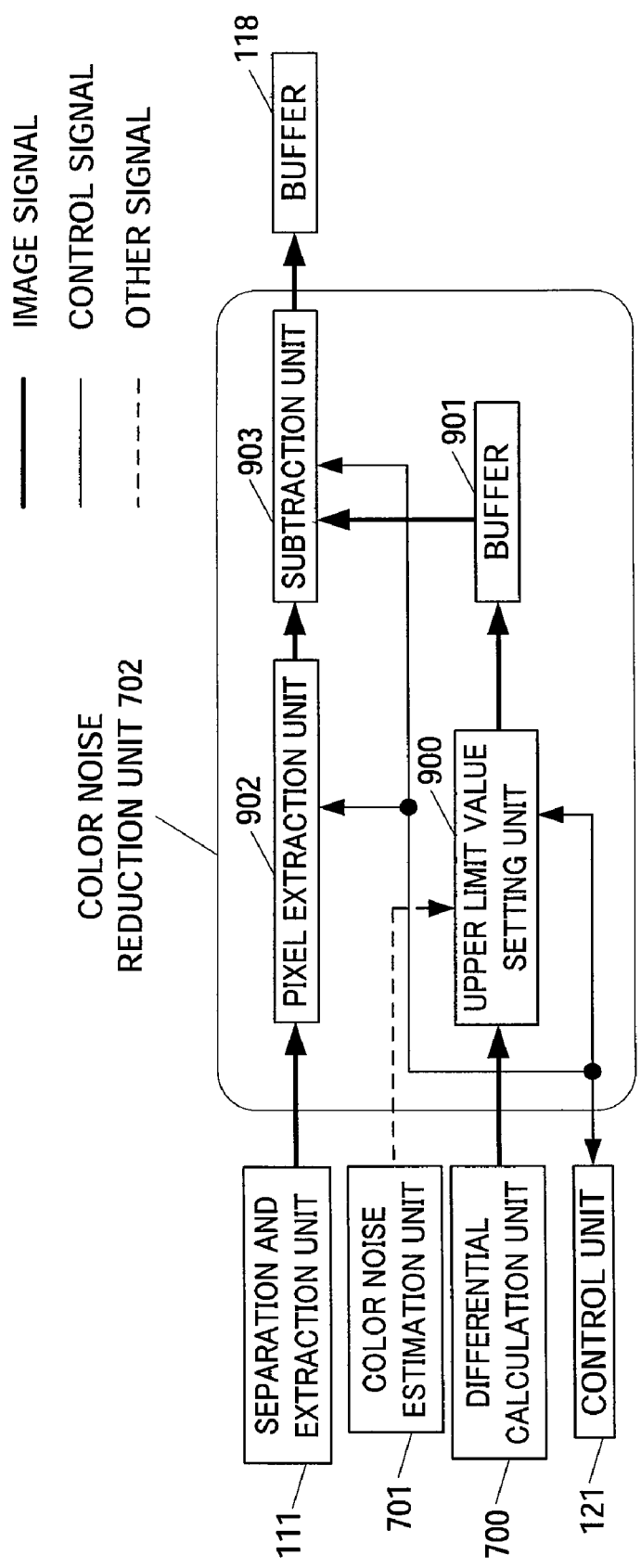
FIG. 20 is a configuration diagram of a color noise reduction unit according to the second embodiment.

Subsequently, the color noise reduction unit 702 will be explained. FIG. 20 shows an example of a configuration of the color noise reduction unit 702. The color noise reduction unit 702 comprises an upper limit value setting unit 900, a buffer 901, a pixel extraction unit 902, and a subtraction unit 903. The separation and extraction unit 111 is connected to the pixel extraction unit 902 and the pixel extraction unit 902 is connected to the subtraction unit 903. The differential calculation unit 700 and the color noise estimation unit 701 are connected to the upper limit value setting unit 900. The upper limit value setting unit 900 is connected to the subtraction unit 903 via the buffer 901. The subtraction unit 903 is connected to the buffer 118. The control unit 121 is bi-directionally connected to the upper limit value setting unit 900, the pixel extraction unit 902, and the subtraction unit 903.

Though the following explanation is made regarding the even number field signal and the target pixel $Y^T_{24}$, $Cr^T_{24}$ as shown in FIG. 17B, it is similarly applied to the case of the even number field signal and the target pixel $Y^T_{24}$, $Cb^T_{24}$, or the case of the odd number field signal, with only a configuration of the region being different.

The upper limit value setting unit 900 reads the differential color signal $\Delta Cr_{24}$ shown by the Expression (19) from the differential calculation unit 700 and the color noise amount $CN_{cr}$ from the color noise estimation unit 701 to perform comparison therebetween under the control of the control unit 121. The above-described comparison is for determining whether or not the absolute value of the differential color signal $\Delta Cr_{24}$ is contained in the color noise amount $CN_{cr}$, where the absolute value is out of the noise range in the case of $\Delta Cr_{24} \geq CN_{cr}$ or $-CN_{cr} \geq \Delta Cr_{24}$, while the absolute value is in the noise range in the case of $CN_{cr} > \Delta Cr_{24} > -CN_{cr}$. The upper limit value setting unit 900 obtains a second color noise amount $CN2_{cr}$ by performing correction to the differential color signal $\Delta Cr_{24}$ based upon the abovementioned comparison result, as shown by Expressions (23).

$$CN2_{cr}=CN_{cr}(\Delta Cr_{24} \geq CN_{cr})$$

$$CN2_{cr}=\Delta Cr_{24}(CN_{cr}>\Delta Cr_{24}>-CN_{cr})$$

$$CN2_{cr}=-CN_{cr}(-CN_{cr} \geq \Delta Cr_{24}) \quad (23)$$

The Expressions (23) mean that if the differential color signal exceeds the color noise amount (the differential color signal falls below the color noise amount if the differential color signal is negative), the constraint for setting the color noise amount as the upper limit is provided. Thereby, motion components are removed from the differential color signal, so that only color noise components are obtained. The above-described second color noise amount $CN2_{cr}$ is transferred to the buffer 901 to be recorded therein.

On the other hand, the pixel extraction unit 902 reads the target pixel $Cr^T_{24}$ from the separation and extraction unit 111 to transfer the same to the subtraction unit 903 under the control of the control unit 121. The subtraction unit 903 reads the target pixel $Cr^T_{24}$ from the pixel extraction unit 902 and the second color noise amount $CN2_{cr}$ from the buffer 901 and performs subtraction processing therebetween, as shown by Expression (24), to perform the color noise reduction processing under the control of the control unit 121.

$$Cr'^T_{24}=Cr^T_{24}-CN2_{cr} \quad (24)$$

The target pixel $Cr'^T_{24}$ which has been subjected to the color noise reduction processing is transferred to the buffer 118.

It is noted that in the above-described configuration, the second color noise amount is obtained by performing setting of the upper limit value to the differential signal to perform the color noise reduction processing by the subtraction processing, but the present invention is not necessarily limited to the abovementioned configuration. For example, a configuration where the second color noise amount is obtained by replacing differential signal by a zero value to perform the color noise reduction processing by performing the coring processing can also be adopted.

Figure 21:
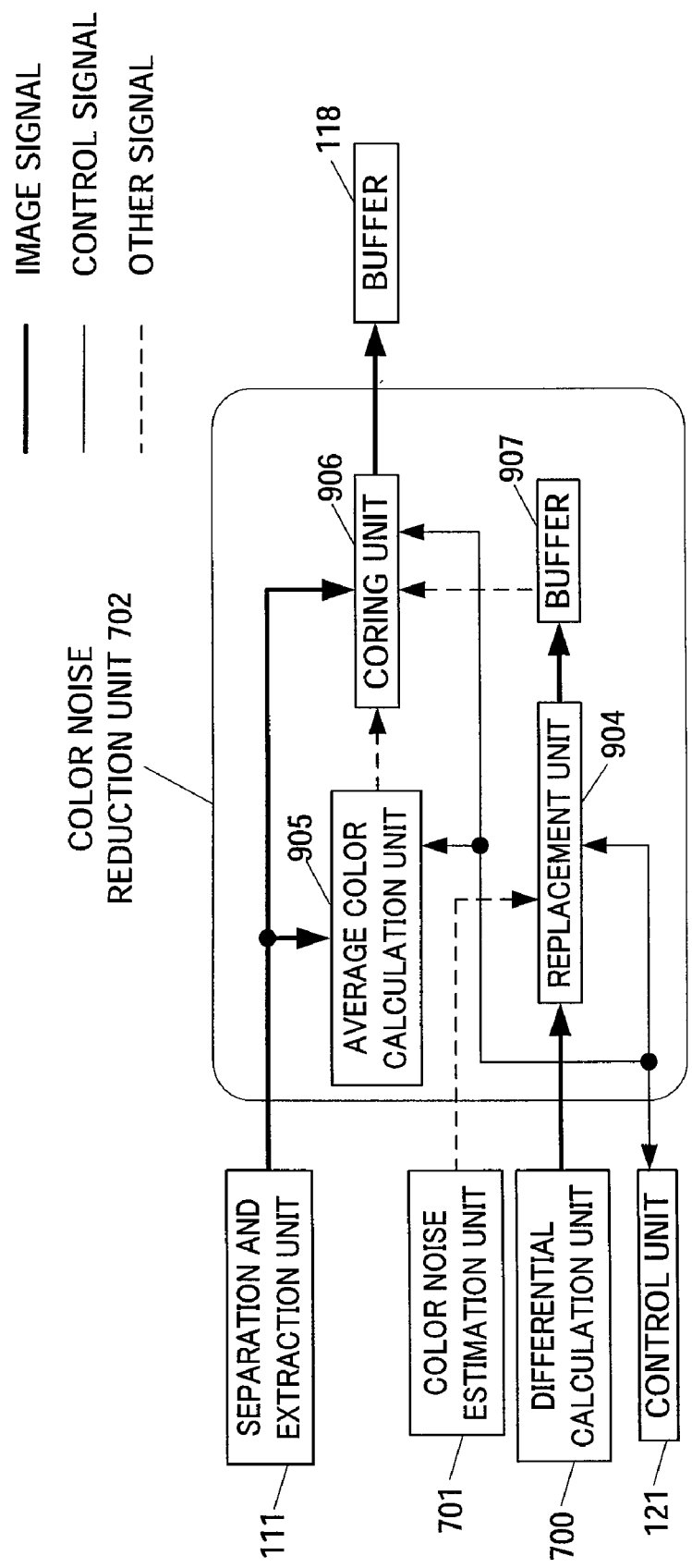
FIG. 21 is another configuration diagram of the color noise reduction unit according to the second embodiment.

FIG. 21 is an example of another configuration of the color noise reduction unit 702. The color noise reduction unit 702 comprises a replacement unit 904, an average color calculation unit 905, a coring unit 906, and a buffer 907. The separation and extraction unit 111 is connected to the average color calculation unit 905 and the coring unit 906. The average color calculation unit 905 is connected to the coring unit 906. The differential calculation unit 700 and the color noise estimation unit 701 are connected to the replacement unit 904. The replacement unit 904 is connected to the coring unit 906 via the buffer 907. The coring unit 906 is connected to the buffer 118. The control unit 121 is bi-directionally connected to the replacement unit 904, the average color calculation unit 905, and the coring unit 906.

The average color calculation unit 905 reads the color signal $Cr^T_{ij}$ in the region from the separation and extraction unit 111 to calculate an average value AV_Cr thereof under the control of the control unit 121. The calculated average value AV_Cr is transferred to the coring unit 906.

The replacement unit 904 reads the differential color signal $\Delta Cr_{24}$ shown by the Expressions (19) from the differential calculation unit 700 and the color noise amount $CN_{cr}$ from the color noise estimation unit 701 to perform comparison therebetween under the control of the control unit 121. The above-described comparison is for determining whether or not the absolute value of the differential color signal $\Delta Cr_{24}$ is contained in the color noise amount $CN_{cr}$, where the absolute value is out of the noise range in the case of $\Delta Cr_{24} \geq CN_{cr}$ or $-CN_{cr} \geq \Delta Cr_{24}$, while the absolute value is in the noise range in the case of $CN_{cr} > \Delta Cr_{24} > -CN_{cr}$. The replacement unit 904 obtains a second color noise amount $CN2_{cr}$ by performing correction to the color signal $\Delta Cr_{24}$ based upon the above-described comparison result, as shown by Expressions (25).

$$CN2_{cr}=0 \ (\Delta Cr_{24} \geq CN_{cr})$$

$$CN2_{cr}=\Delta Cr_{24} \ (CN_{cr}>\Delta Cr_{24}>-CN_{cr})$$

$$CN2_{cr}=0 \ (-CN_c \geq \Delta Cr_{24}) \quad (25)$$

Since the coring unit 906 in the latter stage is for performing the coring processing between the target pixel $Cr^T_{24}$ and the second noise amount $CN2_{cr}$, it is meant that the replacement processing shown by the Expressions (25) does not perform any processing in the motion region. Since visually discrimination ability for high frequency generally lowers in the motion region, noise components become hardly conspicuous, so that accommodation is also possible in the abovementioned replacement processing. The implementation of above-described replacement processing is easier than that of the upper limit value setting processing shown in FIG. 20, which can result in cost reduction of the system.

The above-described second noise amount $CN2_{cr}$ is transferred to the buffer 907 to be recorded therein. The coring unit 906 reads the target pixel $Cr^T_{24}$ from the separation and extraction unit 111, the average value AV_Cr of color signal from the average color calculation unit 905, and the second noise amount $CN2_{cr}$ from the buffer 907 and performs color noise reduction processing by performing the coring processing, as shown in Expressions (26), under the control of the control unit 121.

$$Cr'^T_{24} = Cr^T_{24} - CN2_{cr} \ (Cr^T_{24} \geq AV\_Cr + CN2_{cr})$$

$$Cr'^T_{24} = AV\_Cr \ (AV\_Cr + CN2_{cr} > Cr^T_{24} > AV\_Cr - CN2_{cr})$$

$$Cr'^T_{24} = Cr^T_{24} + CN2_{cr} \ (AV\_Cr - CN2_{cr} \geq Cr^T_{24}) \quad (26)$$

A target pixel $Cr'^T_{24}$ which has been subjected to the color reduction processing is transferred to the buffer 118.

Figure 22:
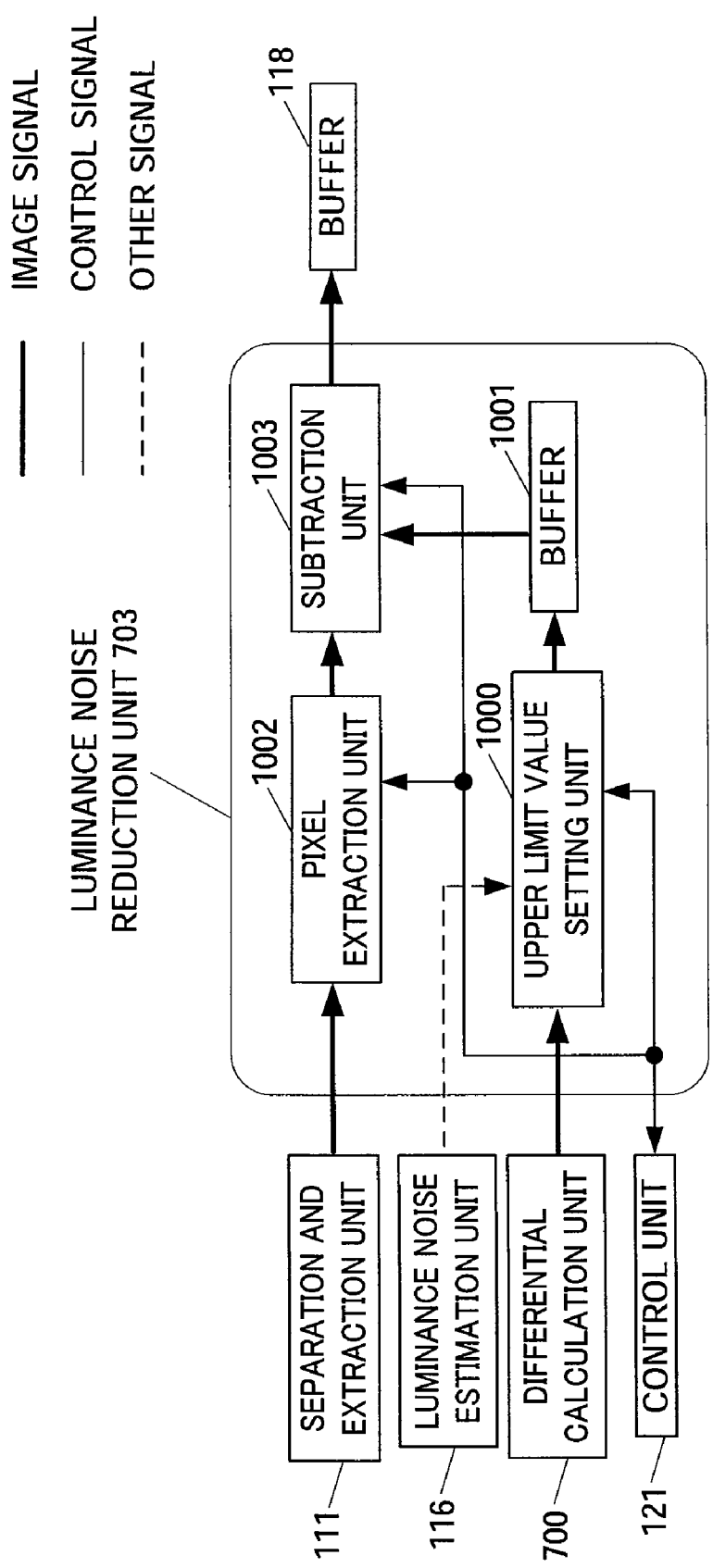
FIG. 22 is a configuration diagram of a luminance noise reduction unit according to the second embodiment.

FIG. 22 shows an example of a configuration of the luminance noise reduction unit 703. The luminance noise reduction unit 703 comprises an upper limit value setting unit 1000, a buffer 1001, a pixel extraction unit 1002, and a subtraction unit 1003. The separation and extraction unit 111 is connected to the pixel extraction unit 1002, and the pixel extraction unit 1002 is connected to the subtraction unit 1003. The differential calculation unit 700 and the luminance noise estimation unit 116 are connected to the upper limit value setting unit 1000. The upper limit value setting unit 1000 is connected to the subtraction unit 1003 via the buffer 1001. The subtraction unit 1003 is connected to the buffer 118. The control unit 121 is bi-directionally connected to the upper limit value setting unit 1000, the pixel extraction unit 1002, and the subtraction unit 1003.

Though the following explanation is made regarding the even number field signal and the target pixel $Y^T_{24}$, $Cr^T_{24}$ as shown in FIG. 17B, it is similarly applied to the case of the even number field signal and the target pixel $Y^T_{24}$, $Cb^T_{24}$, or the case of the odd number field signal, with only a configuration of the region being different.

The upper limit value setting unit 1000 reads the differential luminance signal $\Delta Y_{24}$ shown by the Expression (19) from the differential calculation unit 700 and the luminance noise amount LN from the luminance noise estimation unit 116 to perform comparison therebetween under the control of the control unit 121. The above-described comparison is for determining whether or not the absolute value of the differential luminance signal $\Delta Y_{24}$ is contained in the luminance noise amount LN, where the absolute value is out of the noise range in the case of $\Delta Y_{24} \geq LN$ or $-LN \geq \Delta Y_{24}$, while the absolute value is in the noise range in the case of $LN > \Delta Y_{24} > -LN$. The upper limit value setting unit 1000 obtains a second luminance noise amount LN2 by performing correction to the differential luminance signal $\Delta Y_{24}$ based upon the abovementioned comparison result, as shown by Expressions (27).

$$LN2 = LN \ (\Delta Y_{24} \geq LN)$$

$$LN2 = \Delta Y_{24} \ (LN > \Delta Y_{24} > -LN)$$

$$LN2 = -LN \ (-LN \geq \Delta Y_{24}) \quad (27)$$

The Expressions (27) mean that if the differential luminance signal exceeds the luminance noise mount (the differential luminance signal falls below the luminance noise amount if the differential luminance signal is negative), the constraint for setting the luminance noise amount as the upper limit is provided. Thereby, motion components are removed from the differential luminance signal, so that only luminance noise components are obtained. The above-described second luminance noise amount LN2 is transferred to the buffer 1001 to be recorded therein.

On the other hand, the pixel extraction unit 1002 reads the target pixel $Y^T_{24}$ from the separation and extraction unit 111 to transfer the same to the subtraction unit 1003 under the control of the control unit 121. The subtraction unit 1003 reads the target pixel $Y^T_{24}$ from the pixel extraction unit 1002 and the second luminance noise amount LN2 from the buffer 1001 and performs the subtraction processing therebetween, as shown in Expression (28), to perform the luminance noise reduction processing under the control of the control unit 121.

$$Y'^T_{24} = Y^T_{24} - LN2 \quad (28)$$

A target pixel $Y'^T_{24}$ which has been subjected to the luminance noise reduction processing is transferred to the buffer 118.

It is noted that in the above-described configuration, the second luminance noise amount is obtained by performing the upper limit value to the differential signal and performs the luminance noise reduction processing by the subtraction processing, but the present invention is not necessarily limited to such a configuration. For example, a configuration where the second luminance noise amount is obtained by replacing differential signal by a zero value and performs the luminance noise reduction processing by the coring processing can be adopted.

Figure 23:
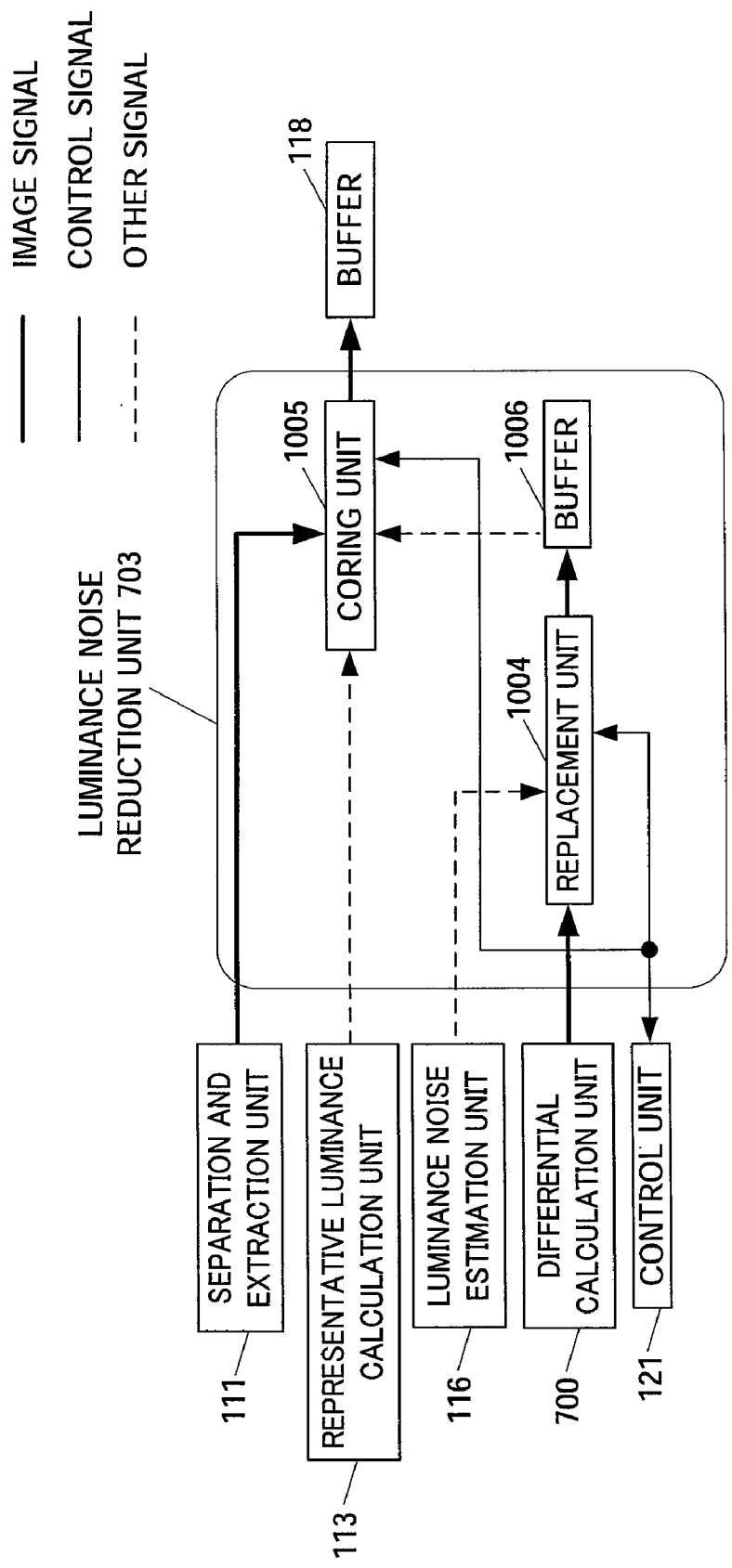
FIG. 23 is another configuration diagram of the luminance noise reduction unit according to the second embodiment.

FIG. 23 is an example of another configuration of the luminance noise reduction unit 703. The luminance noise reduction unit 703 comprises a replacement unit 1004, a coring unit 1005, and a buffer 1006. It is noted that in the configuration of the luminance noise reduction unit 703 shown in FIG. 23, an aspect where the luminance noise reduction unit 703 is connected with the representative luminance calculation unit 113 shown in FIG. 16 is adopted.

The separation and extraction unit 111 and the representative luminance calculation unit 113 are connected to the coring unit 1005. The differential calculation unit 700 and the luminance noise estimation unit 116 are connected to the replacement unit 1004. The replacement unit 1004 is connected to the coring unit 1005 via the buffer 1006. The coring unit 1005 is connected to the buffer 118. The control unit 121 is bi-directionally connected to the replacement unit 1004 and the coring unit 1005.

The replacement unit 1004 reads the differential luminance signal $\Delta Y_{24}$ shown by the Expression (19) from the differential calculation unit 700 and the luminance noise amount LN from the luminance noise estimation unit 116 to perform comparison therebetween under the control of the control unit 121. The above-described comparison is for determining whether or not the absolute value of the differential luminance signal $\Delta Y_{24}$ is contained in the luminance noise amount LN, where the absolute value is out of the noise range in the case of $\Delta Y_{24} \geq LN$ or $-LN \geq \Delta Y_{24}$, while the absolute value is in the noise range in the case of $LN > \Delta Y_{24} > -LN$. The replacement unit 1004 obtains a second luminance noise amount LN2 by performing correction to the differential luminance signal $\Delta Y_{24}$ based upon the abovementioned comparison result, as shown by Expressions (29).

$$LN2=0 \ (\Delta Y_{24} \geq LN)$$

$$LN2=\Delta Y_{24} \ (LN > \Delta Y_{24} > -LN)$$

$$LN2=0 \ (-LN \geq \Delta Y_{24}) \tag{29}$$

Since the coring unit 1005 in the latter stage performs the coring processing between the target pixel $Y^T_{24}$ and the second luminance noise amount LN2, it is meant that the replacement processing shown by the Expressions (29) does not perform any processing in the motion region. Since visually discrimination ability for high frequency generally lowers in the motion region, noise components become hardly conspicuous, so that accommodation is also possible in the abovementioned replacement processing. The implementation of the above-described replacement processing is easier than that of the upper limit value setting processing shown in FIG. 22, which can result in cost reduction of the system. The obtained second luminance noise amount LN2 is transferred to the buffer 106 to be recorded therein.

The coring unit 1005 reads the target pixel $Y^T_{24}$ from the separation and extraction unit 111, the representative luminance value L from the representative luminance calculation unit 113, and the second luminance noise amount LN2 from the buffer 1006 and performs the luminance noise reduction processing by performing the coring processing, as shown by Expressions (30), under the control of the control unit 121.

$$Y'^T_{24}=Y^T_{24}-LN2 \ (Y^T_{24} \geq L+LN2)$$

$$Y'^T_{24}=L \ (L+LN2 > Y^T_{24} > L-LN2)$$

$$Y'^T_{24}=Y^T_{24}+LN2 \ (L-LN2 \geq Y^T_{24}) \tag{30}$$

A target pixel $Y'^T_{24}$ which has been subjected to the luminance noise reduction processing is transferred to the buffer 118.

With the above-described configuration of the second embodiment, a system for obtaining the second color noise amount by obtaining the representative luminance value and the representative hue value to the image signals sequentially taken in time sequence for each predetermined region, adaptively estimating the color noise amount based upon the representative luminance value and the representative hue value, and removing motion components from the color noise amount estimated to the differential color signal obtained from the color signals of the past region which has been subjected to the noise reduction processing can be provided. Thereby, it becomes possible to perform high-accuracy color noise reduction processing, so that a high-quality image signal can be obtained.

Since the above-described estimation processing of the color noise amount dynamically adapts to different conditions corresponding to respective shootings and performs proper correction corresponding to respective hue regions, it becomes possible to achieve high-accuracy and stable estimation of the color noise amount. Further, when the interpolation operation is used for calculation of the color noise amount, the implementation of the interpolation operation is easy, which can result in cost reduction of the system. On the other hand, when the lookup table is used for calculation of the color noise amount, it becomes possible to perform high-speed estimation of the color noise amount.

In the case that setting processing of the upper limit value based upon the color noise amount is used when motion components are removed from the differential color signal, implementation thereof is relative easy, which can result in high speed and cost reduction of the whole system. Furthermore, the setting processing enables simplification of control, which results in improvement of operability. On the other hand, when replacement processing to zero value is used, implementation thereof is relatively easy, which can result in high speed and cost reduction of the whole system.

When the subtraction processing is used for the color noise reduction processing, implementation thereof is easy, which can result in high speed and cost reduction of the whole system. On the other hand, when the coring processing is used for the color noise reduction processing, only the color noise components can be reduced preponderantly and continuity with a pixel other than the color noise, such as edges can be secured, so that a high-quality image signal can be obtained.

By estimating the luminance noise amount adaptively based upon the representative luminance value and removing motion components from the luminance noise amount estimated to the differential luminance signal obtained from the luminance signal of the past region which has been subjected to the noise reduction processing, thereby obtaining the second luminance noise amount, it is made possible to perform high-accuracy luminance noise reduction process, so that a high-quality image signal can be obtained. Since the above-described estimation processing of the luminance noise amount dynamically adapts to different conditions corresponding to respective shootings and uses the reference luminance noise model, it becomes possible to perform high-accuracy and stable estimation of the luminance noise amount.

When the interpolation operation is used for calculation of the luminance noise amount, implementation of the interpolation operation is easy, which can result in cost reduction of the system. On the other hand, when the look up table is used for calculation of the luminance noise amount, it becomes possible to perform high-speed estimation of the luminance noise amount.

When setting processing of the upper limit value based upon the luminance noise amount is used when motion components are removed from the differential luminance signal, implementation thereof is relatively easy, which can result in high speed and cost reduction of the whole system. Further, setting processing enables simplification of control, which results in improvement of operability. On the other hand, when replacement processing to zero value is used, implementation thereof is relatively easy and high speed and cost reduction of the whole system can be achieved.

When the subtraction processing is used for the luminance noise reduction processing, implementation thereof is easy, and high speed and cost reduction of the whole system can be achieved. On the other hand, when the coring processing is used for the luminance noise reduction processing, only the luminance noise components can be reduced preponderantly and continuity with a pixel other than the luminance noise, such as edges can be secured, so that a high-quality image signal can be obtained.

Further, since the imaging device having a color difference line sequential complementary color filter arranged on a front face thereof is used, it has high compatibility with the current imaging system, and it becomes possible to obtain a combination with various systems.

It is noted that in the above-described second embodiment, the color difference line sequential complementary color filter is used as the imaging device, but the present invention is not necessarily limited to such a configuration. For example, a configuration where the Bayer type primary color filter is used can be adopted like the first embodiment. In this case, missing R, G, and B signals are compensated with known interpolation processing to obtain the luminance signal and the color signals based upon Expressions (31).

$$Y=0.29900R+0.58700G+0.11400B$$

$$Cb=-0.16874R-0.33126G+0.50000B$$

$$Cr=0.50000R-0.41869G-0.08131B \quad (31)$$

In this case, only frame signals exist but no field signal exist. The differential calculation unit 700 is configured so as to obtain a differential signal from a signal before one frame.

Furthermore, it is possible to obtain a plurality of image signals taken in by a separate imaging unit and recorded in an unprocessed Raw data aspect accompanying information such as information for the color filter of the CCD 102 or exposure information at the shooting time in a header section thereof and perform processing to the image signal, like the aspect shown in FIG. 14 in the first embodiment.

Moreover, though the above-described embodiment is premised on the processing performed by hardware, the present invention is not necessarily limited to such a configuration. For example, a configuration where a plurality of image signals which continue in time sequence from the CCD 102 is output as unprocessed Raw data, accompanying information such as the information on the color filter of the CCD 102 and the exposure information at the shooting time is output as the header information, and the image signals and information is processed by software can be adopted.

Figure 24A:
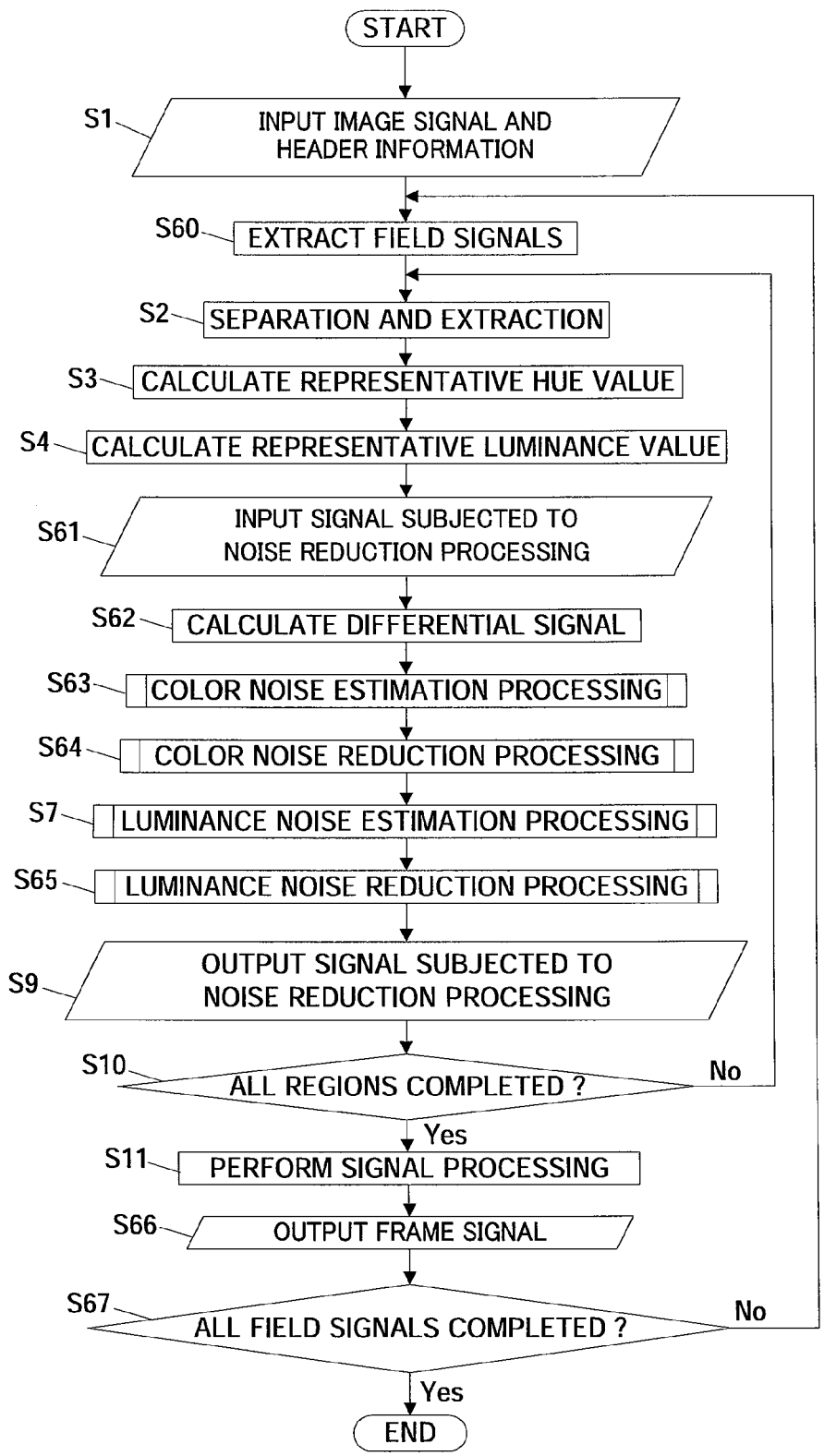
FIG. 24A is a flowchart of an overall processing of flow of a signal processing according to the second embodiment.

FIG. 24A shows a flow about the software processing in the case of causing a computer to perform the above-described signal processing. Hereafter, processing of each step will be explained. It is noted that steps for performing the same processing as that of the step in the flow of the signal processing in the first embodiment shown in FIG. 15A are assigned with same step numbers.

At step S1, a plurality of image signals and the header information such as the information on the color filter of the CCD and the exposure information at the shooting time are read and the processing proceeds to step S60. At step S60, the even number field signals and the odd number field signals are sequentially extracted from one image signal, namely, one frame signal and the processing proceeds to step S2. At step S2, the field signal is separated into a luminance signal and color signals, as shown by the Expression (17), and sequential extraction is performed for each region with a predetermined size, for example, 5×5 pixels.

At step S3, the representative hue value is obtained by obtaining hue regions shown by the Expression (18) and performing classification into six hue regions shown in FIG. 19A, and the processing proceeds to step S4. At step S4, the representative luminance value is obtained by obtaining average of the luminance signal of the region, and the processing proceeds to step S61. At step S61, the past field signal which has been subjected to the noise reduction processing, in other words, the field signal before two fields in this embodiment are input, and the processing proceeds to step S62.

At step S62, the differential luminance signal and the differential color signal shown by the Expressions (19) are calculated between the present field signal and the past field signal which has been subjected to the noise reduction processing, and the processing proceeds to step S63. At step S63, the estimation processing of the color noise amount is performed. This processing is performed according to a flow shown in FIG. 24B described later.

At step S64, the reduction processing of the color noise is performed. This processing is performed according to a flow shown in FIG. 24C described later.

At step S7, the estimation processing of the luminance noise amount is performed like the luminance noise estimation processing in the first embodiment shown in FIG. 15D, and the processing proceeds to step S65. At step S65, the reduction processing of the luminance noise is performed. This processing is performed according to a flow shown in FIG. 24D described later.

At step S9, the color signals and the luminance signal which have been subjected to the noise reduction processing are output, and the processing proceeds to step S10. At step S10, determination is made about whether processing to all regions on one field signal have been completed, and the processing proceeds to step S2 when the determination is negative, while the processing proceeds to step S11 when the determination is affirmative.

At step S11, known synchronous processing, emphasis processing, tone processing, compression processing, etc., are performed, and the processing proceeds to step S66. At step S66, one image signal obtained by composing the even number field signal and the odd number field signal which have been subjected to the noise reduction processing, namely, a frame signal, is output, and the processing proceeds to step S67. At step S67, determination is made about whether or not the processing has been completed to all the field signals, and the processing proceeds to step S60 when the determination is negative, while the processing is terminated when the determination is affirmative.

Figure 24B:
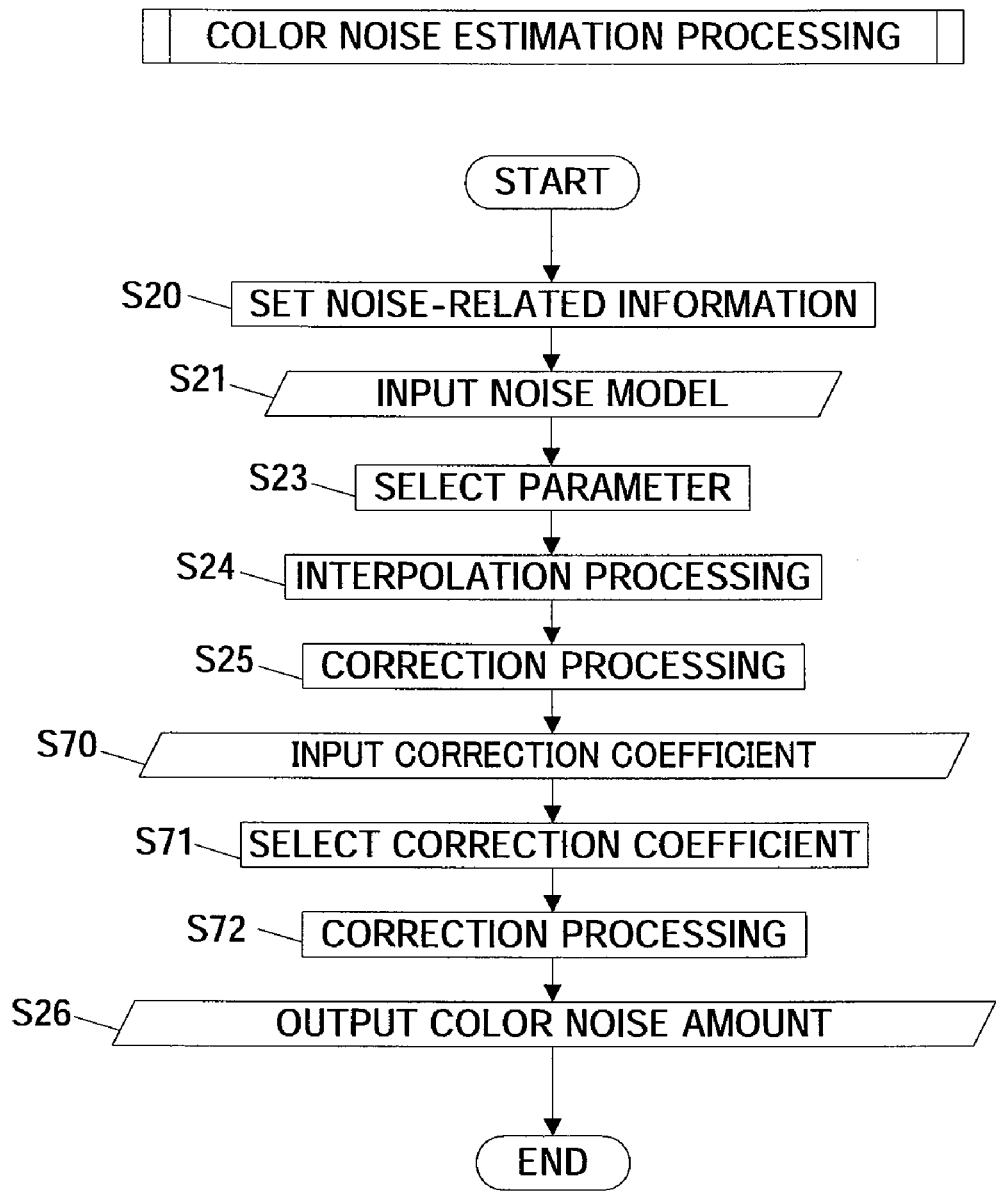
FIG. 24B is a flowchart of a color noise estimation processing of the flow of the signal processing according to the second embodiment.

FIG. 24B is a flow regarding the color noise estimation processing performed at step S63 shown in FIG. 24A. It is noted that steps for performing the same processing as that of the step in the flow of the color noise estimation processing in the first embodiment shown in FIG. 15B are assigned with same step numbers. Hereafter, processing of each step will be explained.

At step S20, information such as a temperature or a gain is set from the read header information. However, when a necessary parameter is not included in the header information, assignment of a predetermined standard value is performed. At step S21, the reference color noise model and the correction coefficient are input, and the processing proceeds to step S23.

At step S23, the coordinate data of the segment of the reference color noise model to which the representative luminance value belongs and a correction coefficient corresponding thereto are selected, and the processing proceeds to step S24. At step S24, the reference color noise amount is obtained by the interpolation processing shown by the Expression (20), and the processing proceeds to step S25. At step S25, the color noise amount is obtained by the correction processing shown by the Expression (21), and the processing proceeds to step S70.

At step S70, the correction coefficient for performing conversion of the hue region is input, and the processing proceeds to step S71. At step S71, the correction coefficient for performing conversion of the hue region is selected based upon the representative hue value, and the processing proceeds to step S72. At step S72, the color noise amount is corrected by the correction processing shown by the Expression (22) using the selected correction coefficient, and the processing proceeds to step S26. At step S26, the corrected color noise amount is output and the processing is terminated.

Figure 24C:
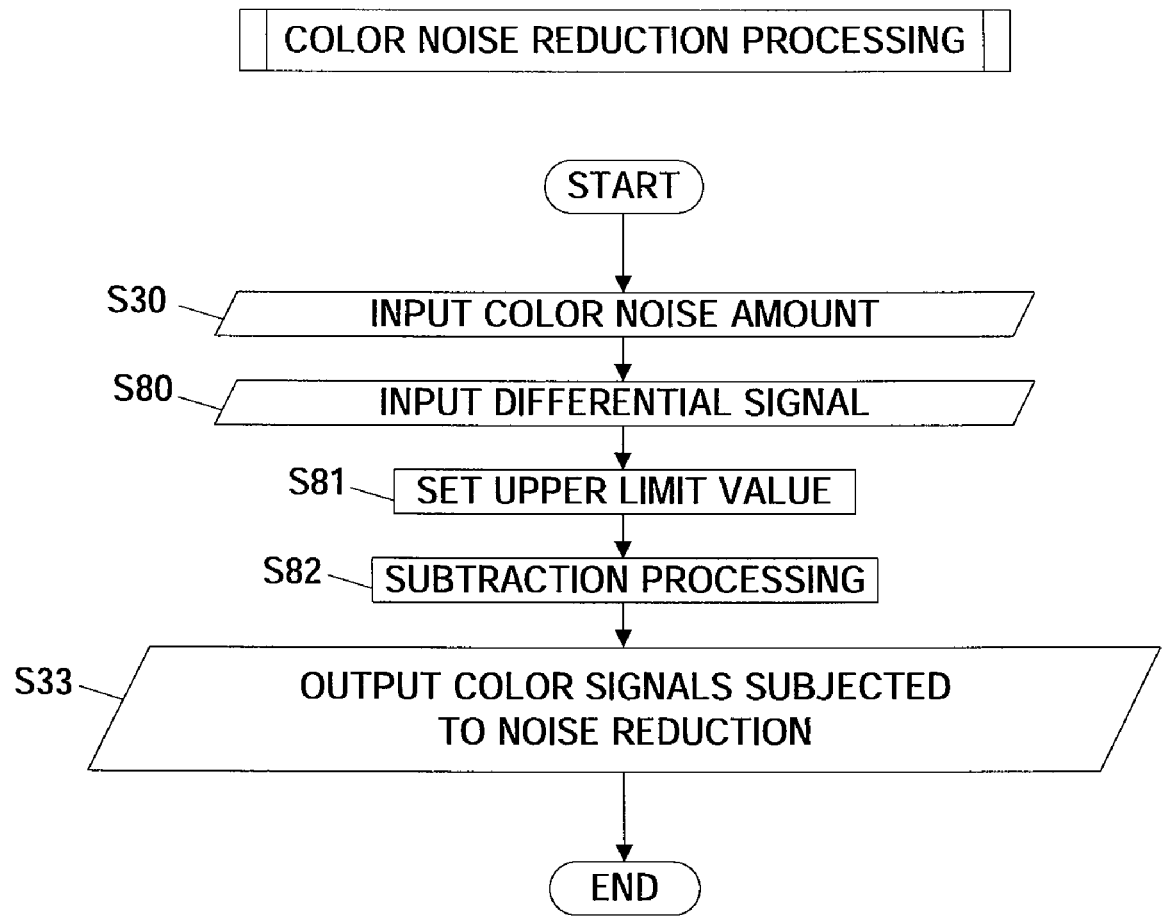
FIG. 24C is a flowchart of color noise reduction processing of the flow of the signal processing according to the second embodiment.

FIG. 24C is a flow regarding the color noise reduction processing performed at step S64 shown in FIG. 24A. It is noted that steps for performing the same processing as that of the step in the flow of the color noise reduction processing in the first embodiment shown in FIG. 15C are assigned with same step numbers. Hereafter, processing of each step will be explained.

At step S30, the color noise amount estimated at step S63 shown in FIG. 24A is input, and the processing proceeds to step S80. At step S80, the differential color signal shown by the Expression (19) is input, and the processing proceeds to step S81. At step S81, the upper limit value shown by the Expression (23) is set to the differential color signal based upon the color noise amount, and the second color noise amount is obtained.

At step S82, regarding the target pixel in the region, the color noise reduction processing is performed by performing the subtraction processing of the second color noise amount shown by the Expression (24), and the processing proceeds to step S33. At step S33, the color signal which has been subjected to the color noise reduction processing is output and the processing is terminated.

Figure 24D:
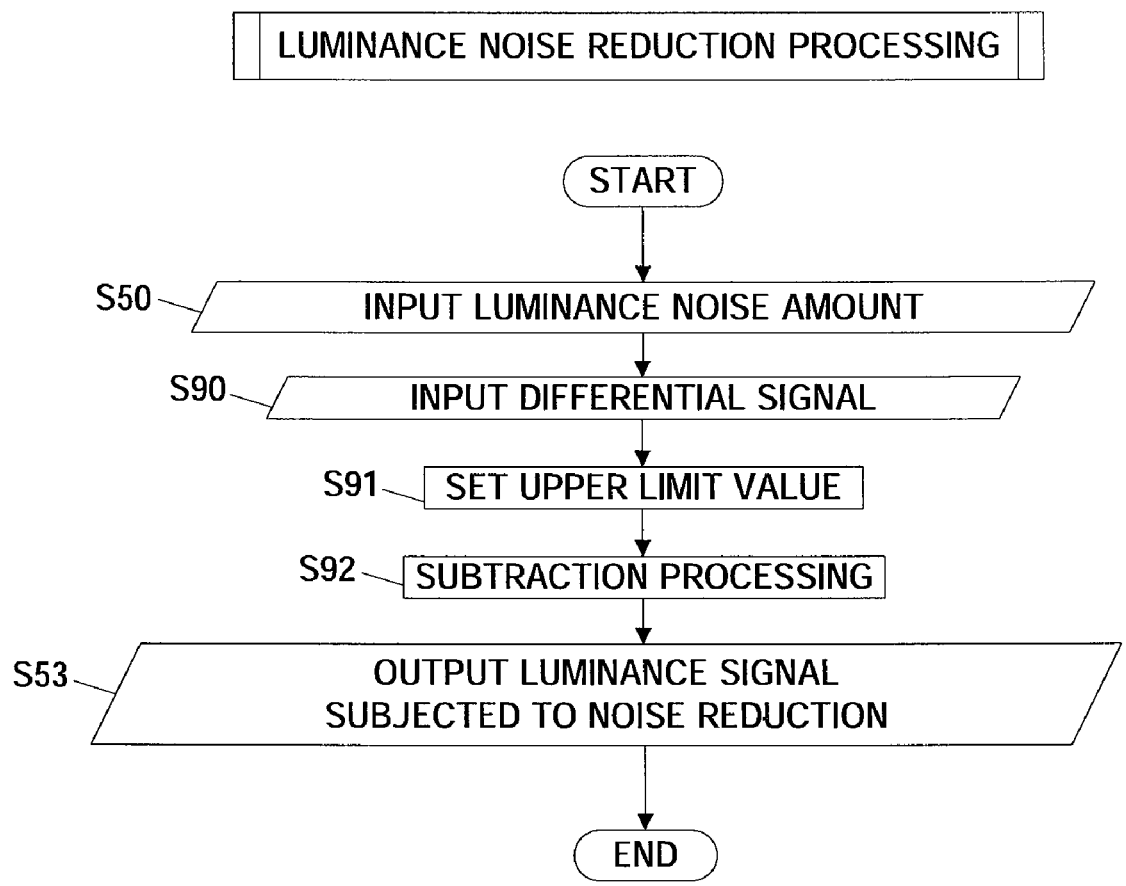
FIG. 24D is a flowchart of luminance noise reduction processing of the flow of the signal processing according to the second embodiment.

FIG. 24D is a flow regarding the luminance noise reduction processing performed at step S65 shown in FIG. 24A. It is noted that steps for performing the same processing as that of the step in the flow of the luminance noise reduction processing in the first embodiment shown in FIG. 15E are assigned with same step numbers. Hereafter, processing of each step will be explained.

At step S50, the luminance noise amount estimated at step S7 shown in FIG. 24A is input, and the processing proceeds to step S90. At step S90, the differential luminance signal shown by the Expression (19) is inputted and, the processing proceeds to step S91. At step S91, the upper limit value shown by the Expression (27) is set to the differential luminance signal based upon the luminance noise amount, and the second luminance noise amount is obtained.

At step S92, regarding the target pixel in the region, the luminance noise reduction processing is performed by performing the subtraction processing of the second luminance noise amount shown by the Expression (28), and the processing proceeds to step S53. At step S53, the luminance signal which has been subjected to the luminance noise reduction processing is output, and the processing is terminated.

Thus, the configuration where the signal processing is performed by software may be adopted, where same functions and advantageous effects can be achieved with the case where the signal processing is performed by hardware.

Though the respective embodiments of the present invention have been explained above, they only show example of applications of the present invention, and are not meant to limit the technical scope of the present invention to the specific configurations of the above-described embodiments. Further, another configuration can be prepared by combining portions of the configurations of the first embodiment and the second embodiment, respectively.

As described above, the processing explained in the first and the second embodiments can be performed by software. In this case, a program for realizing the processing explained in the first and the second embodiments is stored in a computer-readable recording medium in advance. As the computer-readable recording medium, there are a magnetic disk, a magnetic optical disc, a CD-ROM, a DVD-ROM, a semiconductor memory, etc. Furthermore, the above-described program may be distributed to a computer through a communication line, whereupon the computer executes the received distributed program.

What is claimed is:

1. An image processing apparatus that performs noise reduction processing to image signals taken in from an imaging system in time sequence, comprising:
a separation and extraction unit that separates a present image signal into a luminance signal and a color signal and extracts regions having a predetermined size sequentially;
a representative luminance calculation unit that calculates a representative luminance value of the region based upon the luminance signal of the region extracted by the separation and extraction unit;
a representative hue calculation unit that calculates a representative hue value of the region based upon the color signal of the regions;
a color noise estimation unit that estimates a color noise amount based upon the representative luminance value calculated by the representative luminance calculation unit and the representative hue value calculated by the representative hue calculation unit;
a differential color signal calculation unit that calculates a differential color signal from the color signal of the region and a color signal of a past region which has been subjected to noise reduction processing and corresponds to the region; and
a color noise reduction unit that performs color noise reduction processing to the color signal of the region based upon the color noise amount estimated by the color noise estimation unit and the differential color signal calculated by the differential color signal calculation unit.

2. The image processing apparatus according to claim 1, further comprising:
a luminance noise estimation unit that estimates a luminance noise amount based upon the representative luminance value;
a differential luminance signal calculation unit that calculates a differential luminance signal from the luminance signal of the region and the luminance signal of the past region which has been subjected to noise reduction processing and corresponds to the region; and
a luminance noise reduction unit that performs luminance noise reduction processing to the luminance signal of the region based upon the luminance noise amount estimated by the luminance noise estimation unit and the differential luminance signal calculated by the differential luminance signal calculation unit.

3. The image processing apparatus according to claim 1, wherein
the color noise estimation unit comprises:
a collection unit that collects information on a temperature value of the imaging system and a gain to the image signal;
a providing unit that provides a predetermined standard value to information which is not obtained by the collection unit;
a parameter recording unit that records a group of parameters regarding a plurality of reference color noise models corresponding to a predetermined number of hue regions;
a model selection unit that selects the reference color noise model based upon the representative hue value;
a parameter selection unit that selects a parameter which is needed regarding the reference color noise model selected by the model selection unit, from the group of parameters recorded in the parameter recording unit based upon information from the collection unit or the providing unit and the representative luminance value; and an interpolation unit that obtains a color noise amount by interpolation operation based upon the representative luminance value and the parameter selected by the parameter selection unit.

4. The image processing apparatus according to claim 1, wherein the color noise estimation unit comprises:

a collection unit that collects information on a temperature value of the imaging system and a gain to the image signal;

a providing unit that provides a standard value to information which is not obtained by the collection unit;

a parameter recording unit that records a group of parameters regarding a reference color noise model;

a parameter selection unit that selects a parameter which is needed regarding the reference color noise model from the group of parameters recorded in the parameter recording unit based upon information from the collection unit or the providing unit and the representative luminance value;

an interpolation unit that obtains a color noise amount by interpolation operation based upon the representative luminance value and the parameter selected by the parameter selection unit; and a color noise correction unit that corrects the color noise amount obtained by the interpolation unit based upon the representative hue value.

5. The image processing apparatus according to claim 4, wherein the color noise correction unit comprises:

a correction coefficient recording unit that records correction coefficients corresponding to a predetermined hue region;

a correction coefficient selection unit that selects a correction coefficient from the correction coefficient recording unit based upon the representative hue value; and a correction coefficient multiplication unit that multiplies the color noise amount obtained by the interpolation unit by the correction coefficient selected by the correction coefficient selection unit.

6. The image processing apparatus according to claim 1, wherein the color noise estimation unit comprises:

a collection unit that collects information on a temperature value of the imaging system and a gain to the image signal;

a providing unit that provides a predetermined standard value to information which is not obtained by the collection unit; and a color noise table unit that outputs a color noise amount based upon input of information from the collection unit or the providing unit, the representative luminance value, and the representative hue value to output a color noise amount.

7. The image processing apparatus according to claim 2, wherein the luminance noise estimation unit comprises:

a collection unit that collects information on a temperature value of the imaging system and a gain to the image signal;

a providing unit that provides a standard value to information which is not obtained by the collection unit;

a parameter recording unit that records a group of parameters regarding a reference luminance noise model;

a parameter selection unit that selects a parameter which is needed regarding the reference luminance noise model from the group of parameters recorded in the parameter recording unit based upon information from the collection unit or the providing unit and the representative luminance value; and an interpolation unit that obtains a luminance noise amount by an interpolation operation based upon the representative luminance value and the parameter selected by the parameter selection unit.

8. The image processing apparatus according to claim 2, wherein the luminance noise estimation unit comprises:

a collection unit that collects information on a temperature value of the imaging system and a gain to the image signal;

a providing unit that provides a standard value to information which is not obtained by the collection unit; and a luminance noise table unit that is input with information from the collection unit or the providing unit and the representative luminance value to output a luminance noise amount.

9. The image processing apparatus according to claim 1, wherein the color noise reduction unit comprises:

a correction unit that performs correction processing to the differential color signal based upon the color noise amount; and a subtraction unit that performs subtraction processing between the color signal of the region and the differential color signal corrected by the correction unit.

10. The image processing apparatus according to claim 1, wherein the color noise reduction unit comprises:

a correction unit that performs correction processing to the differential color signal based upon the color noise amount;

a representative color calculation unit that calculates a representative color value of a color signal in the region; and a coring unit that performs coring processing based upon the representative color value calculated by the representative color calculation unit and the differential color signal corrected by the correction unit.

11. The image processing apparatus according to claim 2, wherein the luminance noise reduction unit comprises:

a correction unit that performs correction processing to the differential luminance signal based upon the luminance noise amount; and a subtraction unit that performs subtraction processing between the luminance signal of the region and the differential luminance signal corrected by the correction unit.

12. The image processing apparatus according to claim 2, wherein the luminance noise reduction unit comprises:

a correction unit that performs correction processing to the differential luminance signal based upon the luminance noise amount; and a coring unit that performs coring processing based upon the representative luminance value and the differential luminance signal corrected by the correction unit.

13. The image processing apparatus according to claim 1, wherein the imaging system comprises an imaging device having a Bayer type primary color filter arranged in front thereof or an imaging device having a color difference line sequential complementary color filter arranged in front thereof.

14. A non-transitory storage medium storing an image processing program for performing noise reduction processing to image signals taken in from an imaging system in time sequence, wherein the image processing program causes a computer to execute:
  a separation and extraction step of separating a present image signal into a luminance signal and a color signal and extracting regions having a predetermined size sequentially;
  a representative luminance calculation step of calculating a representative luminance value of the region based upon the luminance signal of the region extracted at the separation and extraction step;
  a representative hue calculation step of calculating a representative hue value of the region based upon the color signal of the regions;
  a color noise estimation step of estimating a color noise amount based upon the representative luminance value and the representative hue value;
  a differential color signal calculation step of calculating a differential color signal from the color signal of the region and a color signal of a past region which has been subjected to noise reduction processing and corresponds to the region; and
  a color noise reduction step of performing color noise reduction processing to the color signal of the region based upon the color noise amount estimated at the color noise estimation step and the differential color signal calculated at the differential color signal calculation step.

15. The non-transitory storage medium according to claim 14, wherein
  the color noise estimation step comprises:
  a collection step of collecting information on a temperature value of the imaging system and a gain to the image signal;
  a providing step of providing a predetermined standard value to information which is not obtained at the collection step;
  a parameter recording step of recording a group of parameters regarding a plurality of reference color noise models corresponding to a predetermined number of hue regions;
  a model selection step of selecting the reference color noise model based upon the representative hue value;
  a parameter selection step of selecting a parameter which is needed regarding the selected reference color noise model, from the group of parameters based upon information collected at the collection step or information provided at the providing step and the representative luminance value; and
  an interpolation step of obtaining a color noise amount by interpolation operation based upon the representative luminance value and the selected parameter.

16. The non-transitory storage medium according to claim 14, wherein
  the color noise estimation step comprises:
  a collection step of collecting information on a temperature value of the imaging system and a gain to the image signal;
  a providing step of providing a standard value to information which is not obtained at the collection step;
  a parameter recording step of recording a group of parameters regarding a reference color noise model;
  a parameter selection step of selecting a parameter which is needed regarding the reference color noise model from the group of parameters based upon information collected at the collection step or information provided at the providing step and the representative luminance value;
  an interpolation step of obtaining a color noise amount by interpolation operation based upon the representative luminance value and the selected parameter; and
  a color noise correction step of correcting the color noise amount based upon the representative hue value.

17. The non-transitory storage medium according to claim 16, wherein
  the color noise correction step comprises:
  a correction coefficient recording step of recording correction coefficients corresponding to a predetermined hue region;
  a correction coefficient selection step of selecting a correction coefficient based upon the representative hue value; and
  a correction coefficient multiplication step of multiplying the color noise amount by the selected correction coefficient.

18. The non-transitory storage medium according to claim 14, wherein
  the color noise estimation step comprises:
  a collection step of collecting information on a temperature value of the imaging system and a gain to the image signal;
  a providing step of providing a predetermined standard value to information which is not obtained at the collection step; and
  a color noise table step of outputting a color noise amount based upon input of information collected at the collection step or information provided at the providing step, the representative luminance value, and the representative hue value and.

19. The non-transitory storage medium according to claim 14, wherein
  the color noise reduction step comprises:
  a correction step of performing correction processing to the differential color signal based upon the color noise amount; and
  a subtraction step of performing subtraction processing between the color signal of the region and the corrected differential color signal.

20. The non-transitory storage medium according to claim 14, wherein
  the color noise reduction step comprises:
  a correction step of performing correction processing to the differential color signal based upon the color noise amount;
  a representative color calculation step of calculating a representative color value of a color signal in the region; and
  a coring step of performing coring processing based upon the representative color value and the corrected differential color signal.

* * * * *